United States Patent
Kim et al.

(10) Patent No.: US 11,412,405 B2
(45) Date of Patent: *Aug. 9, 2022

(54) METHOD AND APPARATUS FOR RAPIDLY REPORTING FREQUENCY MEASUREMENT RESULTS IN NEXT GENERATION MOBILE COMMUNICATION SYSTEM

(71) Applicant: Samsung Electronics Co., Ltd., Gyeonggi-do (KR)

(72) Inventors: Donggun Kim, Seoul (KR); Soenghun Kim, Gyeonggi-do (KR); Jaehyuk Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 13 days.

This patent is subject to a terminal disclaimer.

(21) Appl. No.: 17/027,065

(22) Filed: Sep. 21, 2020

(65) Prior Publication Data

US 2021/0007000 A1 Jan. 7, 2021

Related U.S. Application Data

(63) Continuation of application No. 16/010,994, filed on Jun. 18, 2018, now Pat. No. 10,785,668.

(30) Foreign Application Priority Data

Jun. 16, 2017 (KR) .................. 10-2017-0076473
Aug. 10, 2017 (KR) .................. 10-2017-0101931
Aug. 22, 2017 (KR) .................. 10-2017-0106288

(51) Int. Cl.
*H04L 69/04* (2022.01)
*H04L 69/08* (2022.01)
(Continued)

(52) U.S. Cl.
CPC ......... *H04W 28/0273* (2013.01); *H04L 69/04* (2013.01); *H04L 69/08* (2013.01);
(Continued)

(58) Field of Classification Search
CPC .. H04B 7/02–12; H04B 17/0082–3913; H04L 5/0001–0098; H04L 69/02–40;
(Continued)

(56) References Cited

U.S. PATENT DOCUMENTS 8,279,873 B2 10/2012 Ramos Peres et al.
8,355,331 B2 1/2013 Chun et al.
(Continued)

FOREIGN PATENT DOCUMENTS

EP 2 876 933 5/2015
GB 2 462 699 2/2010

OTHER PUBLICATIONS

Park et al., "TCP Performance Degradation of In-Sequence Delivery in LTE Link Layer", Dec. 2011, International Journal of Advanced Science and Technology, vol. 37, pp. 27-36. (Year: 2011).*
(Continued)

*Primary Examiner* — Timothy J Weidner
(74) *Attorney, Agent, or Firm* — The Farrell Law Firm, P.C.

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A control method of a user equipment (UE) in a
(Continued)

wireless communication system is provided. The method includes receiving, from a base station, packet data convergence protocol (PDCP) configuration information including information indicating that a PDCP layer is configured with out-of-order delivery; identifying that the PDCP layer is configured with the out-of-order delivery based on the PDCP configuration information; and processing a PDCP packet based on a result of identifying that the PDCP layer is configured with the out-of-order delivery. A header compression or a header decompression associated with a robust header compression (ROHC) are not configured, in case that the PDCP layer is configured with the out-of-order delivery.

20 Claims, 29 Drawing Sheets

(51) Int. Cl.
```
H04L 69/22      (2022.01)
H04W 24/10      (2009.01)
H04W 28/02      (2009.01)
H04W 48/12      (2009.01)
H04W 72/12      (2009.01)
H04W 76/27      (2018.01)
H04W 80/02      (2009.01)
H04W 80/06      (2009.01)
H04W 84/02      (2009.01)
H04W 88/02      (2009.01)
H04W 88/08      (2009.01)
H04W 92/02      (2009.01)
H04W 92/10      (2009.01)
```

(52) U.S. Cl.
CPC .............. *H04L 69/22* (2013.01); *H04W 24/10* (2013.01); *H04W 48/12* (2013.01); *H04W 72/1289* (2013.01); *H04W 76/27* (2018.02); *H04W 80/02* (2013.01); *H04W 80/06* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ......... H04L 8/22–245; H04L 24/02–10; H04L 28/02–26; H04L 36/0005–385; H04L 48/02–20; H04L 60/005–06; H04L 72/005–14; H04L 74/002–0891; H04L 76/10–50; H04L 80/02–12; H04L 84/02–16; H04L 88/005–12; H04L 92/02; H04L 92/04; H04L 92/10

See application file for complete search history.

(56) References Cited

U.S. PATENT DOCUMENTS

| | | | |
|---|---|---|---|
| 10,785,668 B2* | 9/2020 | Kim | ...................... H04W 24/10 |
| 2008/0095116 A1 | 4/2008 | Kim | |
| 2011/0228746 A1 | 9/2011 | Chun | |
| 2013/0242859 A1 | 9/2013 | Celik et al. | |
| 2015/0146617 A1 | 5/2015 | Park et al. | |
| 2015/0215987 A1* | 7/2015 | Kim | ...................... H04W 36/02 |
| 2017/0048765 A1 | 2/2017 | Meylan | |
| 2017/0237837 A1 | 8/2017 | Sammour | |
| 2018/0098241 A1* | 4/2018 | Callard | ............. H04W 28/0289 |

OTHER PUBLICATIONS

Ericsson, "PDCP Unified Reception Algorithm", R2-1704373, 3GPP TSG-RAN WG2 #98, May 15-19, 2017, 8 pages.
3rd Generation Partnership Project; Technical Specification Group Radio Access Network; Evolved Universal Terrestrial Radio Access (E-UTRA); Packet Data Convergence Protocol (PDCP) Specification (Release 14), 3GPP TS 36.323 V14.2.0, Mar. 22, 2017, 43 pages.
European Search Report dated Oct. 25, 2019 issued in counterpart application No. 18816910.6-1214, 10 pages.
International Search Report dated Sep. 20, 2018 issued in counterpart application No. PCT/KR2018/006783, 18 pages.
Samsung, "Out-of-sequence delivery in PDCP", May 15-19, 2017, 3GPP TSG-RAN WG2 Meeting#98, R2-1705687, pp. 1-2 (Year: 2017).
Qualcomm Incorporated, "Report of Email Discussion [97#58][LTE/TEI14] RLC UM for LWA Bearer", R2-1703689, 3GPP TSG-RAN2 Meeting #97bis, Apr. 3-7, 2017, 5 pages.
European Search Report dated Apr. 19, 2021 issued in counterpart application No. 18816910.6-1212, 10 pages.
Oppo, "Discussion on Out-of-Sequence Delivery from PDCP", R2-1706339, 3GPP TSG-RAN2#AH2, Jun. 27-29, 2017, 3 pages.
Samsung, "Out-of-Sequence Delivery in PDCP", R2-1707390, 3GPP TSG-RAN WG2 NR Ad-hoc#2, Meeting, Jun. 27-29, 2017, 2 pages.
LG Electronics Inc., "E-Mail Discussion Summary of PDCP Receive Operation", R2-1706869, 3GPP TSG-RAN WG2 NR AdHoc, Jun. 27-29, 2017, 29 pages.
Korean Office Action dated Mar. 15, 2022 issued in counterpart application No. 10-2017-0106288, 7 pages.

* cited by examiner

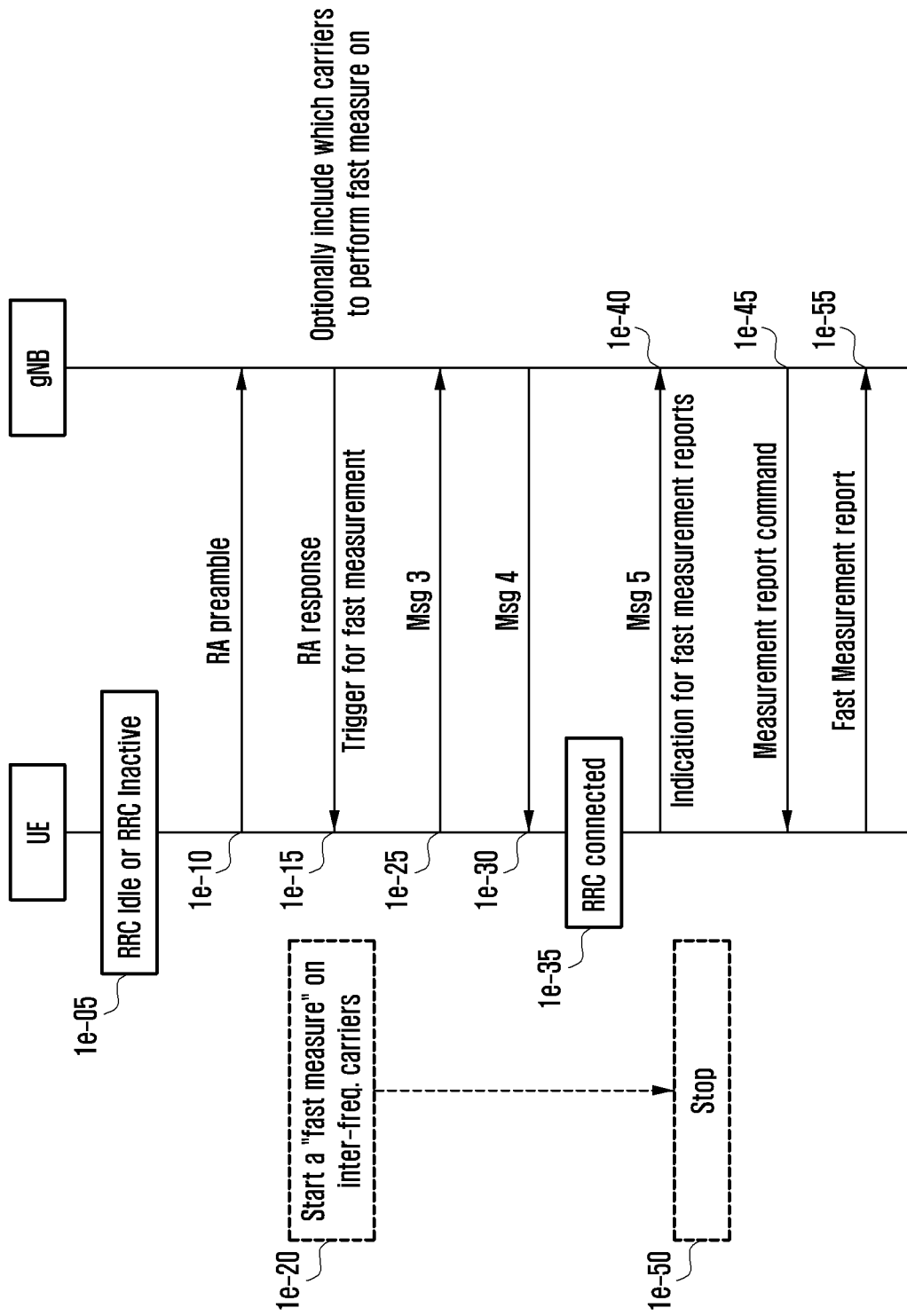

METHOD AND APPARATUS FOR RAPIDLY REPORTING FREQUENCY MEASUREMENT RESULTS IN NEXT GENERATION MOBILE COMMUNICATION SYSTEM

CROSS-REFERENCE TO RELATED APPLICATION(S)

This application is a continuation of U.S. Ser. No. 16/010,994, which was filed in the U.S. Patent and Trademark Office on Jun. 18, 2018, and claims priority under 35 U.S.C. § 119 to Korean Patent Application Nos. 10-2017-0076473, 10-2017-0101931, and 10-2017-0106288, which were filed in the Korean Intellectual Property Office on Jun. 16, 2017, Aug. 10, 2017, and Aug. 22, 2017, respectively, the disclosure of each of which is incorporated by reference herein in its entirety.

BACKGROUND

Field

The present disclosure relates generally to a method and apparatus for rapidly reporting frequency measurement results in a next-generation mobile communication system.

Description of the Related Art

To meet the demand for wireless data traffic having increased since deployment of 4G communication systems, efforts have been made to develop an improved 5G or pre-5G communication system, Therefore the 5G or pre-5G communication system is also called a "Beyond 4G network" or a "Post LTE System." The 5G communication system is considered to be implemented in higher frequency (mmWave) bands, e.g., 60 GHz bands, so as accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

There is a need to support various operation modes of a packet data convergence protocol (PDCP) layer in a 5G communication system.

SUMMARY

In a next-generation mobile communication system, in order to support services having a high data transfer rate and low transmission latency, a base station must rapidly configure a frequency carrier aggregation (CA) or dual connectivity (DC) technology in a terminal. However, in order to configure the technologies in the terminal, there is a need for frequency measurement results of the terminal.

In a next-generation mobile communication system, a PDCP layer must support an in-sequence delivery function through a higher layer because a radio link control (RLC) layer does not support the in-sequence delivery function for received packets. If the PDCP layer can request retransmission, this also needs to be taken into consideration. If a higher layer can support the in-sequence delivery function, the PDCP layer may not need to support the in-sequence delivery function. Accordingly, it is necessary to support the operation modes of the PDCP layer by taking such various cases into consideration.

An aspect of the present disclosure provides a method of rapidly receiving a report on frequency measurement results of a terminal is provided.

Another aspect of the present disclosure provides a method for a terminal to determine a connected state of each base station when the base station accesses and uses base stations at a same time using different radio access technologies (RATs) or the same RAT in a wireless communication system, and a processing method therefor.

According to an aspect of the present disclosure, a method is provided for a user equipment (UE) in a wireless communication system. The method includes receiving, from a base station, packet data convergence protocol (PDCP) configuration information including information indicating that a PDCP layer is configured with out-of-order delivery; identifying that the PDCP layer is configured with the out-of-order delivery based on the PDCP configuration information; and processing a PDCP packet based on a result of identifying that the PDCP layer is configured with the out-of-order delivery, A header compression or a header decompression associated with a robust header compression (ROHC) are not configured, in case that the PDCP layer is configured with the out-of-order delivery.

In accordance with another aspect of the present disclosure, a user equipment (UE) is provided for use in a wireless communication system. The UE includes a transceiver; and a controller configured to receive, from a base station via the transceiver, packet data convergence protocol (PDCP) configuration information including information indicating that a PDCP layer is configured with out-of-order delivery, identify that the PDCP layer is configured with the out-of-order delivery based on the PDCP configuration information, and process a PDCP packet based on a result of identifying that the PDCP layer is configured with the out-of-order delivery. A header compression or a header decompression associated with a robust header compression (ROHC) are not configured, in case that the PDCP layer is configured with the out-of-order delivery.

In accordance with another aspect of the present disclosure, a method is provided for a base station in a wireless communication system. The method includes generating packet data convergence protocol (PDCP) configuration information including information indicating that a PDCP layer of a user equipment (UE) is configured with out-of-order delivery; and transmitting the PDCP configuration information to the UE. A header compression or a header decompression associated with a robust header compression (ROHC) are not configured, in case that the PDCP layer is configured with the out-of-order delivery.

In accordance with another aspect of the present disclosure, a base station is provided for use in a wireless communication system. The base station includes a transceiver; and a controller configured to generate packet data convergence protocol (PDCP) configuration information including information indicating that a PDCP layer of a user equipment (UE) is configured with out-of-order delivery, and transmit the PDCP configuration information to the UE via the transceiver. A header compression or a header decompression associated with a robust header compression (ROHC) are not configured in case that the PDCP layer is configured with the out-of-order delivery.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 1E is a flow diagram of a (1-1)-th embodiment in which a terminal performs early measurement and may make a fast measurement report in a next-generation mobile communication system of the present disclosure;

DETAILED DESCRIPTION OF EMBODIMENTS OF THE PRESENT DISCLOSURE

Figure 1A:
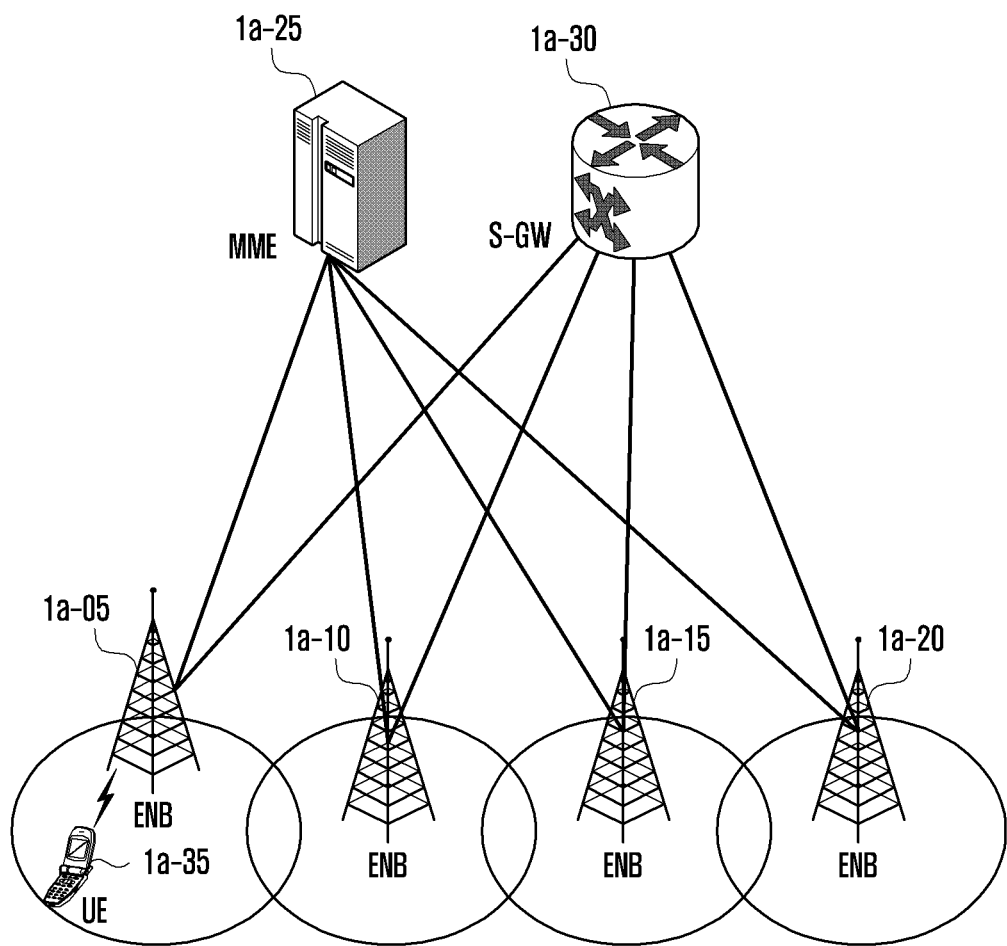
FIG. 1A is an illustration of a long term evolution (LTE) system according to an embodiment.

Hereinafter, various embodiments of the present disclosure are described in detail with reference to the accompanying drawings. In describing the present disclosure, a detailed description of a related known function or configuration related to the present disclosure is omitted if it would make the gist of the present disclosure unnecessarily vague.

Furthermore; terms described hereunder are defined by taking into consideration functions in the present disclosure, and may be different depending on a user, an operator's intention or practice. Accordingly, each term is intended to be defined based on contents of the entire present disclosure.

The merits and characteristics of the present disclosure and a method of achieving the merits and characteristics will become more apparent from the embodiments described in detail in conjunction with the accompanying drawings. However, the present disclosure is not intended to be limited to the disclosed embodiments, but may be implemented in different ways. The embodiments are provided to only complete the present disclosure and to allow those skilled in the art to fully understand the present disclosure. The present disclosure is defined by the appended claims and their equivalents. The same reference numerals are used to refer to the same or similar elements throughout the accompanying drawings.

First Embodiment

In the following description, terms to denote an access node, network entities, messages, an interface between network entities, and a variety of types of identity information are shown. Accordingly, the present disclosure is not intended to be limited to being described by the following terms, and other terms to denote targets having equivalent meanings may be used.

In embodiments of the present disclosure, terms and names defined in the 3$^{rd}$ generation partnership project LTE (3GPP LTE) standard or terms and names modified from the defined terms and names are used. However, the present disclosure is not intended to be limited to the terms and names and may be identically applied to systems based on other standards. In one embodiment of the present disclosure, an enhanced node B (eNB) may be interchangeably used with a next generation node B (gNB) for convenience of description. That is, a base station described as an eNB may indicate a gNB.

FIG. 1A is an illustration of an LTE system according to an embodiment.

Referring to FIG. 1A, the RAN of the LTE system includes next-generation evolved node Bs (also referred to as "eNBs", "node Bs", gNBs, or base stations) 1a-05, 1a-10, 1a-15, and 1a-20, a mobility management entity (MME) 1a-25, and a serving-gateway (S-GW) 1a-30. A UE (also referred to as a terminal) 1a-35 accesses an external network through the eNBs 1a-05-1a-20 and the S-GW 1a-30.

The eNBs 1a-05-1a-20 correspond to the node Bs of an existing universal mobile telecommunications system (UMTS). The eNB is connected to the UE 1a-35 through a radio channel and performs a more complex function than the existing node B. In the LTE system, all of the types of user traffic including a real-time service, such as voice over IP (VoIP), through the Internet protocol, are served through a shared channel. Accordingly, a device that performs schedules by collecting state information, such as a buffer state, an available transmission power state, and a channel state of UEs, is necessary. The eNBs 1a-05-1a-20 are in charge of such a device. In general, one eNB controls multiple cells. For example, in order to implement the transfer rate of 100 Mbps, the LTE system uses orthogonal frequency division multiplexing (OFDM) as a RAT in the 20 MHz bandwidth, for example. The LTE system adopts an adaptive modulation and coding (AMC) scheme for determining a modulation scheme and a channel coding rate based on the channel state of a UE. The S-GW 1a-30 provides a data bearer and generates or removes a data bearer under the control of the MME 1a-25, The MME is in charge of various control functions in addition to a mobility management function for a UE, and is connected to multiple eNBs, FIG. 1B is a block diagram of a radio protocol architecture in an LTE system according to an embodiment.

Figure 1B:
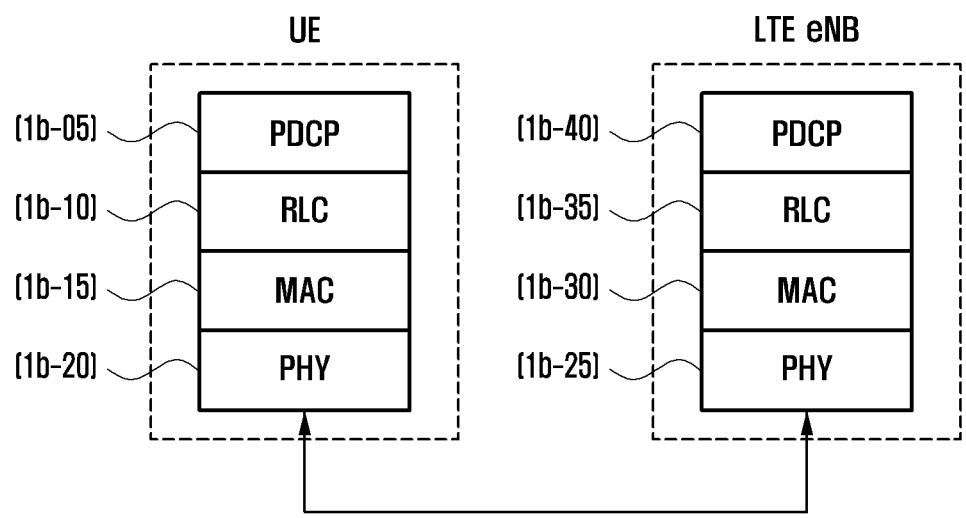
FIG. 1B is a block diagram of a radio protocol architecture in an LTE system according to an embodiment.

Referring to FIG. 1B, the radio protocol of the LTE system includes PDCPs 1b-05 and 1b-40, RLCs 1b-10 and 1b-35, and medium access controls (MACs) 1b-15 and 1b-30 in a UE and an eNB, respectively. The PDCPs 1b-05 and 1b-40 are in charge of an operation, such as internet protocol (IP) header compression/restoration. Various functions of the PDCP 1b-05 and 1b-40 are summarized as follows:

Header compression and decompression: robust header compression (ROHC) only

Transfer of user data

In-sequence delivery of upper layer protocol data units (PDUs) in a PDCP re-establishment procedure for RLC acknowledge mode (AM)

Reordering function (for split bearers in DC (only support for RLC AM): PDCP PDU routing for transmission and PDCP PDU reordering for reception)

Duplicate detection of lower layer service data units (SDUs) in a PDCP re-establishment procedure for RLC AM Retransmission of PDCP SDUs at handover and, for split bearers in DC, of PDCP PDUs in a PDCP data-recovery procedure, for RLC AM Ciphering and deciphering Timer-based SDU discard in uplink.

The RLCs 1b-10 and 1b-35 reconfigure a PDCP PDU in a proper size and performs an automatic repeat query (ARQ) operation. Major functions of the RLC are summarized as follows.

Transfer of upper layer PDUs

ARQ function (error correction through ARQ (only for AM data transfer))

Concatenation, segmentation and reassembly of RLC SDUs (only for UM and AM data transfer)

Re-segmentation of RLC data PDUs (only for AM data transfer)

Reordering of RLC data PDUs (only for unacknowledged mode (UM) and AM data transfer)

Duplicate detection (only for UM and AM data transfer)

Protocol error detection (only for AM data transfer)

RLC SDU discard (only for UM and AM data transfer)

RLC re-establishment

The MACs 1b-15 and 1b-30 are connected to multiple RLC layer devices configured in one UE, and performs an operation of multiplexing RLC PDUs with a MAC PDU and demultiplexing RLC PDUs from a MAC PDU. Various functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels)

Scheduling information reporting

Error correction through hybrid automatic repeat request (HARQ)

Priority handling between logical channels of one UE

Priority handling between UEs by means of dynamic scheduling multimedia broadcast/multicast service (MBMS) service identification Transport format selection Padding A physical layers (PHY) 1b-20 and 1b-25 perform an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OFDM symbol to a higher layer.

Figure 1C:
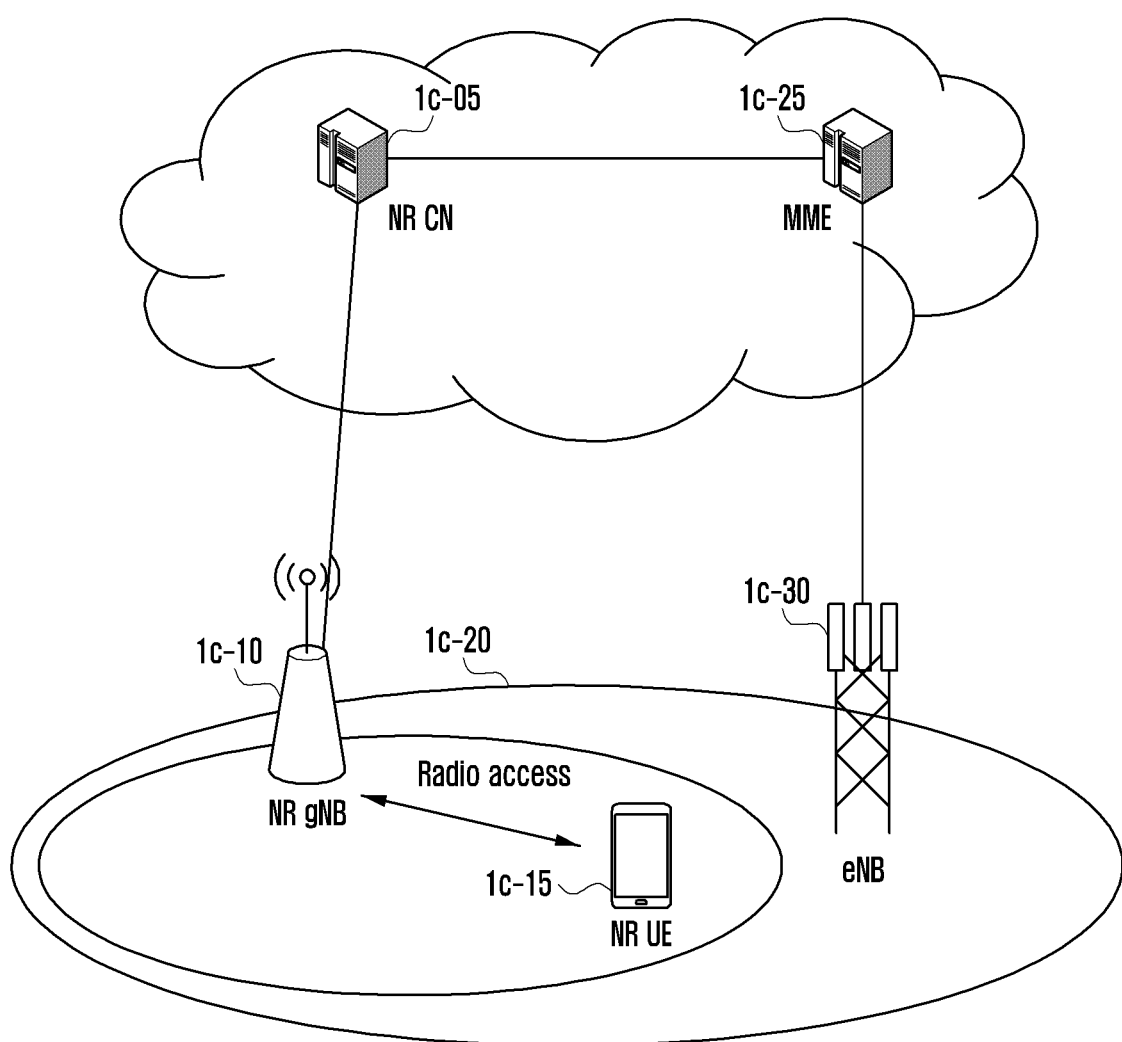
FIG. 1C is an illustration of a next-generation mobile communication system according to an embodiment.

FIG. 1C is an illustration of a next-generation mobile communication system according to an embodiment.

Referring to FIG. 1C, the radio access network of the next-generation mobile communication system includes an NR node B (also referred to as an "NR gNB" or an "NR base station") 1c-10 and an NR core network (NR CN) 1c-05. An NR UE (or terminal) 1c-15 accesses an external network through the NR gNB 1c-10 and the NR CN 1c-05.

The NR gNB 1c-10 corresponds to an eNB of the existing LTE system. The NR gNB 1c-10 is connected to the NR UE 1c-15 through a radio channel, and may provide an excellent service as compared to the existing node B. The next-generation mobile communication system requires a device for performing scheduling by collecting state information, such as the buffer state, available transmission power state, and channel state of UEs, because all types of user traffic are served through a shared channel. The NR gNB 1c-10 is in charge of the device.

In general, one NR gNB controls multiple cells. In order to implement ultra-high speed data transfer as compared to the existing LTE, the next-generation mobile communication system may have the existing maximum bandwidth or more and may additionally graft the beamforming technology using OFDM as a RAT. The next-generation mobile communication system adopts the AMC scheme that determines a modulation scheme and a channel coding rate based on the channel state of a UE, The NR CN 1c-05 performs functions, such as mobility support, a bearer configuration, and a quality of service (QoS) configuration. The NR CN 1c-05 is in charge of various control functions in addition to a mobility management function for a UE, and is connected to multiple eNBs. Furthermore, the next-generation mobile communication system may also operate in conjunction with the existing LTE system. The NR CN 1c-05 is connected to an MME 1c-25 through a network interface. The MME 1c-25 is connected to an eNB 1c-30, that is, the existing eNB.

Figure 1D:
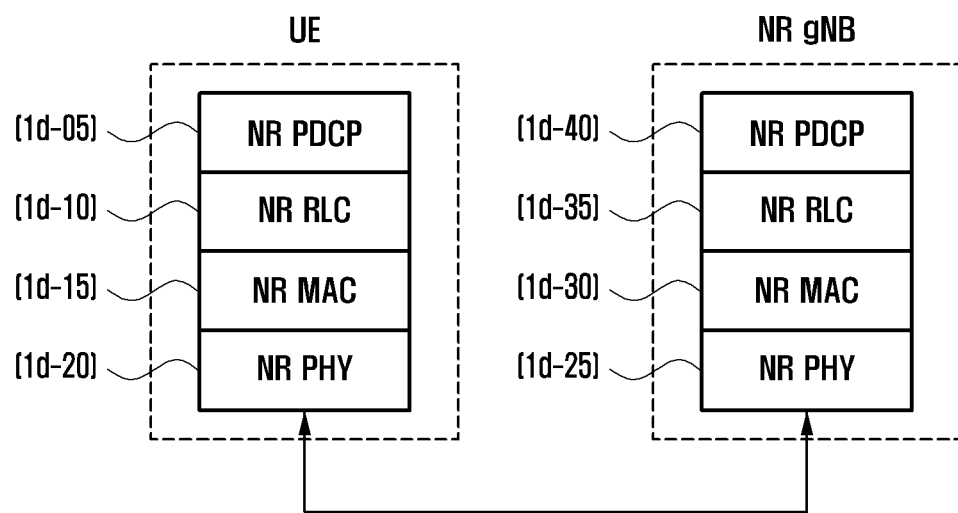
FIG. 1D is a block diagram of a radio protocol architecture of a next-generation mobile communication system according to an embodiment.

FIG. 1D is a block diagram of a radio protocol architecture of a next-generation mobile communication system according to an embodiment.

Referring to FIG. 1D the radio protocol of the next-generation mobile communication system includes NR PDCPs 1d-05 and 1d-40, NR RLC 1d-10 and 1d-35, and NR MAC 1d-15 and 1d-30, respectively, in a UE and an NR base station. Various functions of the NR PDCP 1d-05 and 1d-40 may include some of the following.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

The reordering function of the NR PDCP device refers to a function of sequentially reordering PDCP PDUs received from a lower layer based on a PDCP sequence number (SN). The reordering function may include a function of transmitting data in a reordered sequence to a higher layer, a function of directly transmitting data to a higher layer without taking the sequence into consideration, a function of reordering orders and recording lost PDCP PDUs, a function of making a status report on lost PDCP PDUs to the transmission side, and a function of requesting the retransmission of lost PDCP PDUs.

Various functions of the NR RLC 1d-10 and 1d-35 may include some of the following.

Transfer of upper layer PDUs

In-sequence delivery of upper layer PDUs

Out-of-sequence delivery of upper layer PDUs

Error Correction through ARQ

Concatenation, segmentation and reassembly of the RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC device refers to a function of sequentially transmitting RLC SDUs received from a lower layer to a higher layer, and may include a function of reassembling and transmitting multiple RLC SDUs if one RLC SDU has been originally segmented into the multiple RLC SDUs and received. The in-sequence delivery function may include reordering received RLC PDUs based on an RLC SN or a PDCP SN, reordering orders and recording lost RLC PDUs, transmitting a status report on lost RLC PDUs to the transmission side, requesting the retransmission of lost RLC PDUs, sequentially transmitting only RLC SDUs prior to a lost RLC SDU to a higher layer when the lost RLC SDU occurs, sequentially transmitting all of RLC SDUs received until a given timer expires to a higher layer when the timer expires although there is a lost RLC SDU, and sequentially transmitting all of RLC SDUs received so far to a higher layer when a given timer expires although there is a lost RLC SDU.

The in-sequence delivery function may include a function of processing RLC PDUs in order that the RLC PDUs are received (in order of arrival regardless of the order of a sequence number) and transmitting the RLC PDUs to a PDCP device regardless of their orders (i.e., out-of-sequence delivery). The in-sequence delivery function may include a function of receiving segments stored in a buffer or segments to be received subsequently, reconfiguring the segments in one complete RLC PDU, processing the RLC PDU, and transmitting the RLC PDU to the PDCP device. The NR RLC layer may not include a concatenation function. The concatenation function may be performed by the NR MAC layer or may be substituted with the multiplexing function of the NR MAC layer.

The out-of-sequence delivery function of the NR RLC device refers to a function of directly transmitting RLC SDUs received from a lower layer to a higher layer regardless of their order. The out-of-sequence delivery function may include a function of reassembling multiple RLC SDUs if one RLC SDU has been originally segmented into the multiple RLC SDUs and received. The out-of-sequence delivery function may include a function of storing the RLC SNs or PDCP SNs of received RLC PDUs, reordering their orders, and recording lost RLC PDUs.

The NR MAC 1d-15 and 1d-30 may be connected to multiple NR RLC layer devices configured in one UE. Various functions of the NR MAC may include some of the following.

Mapping between logical channels and transport channels
Multiplexing/demultiplexing of the MAC SDUs
Scheduling information reporting
Error correction through HARQ
Priority handling between logical channels of one UE
Priority handling between the UEs by means of dynamic scheduling
MBMS service identification
Transport format selection
Padding The NR PHY layer 1d-20 and 1d-25 may perform an operation of channel-coding and modulating higher layer data, generating the higher layer data into an OFDM symbol, transmitting the OFDM symbol to a radio channel or demodulating an OFDM symbol received through a radio channel, channel-decoding the OFDM symbol, and transferring the OFDM symbol to a higher layer.

In the LTE system, a terminal performs frequency measurement while performing a cell reselection procedure in the RRC idle mode. However, the terminal does not separately report frequency measurement results to a network. If the terminal discovers a suitable cell by performing the cell reselection procedure, camps on the cell, and then switches to the RRC connected mode by performing an RRC connection re-establishment procedure, a base station may perform and provide configurations to the terminal, regarding that the terminal will measure frequencies (e.g., a frequency list) or frequency bands, the terminal will perform measurement in an order based on configured priority for each frequency, the terminal will measure the intensity of a frequency using a filtering method (e.g., an L1, L2 or L3 filtering method, or the terminal will measure the frequency according to a calculation method using a coefficient) when measuring the frequency, the terminal will start measurement based on an event or a condition when measuring a frequency, the terminal will perform measurement based on a criterion when compared to a current serving cell (or a frequency on which the terminal now camps on), the terminal will report measured frequency results based on the event or a condition, the terminal will report a frequency only when the criterion or condition is satisfied when compared to a current serving cell (or a frequency on which the terminal now camps on), and the terminal will report frequency measurement results every period. The terminal measures corresponding frequencies based on a frequency configuration provided by the base station as described above, and reports frequency measurement results to the base station based on a corresponding event or condition. The base station may determine whether to apply frequency aggregation or DC to the terminal based on the frequency measurement results received from the terminal.

The present disclosure proposes methods for a terminal to start frequency measurement before the terminal switches to the RRC connected mode and to rapidly report measured results before or after the terminal enters the RRC connected mode in a next-generation mobile communication system.

The proposed methods may be very useful in configuring the frequency aggregation technology or DC technology in a terminal in an environment in which small cells are deployed in a macro cell.

FIG. 1E is a flow diagram showing a (1-1)-th embodiment in which a UE performs early measurement and may make a fast measurement report in a next-generation mobile communication system of the present disclosure.

Referring to FIG. 1E, the UE that performs early measurement and may make a fast measurement report may be a UE corresponding to one or a plurality of the following cases.

1. All of UEs having capability supporting early measurement and a method of reporting early measurement results 2. A UE that belongs to RRC inactive mode UEs and has been designated (e.g., designated by an indication) by a gNB to perform early measurement and a fast measurement report when the UE is made to shift from the RRC connected mode to the RRC inactive mode through an RRC message.

3. A UE in which mobile originated (MO) data has occurred, for example, a UE in which uplink transmission data is present 4. A UE that has received a paging message from a network because mobile terminated (MT) data occurs in the network (e.g., downlink data occurs) and has been designated (e.g., using an indication) to perform early measurement and a fast measurement report in a paging message.

5. If the amount of data to be transmitted is greater than a threshold in an RRC idle mode UE or an RRC inactive mode UE, the threshold may be set by a gNB through an RRC message or may be broadcasted through system information. The RRC message may be a message shifting from the RRC connected mode to the RRC idle mode or the RRC inactive mode or an RRC message that may be received by a UE when old access is configured.

6. A UE that belongs to RRC inactive mode UEs and has been designated (e.g., using an indication) by a gNB to perform early measurement and a fast measurement report when the UE is in a certain paging area if the UE is made to shift from the RRC connected mode to the RRC inactive mode through an RRC message, and a UE is present in a configured paging area.

The UE in the RRC idle mode or the RRC inactive mode at step 1e-05 may attempt a connection with a network in order to switch to the RRC connected mode for a specific cause (e.g., because data to be transmitted is present or in order to receive a paging message or to update a tracking area). Accordingly, the UE may transmit a preamble to a gNB as a first procedure for random access at step 1e-10. Furthermore, when the gNB successfully receives the preamble of the UE, the gNB may transmit a random access response (RAR) message to the UE. In this case, the gNB may include an indication of early measurement for the UE in the RAR message, and transmit the RAR message to the UE as a RAR. Furthermore, the gNB may include early measurement setup, regarding that the UE will measure frequencies or frequency bands (e.g., a frequency list), the UE will perform measurement in what order based on configured priority for each frequency, the UE will measure the intensity of a frequency using a filtering method (e.g., an L1, L2 or L3 filtering method, or the UE will measure the frequency according to a calculation method using a coefficient) when measuring the frequency, the UE will start measurement based on an event or a condition when measuring a frequency, the UE will perform measurement based on a criterion when compared to a current serving cell (or a frequency on which the UE now camps on), the UE will report measured frequency results based on the event or the condition, the UE will report a frequency only when the criterion or condition is satisfied when compared to a current serving cell (or a frequency on which the UE now camps on), and the UE will report frequency measurement results every period, in the RAR message, and may configure the RAR message for the UE.

In an embodiment, the gNB may broadcast pieces of configuration information related to frequency measurement through system information, include only an indication of early measurement in an RAR message, and indicate the same in the UE.

In an embodiment, the gNB may instruct the UE to reuse configuration information (e.g., a frequency list or priority for each frequency) related to frequency measurement when the UE performs cell reselection in the RRC idle mode, may include only an indication of early measurement in an RAR message, and may indicate the early measurement to the UE.

The conditions in which the UE starts frequency measurement when performing early measurement may be as follows.
1. When entering the RRC idle mode or the RRC inactive mode,
2. When receiving frequency measurement-related configuration information,
3. When receiving and identifying an early measurement indication through the RAR message,
4. When transmitting a preamble in a random access procedure, for example, when the UE stats a random access procedure, and
5. When the amount of data to be transmitted by the UE is greater than a threshold value.

The UE may start early measurement based on one or a plurality of the conditions. The UE may transmit a message (Msg 3) (e.g., an RRC Connection Request or RRC Connection Resume message) to the gNB at step 1e-25 while performing frequency measurement. The UE may receive a message (Msg 4) (e.g., an RRC Connection Setup or RRC Connection Resume message) from the gNB as a response to the Msg 3 and may be aware that the random access procedure is successful at step 1e-30, and may switch to the RRC connected mode at step 1e-35, When the UE transmits a message (Msg 5) (e.g., RRC Connection Setup Complete or RRC Connection Resume Complete) at step 1e-40, the UE may include an indication that the UE has performed early measurement and frequency measurement results to be reported are present in the message, and may transmit the message. In Msg 5, a new indication may be defined to indicate that early measurement results are present as the indication. rlf-InfoAvailable-r10 (e.g., an indication that a radio link failure (RLF) has occurred and information to be reported is present) or logMeasAvailable-r10 (e.g., an indication of providing notification that measured information is present) already defined in the RRC message (RRC Connection Setup Complete or RRC Connection Resume Complete) may be reused as the new indication at step 1e-40.

The gNB may identify that the UE has performed early measurement and has measurement results to be reported through the indication in Msg 5. In this case, the gNB may transmit a message that instructs the UE to report the measurement results to the UE in order to receive a fast measurement report at step 1e-45. For example, the gNB may request frequency measurement result information from the UE using UEinformationRequest through a down link dedicated control channel (DL-DCCH) message. When the UE receives the message, the UE may make a fast measurement report to the gNB at step 1e-55. For example, when the UE receives the message, the UE may report frequency measurement results using measurementReport through an uplink dedicated control channel (UL-DCCH) message. The frequency measurement results may include serving cell/frequency measurement results (e.g., NR synchronization signal reference signal received power (NR-SS RSRP)), neighbor cell/frequency measurement results of a serving cell/frequency, neighbor cell/frequency measurement results that may be measured by the UE, and a cell/frequency measurement results indicated to be measured.

The conditions in which the UE may stop early measurement may be as follows.
1. After transmitting Msg 5,
2. After receiving a message or command indicative of a report on frequency measurement results from the gNB,
3. After configuring a message for reporting frequency measurement results to the gNB,
4. After transmitting a message for reporting frequency measurement results to the gNB,
5. When failing in random access, and
6. When the gNB explicitly instructs the UE to stop early measurement through an RRC. For example, the explicit instruction is indicated using an indication in the RRC Connection Setup message or RRC Connection Resume message.

The UE may stop early measurement based on one or a plurality of the conditions at step 1e-50.

The UE may perform measurement on frequencies that may be measured, for example, supported frequencies, in fast frequency configuration-related information. In this case, the UE may preferentially select a frequency to be measured based on a certain set priority.

If the UE fails in contention resolution when performing early measurement, the UE may return to the transmission of a preamble and perform a random access procedure again. Thereafter, the UE may continue to perform early measurement although an early measurement indication or frequency configuration-related information is not present in a received random access response.

The UE may stop early measurement when the UE fails in the random access procedure.

The UE may perform early measurement although early measurement for a current serving cell or frequency is not indicated.

Figure 1F:
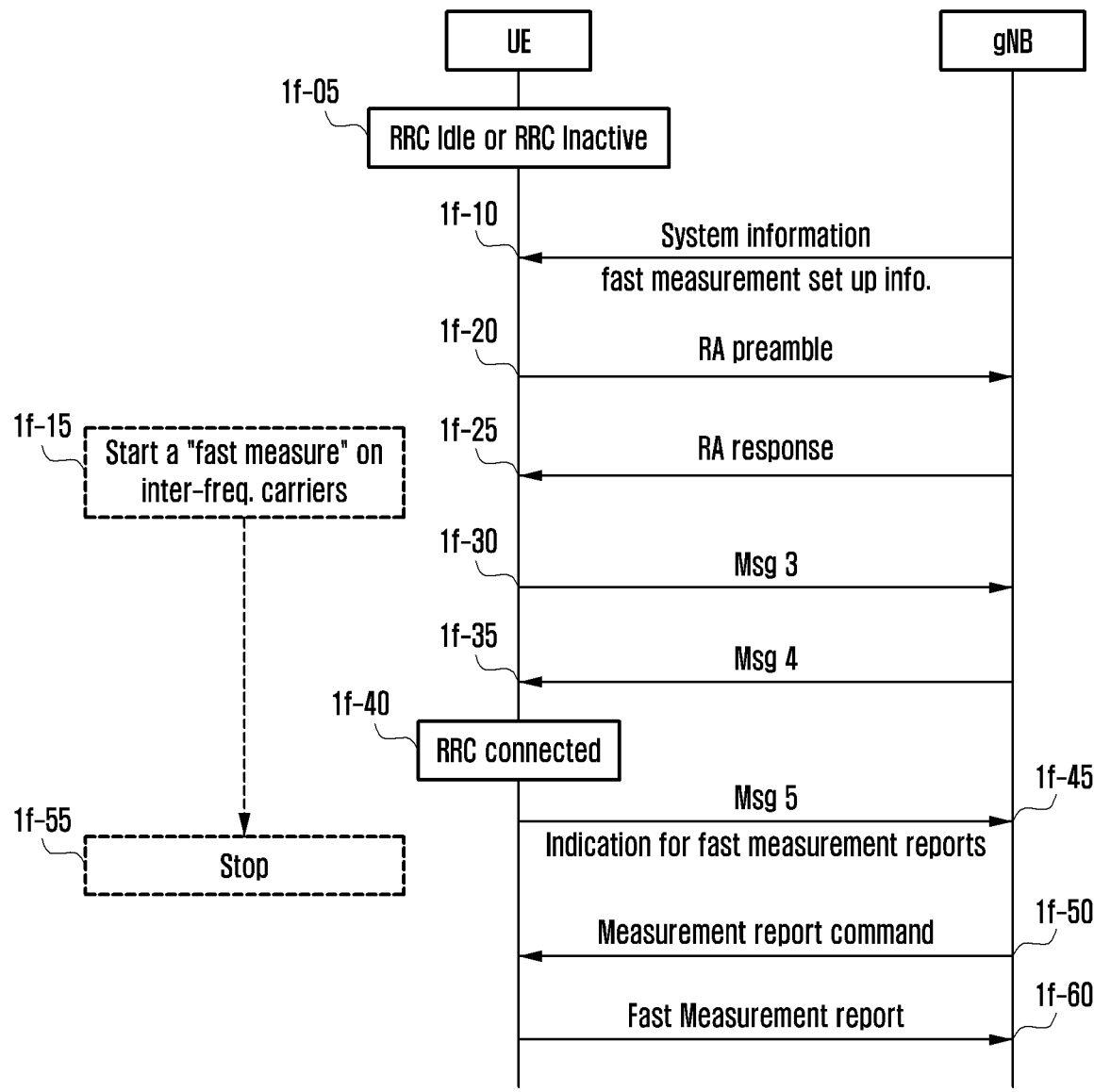
FIG. 1F is a flow diagram of a (1-2)-th embodiment in which a terminal performs early measurement and may make a fast measurement report in a next-generation mobile communication system of the present disclosure.

FIG. 1F is a flow diagram of a (1-2)-th embodiment in which a UE performs early measurement and may make a fast measurement report in a next-generation mobile communication system of the present disclosure.

Referring to FIG. 1F, the UE that performs early measurement and may make a fast measurement report may be a UE corresponding to one or a plurality of the following cases.
1. All of UEs having capability supporting early measurement and a method of reporting early measurement results
2. A UE that belongs to RRC inactive mode UEs and that has been designated (e.g., designated by an indication) by a gNB to perform early measurement and a fast measurement report when the UE is made to shift from the RRC connected mode to the RRC inactive mode through an RRC message.
3. A UE in which MO data has occurred, for example, a UE in which uplink transmission data is present
4. A UE that has received a paging message from a network because MT data occurs in the network (e.g., downlink data occurs) and that has been designated (e.g., designated by an indication) to perform early measurement and a fast measurement report in a paging message.
5. If the amount of data to be transmitted is greater than a given threshold in an RRC idle mode UE or an RRC inactive mode UE, the threshold may be set by a gNB through an RRC message or may be broadcasted through system information. The RRC message may be a message shifting from the RRC connected mode to the RRC idle mode or the RRC inactive mode or an RRC message that may be received by a UE when old access is configured.

6. A UE that belongs to RRC inactive mode UEs and that has been designated (e.g., designated by an indication) by a gNB to perform early measurement and a fast measurement report when the UE is in a certain paging area if the UE is made to shift from the RRC connected mode to the RRC inactive mode through an RRC message, and a UE present in a configured paging area.

The UE in the RRC idle mode or the RRC inactive mode at step 1*f*-05 may attempt a connection with a network in order to switch to the RRC connected mode for a certain cause (e.g., because data to be transmitted is present or in order to receive a paging message or to update a tracking area). The UE may read system information before the UE attempts the connection at step 1*f*-10. Early measurement setup, regarding that the UE will measure frequencies or frequency bands (e.g., a frequency list), the UE will perform measurement in an order based on configured priority for each frequency, the UE will measure the intensity of a frequency using a filtering method (e.g., an L1 filtering, L2 filtering or L3 filtering method, or the UE will measure the frequency according to a calculation method using a coefficient) when measuring the frequency, the UE will start measurement based on an event or a condition when measuring a frequency, the UE will perform measurement based on a criterion when compared to a current serving cell (or a frequency on which the UE now camps on), the UE will report measured frequency results based on the event or the condition, the UE will report a frequency only when the criterion or the condition is satisfied when compared to a current serving cell (or a frequency on which the UE now camps on), and the UE will report frequency measurement results every period, in the RAR message, and may configure the RAR message for the UE, which may be configured and included in the system information.

When identifying the early measurement setup, the UE may transmit a preamble to the gNB as a first procedure for random access at step 1*f*-20. Furthermore, when the gNB successfully receives the preamble of the UE, the UE may transmit a RAR message to the UE at step 1*f*-25. In this case, the gNB may include an indication instructing the UE to perform early measurement as a RAR, include the indication in the RAR message, and transmit the RAR message to the UE. Alternatively, although the indication is not included in the RAR message, the UE may start early measurement based on the early measurement setup received in the system information.

The conditions in which the UE starts frequency measurement when performing early measurement may be as follows.

1. When entering the RRC idle mode or the RRC inactive mode,
2. When receiving frequency measurement-related configuration information through the system information,
3. When receiving and identifying an early measurement indication through the RAR message,
4. When transmitting a preamble in a random access procedure, for example, when the UE starts a random access procedure, and
5. When the amount of data to be transmitted by the UE is greater than a threshold value.

The UE may start early measurement based on one or a plurality of the conditions. The UE may transmit a message (Msg 3) (e.g., an RRC connection request or RRC connection resume message) to the gNB at step 1*f*-30 while performing frequency measurement. Furthermore, the UE may receive a message (Msg 4) (e.g., an RRC Connection Setup or RRC Connection Resume message) from the gNB as a response to the Msg 3 and may be aware that the random access procedure is successful at step 1*f*-35, and may switch to the RRC connected mode step 1*f*-40. When the UE transmits a message (Msg 5) (e.g., RRC Connection Setup Complete or RRC Connection Resume Complete) at step 1*f*-45, the UE may include an indication that the UE has performed early measurement and frequency measurement results to be reported are present in the message, and may transmit the message. In the Msg 5, a new indication may be defined to indicate that early measurement results are present. rlf-InfoAvailable-r10 (e.g., an indication that an RLF has occurred and information to be reported is present) or logMeasAvailable-r10 (e.g., an indication providing a notification that measured information is present) already defined in the RRC message (RRC Connection Setup Complete or RRC Connection Resume Complete) may be used as the new indication.

The gNB may identify that the UE has performed early measurement and has measurement results to be reported through the indication in the Msg 5. In this case, the gNB may transmit a message that instructs the UE to report the measurement results to the UE in order to receive a fast measurement report at step 1*f*-50. For example, the gNB may request frequency measurement result information from the UE using UEinformationRequest through a DL-DCCH message. When the UE receives the message, the UE may make a fast measurement report to the gNB at step 1*f*-60. For example, when the UE receives the message, the UE may report frequency measurement results using measurementReport through the UL-DCCH message. The frequency measurement results may include serving cell/frequency measurement results (e.g., NR-SS RSRP), neighbor cell/frequency measurement results of a serving cell/frequency, neighbor cell/frequency measurement results that may be measured by the UE, and a cell/frequency measurement results indicated to be measured.

The conditions in which the UE may stop early measurement may include the following.

1. After transmitting the Msg 5,
2. After receiving a message or command indicative of a report on frequency measurement results from the gNB,
3. After configuring a message for reporting frequency measurement results to the gNB,
4. After transmitting a message for reporting frequency measurement results to the gNB,
5. When failing in random access, and
6. When the gNB explicitly instructs the UE to stop early measurement through an RRC. For example, the explicit instruction is indicated using an indication in the RRC Connection Setup message or RRC Connection Resume message.

The UE may stop early measurement based on one or a plurality of the conditions at step 1*f*-55.

The UE may perform measurement on frequencies that may be measured, for example, supported frequencies in fast frequency configuration-related information. In this case, the UE may preferentially select a frequency to be measured based on a certain set priority.

If the UE fails in contention resolution when performing early measurement, the UE may return to the transmission of a preamble and perform a random access procedure again. Thereafter, the UE may continue to perform early measurement although an early measurement indication or frequency configuration-related information is not present in a received random access response.

The UE may stop early measurement when the UE fails in the random access procedure.

The UE may perform early measurement although early measurement for a current serving cell or frequency is not indicated.

Figure 1G:
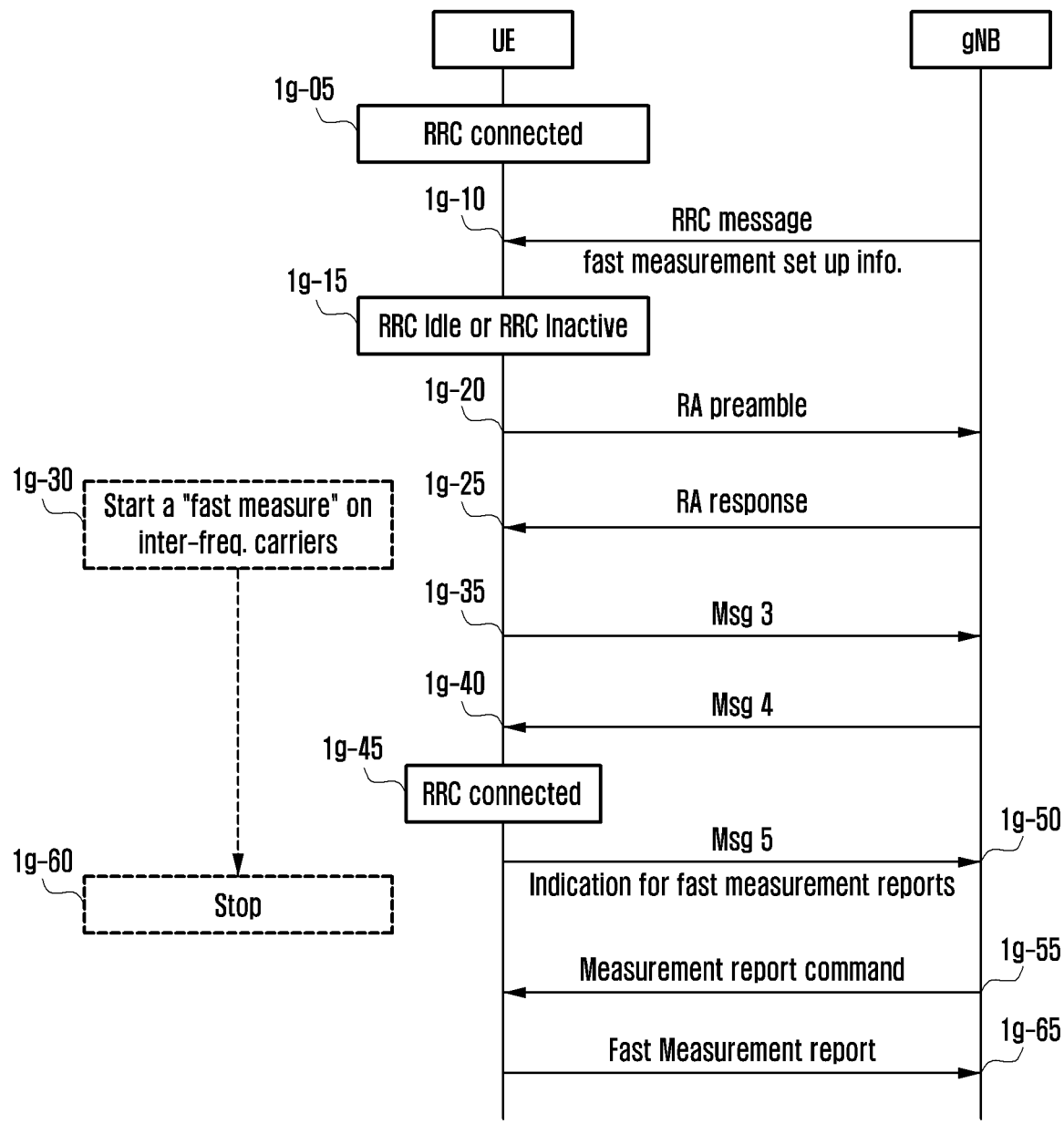
FIG. 1G is a flow diagram showing a (1-3)-th embodiment in which a terminal performs early measurement and may make a fast measurement report in a next-generation mobile communication system of the present disclosure.

FIG. 1G is a flow diagram of a (1-3)-th embodiment in which a UE performs early measurement and may make a fast measurement report in a next-generation mobile communication system of the present disclosure.

Referring to FIG. 1G, the UE that performs early measurement and may make a fast measurement report may be a UE corresponding to one or a plurality of the following cases.

1. All of UEs having capability supporting early measurement and a method of reporting early measurement results 2. A UE that belongs to RRC inactive mode UEs and that has been designated (e.g., designated by an indication) by a gNB to perform early measurement and a fast measurement report when the UE is made to shift from the RRC connected mode to the RRC inactive mode through an RRC message.

3. A UE in which MO data has occurred, for example, a UE in which uplink transmission data is present 4. A UE that has received a paging message from a network because MT data occurs in the network (e.g., downlink data occurs) and that has been designated (e.g., designated by an indication) to perform early measurement and a fast measurement report in a paging message.

5. If the amount of data to be transmitted is greater than a threshold in an RRC idle mode UE or an RRC inactive mode UE, the threshold may be set by a gNB through an RRC message or may be broadcasted through system information. The RRC message may be a message shifting from the RRC connected mode to the RRC idle mode or the RRC inactive mode or an RRC message that may be received by a UE when old access is configured.

6. A UE that belongs to RRC inactive mode UEs and that has been designated (e.g., by an indication) by a gNB to perform early measurement and a fast measurement report when the UE is in a certain paging area if the UE is made to shift from the RRC connected mode to the RRC inactive mode through an RRC message, and a UE is present in a configured paging area.

The UE in the RRC connected mode at step 1g-05 may switch to the RRC idle mode or the RRC inactive mode by the gNB for a certain cause (e.g., there is no transmission/reception of data for a given time) at step 1g-15. When the mode of the UE switches, the gNB transmits an RRC message at step 1g-10. For example, the RRC message may be an RRC connection release message or an RRC connection suspend message. Early measurement setup, regarding that the UE will measure which frequencies or which frequency bands (e.g., a frequency list), the UE will perform measurement in an order based on configured priority for each frequency, the UE will measure the intensity of a frequency using a filtering method (e.g., an L1, L2 or L3 filtering method, or the UE will measure the frequency according to a calculation method using a coefficient) when measuring the frequency, the UE will start measurement based on an event or a condition when measuring a frequency, the UE will perform measurement based on a criterion when compared to a current serving cell (or a frequency on which the UE now camps on), the UE will report measured frequency results based on the event or the condition, the UE will report a frequency only when the criterion or the condition is satisfied when compared to a current serving cell (or a frequency on which the UE now camps on), and the UE will report frequency measurement results every period, in the RAR message, and may configure the RAR message for the UE, which may be included and configured in the RRC message.

In an embodiment, the RRC message that changes the mode of the UE does not include early measurement setup, such as that described above, but may only include an indication of early measurement. Furthermore, the early measurement setup may reuse frequency measurement information received through system information or used for cell reselection in the RRC idle mode.

In an embodiment, the RRC message that changes the mode of the UE does not include early measurement setup, such as that described above. When there is an indication of early measurement and the UE switches to the RRC inactive mode, a paging area may be configured, and early measurement may be indicated to be performed in only the paging area. The early measurement setup information may reuse frequency measurement information received through system information or used for cell reselection in the RRC idle mode.

In an embodiment, the RRC message that changes the mode of the UE includes early measurement setup, such as that described above. When there is an indication of early measurement and the UE switches to the RRC inactive mode, a paging area may be configured, and early measurement may be indicated to be performed in only the paging area.

After identifying the early measurement setup, the UE may transmit a preamble to the gNB as a first procedure for random access if there is the reason of accessing a network due to a certain cause at step 1g-20, When the gNB successfully receives the preamble of the UE, the UE may transmit a RAR message to the UE at step 1g-25. In this case, the gNB may include an indication instructing the UE to perform early measurement as a random access response, include the indication in the RAR message, and transmit the RAR message to the UE. Alternatively, although the indication is not included in the RAR message, the UE may start early measurement based on the early measurement setup received in the system information.

The conditions in which the UE starts frequency measurement when performing early measurement may include the following.

1. When entering the RRC idle mode or the RRC inactive mode,

2. When receiving frequency measurement-related configuration information,

3. When receiving and identifying an early measurement indication through the RAR message, 4. When transmitting a preamble in a random access procedure, that is, when the UE stats a random access procedure, and 5. When the amount of data to be transmitted by the UE is greater than a threshold value.

The UE may start early measurement based on one or a plurality of the conditions. The UE may transmit a message (Msg 3) (e.g., an RRC connection request or RRC connection resume message) to the gNB at step 1g-35 while performing frequency measurement. The UE may receive a message (Msg 4) (e.g., an RRC Connection Setup or RRC Connection Resume message) from the gNB as a response to the Msg 3 and may be aware that the random access procedure is successful at step 1g-40, and may switch to the RRC connected mode at step 1g-45. When the UE transmits a message (Msg 5) (e.g., RRC Connection Setup Complete or RRC Connection Resume Complete) at step 1g-50, the UE may include an indication that the UE has performed early measurement and frequency measurement results to be reported are present in the message, and transmit the message. In the Msg 5, a new indication may be defined to indicate that early measurement results are present. rlfInfoAvailable-r10 (i.e., indication that an RLF has occurred and information to be reported is present) or logMeasAvailable-r10 (i.e., indication providing a notification that measured information is present) already defined in the RRC message (RRC Connection Setup Complete or RRC Connection Resume Complete) may be used as the new indication.

The gNB may identify that the UE has performed early measurement and has measurement results to be reported through the indication in the Msg 5. The gNB may transmit a message that instructs the UE to report the measurement results to the UE in order to receive a fast measurement report at step 1g-55. For example, the gNB may request frequency measurement result information from the UE using UEinformationRequest through a DL-DCCH message. When the UE receives the message, the UE may make a fast measurement report to the gNB at step 1g-65. For example, when the UE receives the message, the UE may report frequency measurement results using measurementReport through the UL-DCCH message. The frequency measurement results may include serving cell/frequency measurement results (e.g., NR-SS RSRP), neighbor cell/frequency measurement results of a serving cell/frequency, neighbor cell/frequency measurement results that may be measured by the UE, and cell/frequency measurement results indicated to be measured.

The conditions in which the UE may stop early measurement may include the following.

1. After transmitting the Msg 5,
2. After receiving a message or command indicative of a report on frequency measurement results from the gNB,
3. After configuring a message for reporting frequency measurement results to the gNB,
4. After transmitting a message for reporting frequency measurement results to the gNB,
5. When failing in random access, and
6. When the gNB explicitly instructs the UE to stop early measurement through an RRC. For example, the explicit instruction is indicated using an indication in the RRC Connection Setup message or RRC Connection Resume message.

The UE may stop early measurement based on one or a plurality of the conditions at step 1g-60.

The UE performs measurement on frequencies that may be measured, for example, supported frequencies, in fast frequency configuration-related information. In this case, the UE may preferentially select a frequency to be measured based on a certain set priority.

If the UE fails in contention resolution when performing early measurement, the UE may return to the transmission of a preamble and perform a random access procedure again. Thereafter, the UE may continue to perform early measurement although an early measurement indication or frequency configuration-related information is not present in a received random access response.

The UE may stop early measurement when the UE fails in the random access procedure.

The UE may perform early measurement although early measurement for a current serving cell or frequency is not indicated.

A gNB can receive a fast measurement report through the first, second and third embodiments in which a UE performs early measurement and makes a fast measurement report in a next-generation mobile communication system of the present disclosure illustrated in FIGS. 1E, 1F and 1G. Accordingly, the gNB can rapidly configure frequency aggregation or DC in the UE.

Figure 1H:
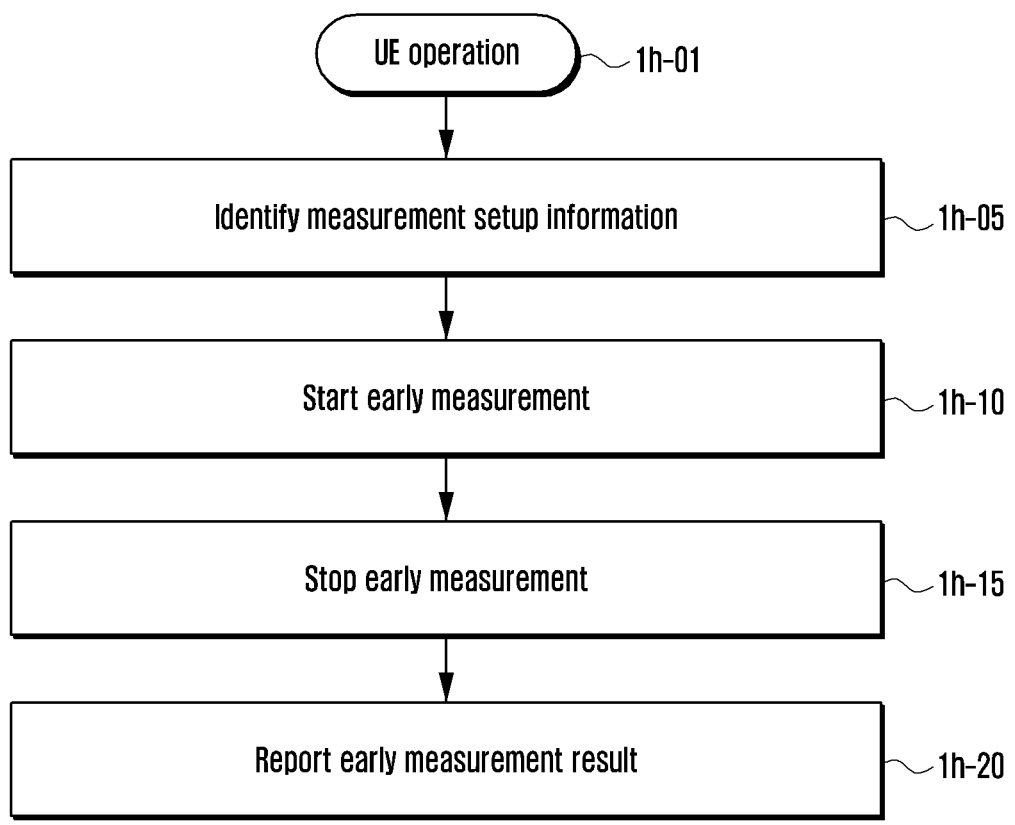
FIG. 1H is a flowchart of a terminal operation for a terminal to perform early measurement and make a fast measurement report in a next-generation mobile communication system according to an embodiment.

FIG. 1H is a flowchart of a UE operation for a UE to perform early measurement and make a fast measurement report in a next-generation mobile communication system according to an embodiment.

Referring to FIG. 1H, a UE 1h-01 may identify early measurement setup in a random access response message or system information or an RRC message that changes the mode of the UE or the reuse of early measurement setup for cell reselection used in the RRC idle mode of the UE, as described in the first or second or third embodiment at step 1h-05. After identifying the early measurement setup, the UE may start early measurement based on one or a plurality of the following conditions at step 1h-10.

1 When entering the RRC idle mode or the RRC inactive mode,
2. When receiving frequency measurement-related configuration information,
3. When receiving and identifying an early measurement indication through the RAR message,
4. When transmitting a preamble in a random access procedure, for example, when the UE stats a random access procedure, and
5. When the amount of data to be transmitted by the UE is greater than a threshold value.

After performing the frequency measurement, the UE may stop early measurement based on one or a plurality of the following conditions as described above at step 1h-15.

1. After transmitting the Msg 5,
2. After receiving a message or command indicative of a report on frequency measurement results from the gNB,
3. After configuring a message for reporting frequency measurement results to the gNB,
4. After transmitting a message for reporting frequency measurement results to the gNB,
5. When failing in random access, and
6. When the gNB explicitly instructs the UE to stop early measurement through an RRC. For example, the explicit instruction is indicated using an indication in the RRC Connection Setup message or RRC Connection Resume message.

When the UE completes the early measurement results, the UE may indicate contents that frequency measurement results are present with respect to the gNB. When the gNB requests the frequency measurement result information, the UE may report the frequency measurement result information by transmitting the frequency measurement result to the gNB at step 1h-20.

Figure 1I:
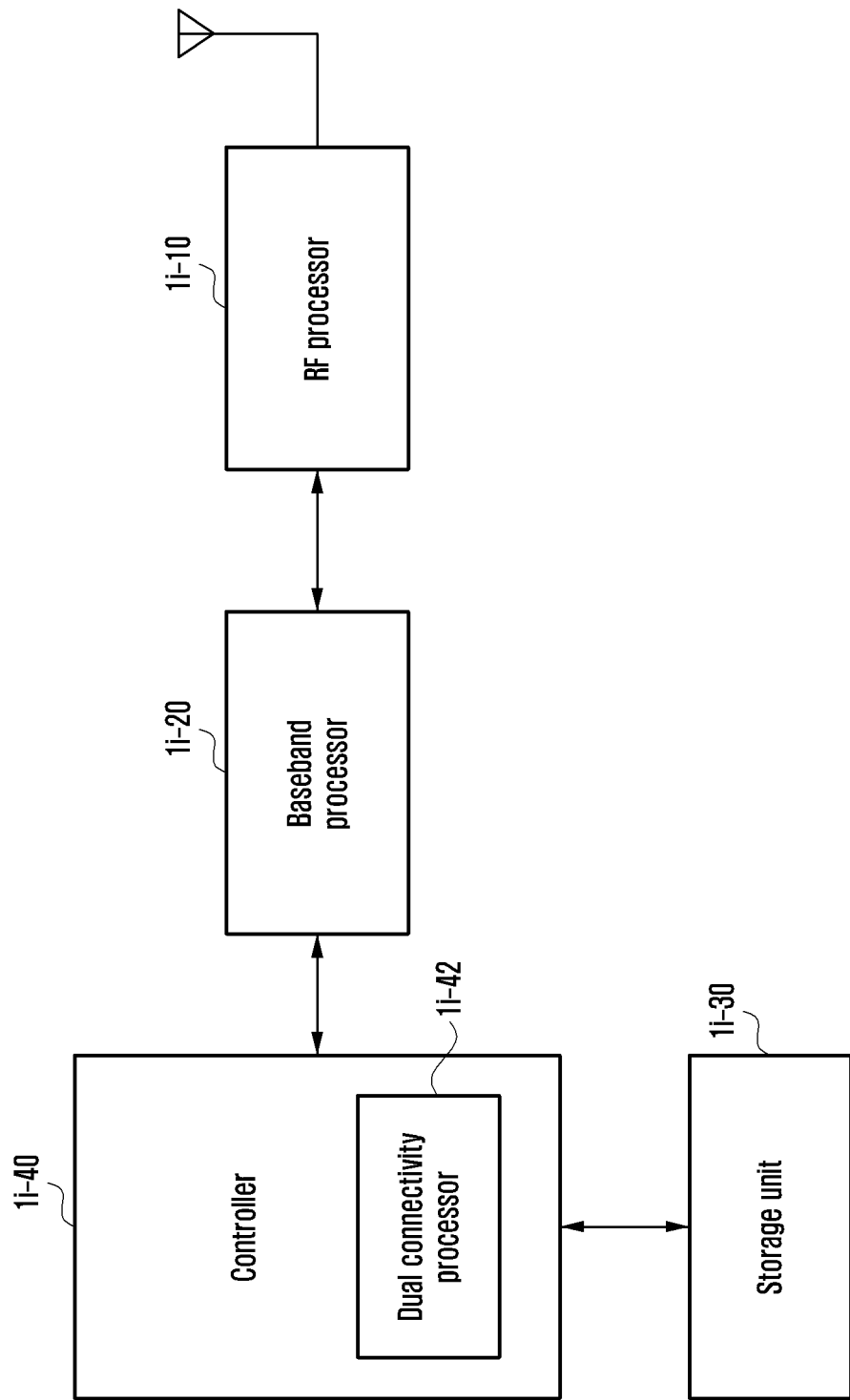
FIG. 1I is a block diagram of a terminal according to an embodiment.

FIG. 1I is a block diagram of a UE according to an embodiment.

Referring to FIG. 1I, the UE may include a radio frequency (RF) processor 1i-10, a baseband processor 1i-20, a storage unit 1i-30, and a controller 1i-40.

The RF processor 1i-10 may perform functions for transmitting/receiving a signal through a radio channel, such as band conversion and amplification of a signal. For example, the RF processor 1i-10 may up-convert a baseband signal received from the baseband processor 1i-20 into an RF band signal, transmit the RF band signal through an antenna, and down-convert an RF band signal received through the antenna into a baseband signal. For example, the RF processor 1*i*-10 may include a transmission filter, a reception filter, an amplifier, a mixer, an oscillator, a digital-to-analog convertor (DAC); and an analog-to-digital convertor (ADC). In FIG. 1I, only one antenna is shown, but the UE may include multiple antennas. The RF processor 1*i*-10 may include multiple RF chains, and may perform beamforming.

For the beamforming, the RF processor 1*i*-10 may adjust a phase and a size of each signal transmitted/received through multiple antennas or antenna elements.

The RF processor 1*i*-10 may perform MIMO. When the MIMO operation is performed, the RF processor 1*i*-10 may receive multiple layers. The RF processor 1*i*-10 may properly configure multiple antenna or antenna elements under the control of the controller 1*i*-40, and may perform received beam swiping or adjust a direction and beam width of a received beam so that the received beam cooperates with a transmitted beam.

The baseband processor 1*i*-20 may perform a baseband signal and inter-bit stream conversion function based on a physical layer standard of a system. For example, when data is transmitted, the baseband processor 1*i*-20 may generate complex symbols by coding and modulating a transmission bit stream. When data is received, the baseband processor 1*i*-20 may reconstruct a reception bit stream from a baseband signal received from the RF processor 1*i*-10 through modulation and demodulation. For example, if an OFDM scheme is applied, when data is transmitted, the baseband processor 1*i*-20 may generate complex symbols by coding and modulating a transmission bit stream, map the complex symbols to subcarriers, and configure OFDM symbols through an inverse fast Fourier transform (IFFT) operation and cyclic prefix (CP) insertion. When data is received, the baseband processor 1*i*-20 may segment a baseband signal received from the RF processor 1*i*-10 in an OFDM symbol unit, reconstruct signals mapped to subcarriers through a fast Fourier transform (FFT) operation, and reconstruct a reception bit stream through modulation and demodulation.

The baseband processor 1*i*-20 and the RF processor 1*i*-10 may transmit and receive signals as described above. Accordingly, the baseband processor 1*i*-20 and the RF processor 1*i*-10 may be referred to as a transmitter, a receiver, a transceiver or a communication unit. Furthermore, at least one of the baseband processor 1*i*-20 and the RF processor 1*i*-10 may include multiple communication modules in order to support different multiple RATs. At least one of the baseband processor 1*i*-20 and the RF processor 1*i*-10 may include different communication modules in order to process signals of different frequency bands. For example, the different RATs may include an LTE network and an NR network. The different frequency bands may include a super high frequency (SHF) (e.g., 2.5 GHz, 5 GHz) band and a millimeter wave (e.g., 60 GHz) band.

The storage unit 1*i*-30 may store data, such as a basic program, an application program, and configuration information for the operation of the UE. The storage unit 1*i*-30 may provide stored data in response to a request from the controller 1*i*-40.

The controller 1*i*-40 may control an overall operation of the UE. For example, the controller 1*i*-40 may transmits/ receive a signal through the baseband processor 1*i*-20 and the RF processor 1*i*-10. The controller 1*i*-40 may write data in the storage unit 1*i*-40 and read data from the storage unit 40. In this case, the controller 1*i*-40 may include at least one processor. For example, the controller 1*i*-40 may include a communication processor performing control for communication and an application processor (AP) controlling a higher layer, such as an application program.

Figure 1J:
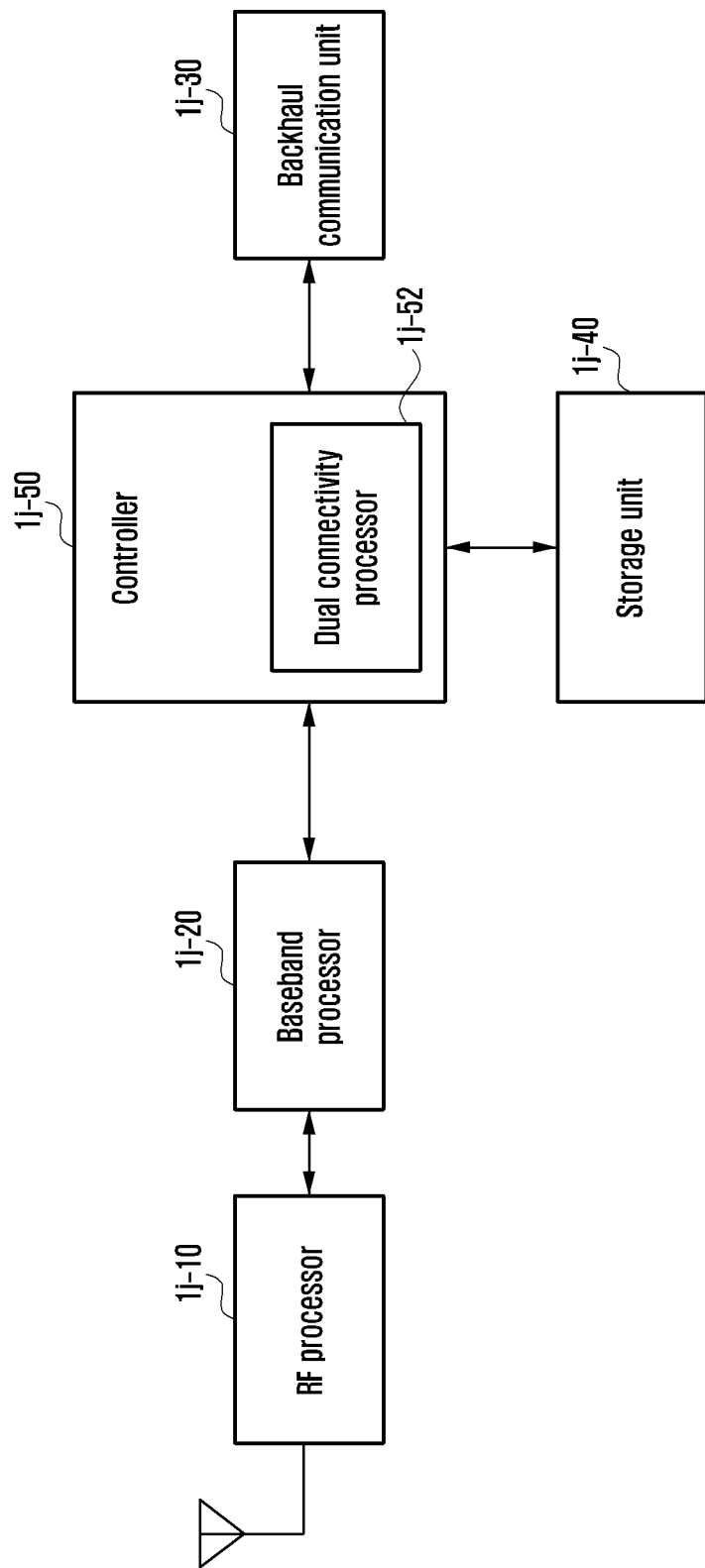
FIG. 1J is a block diagram of a transmission and reception point (TRP) in a wireless communication system according to an embodiment.

FIG. 1J is a block diagram of an eNB in a wireless communication system according to an embodiment.

Referring to FIG. 1J, the eNB may include an RF processor 1*j*-10, a baseband processor 1*j*-20, a backhaul communication unit 1*j*-30, a storage unit 1*j*-40, and a controller 1*j*-50.

The RF processor 1*j*-10 may perform a function for transmitting/receiving a signal through a radio channel, such as band conversion and amplification of a signal. The RF processor 1*j*-10 may up-convert a baseband signal received from the baseband processor 1*j*-20 into an RF band signal, transmit the RF band signal through an antenna, and down-convert an RF band signal received through the antenna into a baseband signal. The RF processor 1*j*-10 may include a transmission filter, a reception filter, an amplifier, a mixer, an oscillator, a DAC, and an ADC. In FIG. 1J, only one antenna is shown, but the eNB may include multiple antennas. The RF processor 1*j*-10 may include multiple RF chains. The RF processor 1*j*-10 may perform beamforming.

For the beamforming, the RF processor 1*j*-10 may adjust the phase and size of each of signals transmitted/received multiple antennas or antenna elements. The RF processor may perform a downlink MIMO operation by transmitting one or more layers.

The baseband processor 1*j*-20 may perform a baseband signal and inter-bit stream conversion function based on a physical layer standard of a first RAT. For example, when data is transmitted, the baseband processor 1*j*-20 may generate complex symbols by coding and modulating a transmission bit stream. When data is received, the baseband processor 1*j*-20 may reconstruct a reception bit stream from a baseband signal received from the RF processor 1*j*-10 through modulation and demodulation. For example, if the OFDM scheme is applied, when data is transmitted, the baseband processor 1*j*-20 may generate complex symbols by coding and modulating a transmission bit stream, map the complex symbols to subcarriers, and configure OFDM symbols through an IFFT operation and CP insertion. When data is received, the baseband processor 1*j*-20 may segment a baseband signal received from the RF processor 1*j*-10 in an OFDM symbol unit, reconstruct signals mapped to subcarriers through FFT operation, and reconstruct a reception bit stream through modulation and demodulation. The baseband processor 1*j*-20 and the RF processor 1*j*-10 may transmit and receive signals as described above. Accordingly, the baseband processor 1*j*-20 and the RF processor 1*j*-10 may be referred to as a transmitter, a receiver, a transceiver, a communication unit or a wireless communication unit.

The backhaul communication unit 1*j*-30 may provide an interface for performing communication with other nodes within a network.

The storage unit 1*j*-40 may store data, such as a basic program, an application program, and configuration information for the operation of the primary eNB. For example, the storage unit 1*j*-40 may store information on a bearer allocated to an accessed UE and measurement results reported by an accessed UE. The storage unit 1*j*-4 may store information, for example, a criterion for determining whether to provide a UE with multiple connections. The storage unit 1*j*-40 may provide stored data in response to a request from the controller 1*j*-50.

The controller 1*j*-50 may control an overall operation of the primary eNB. For example, the controller 1*j*-5 may transmits/receive a signal through the baseband processor 1*j*-20 and the RF processor 1*j*-10 or through the backhaul communication unit 1*j*-30. Furthermore, the controller 1*j*-50 may write data in the storage unit 1*j*-40 and read data from the storage unit 1j-40. In this case, the controller 1j-50 may include at least one processor.

Second Embodiment

Figure 2A:
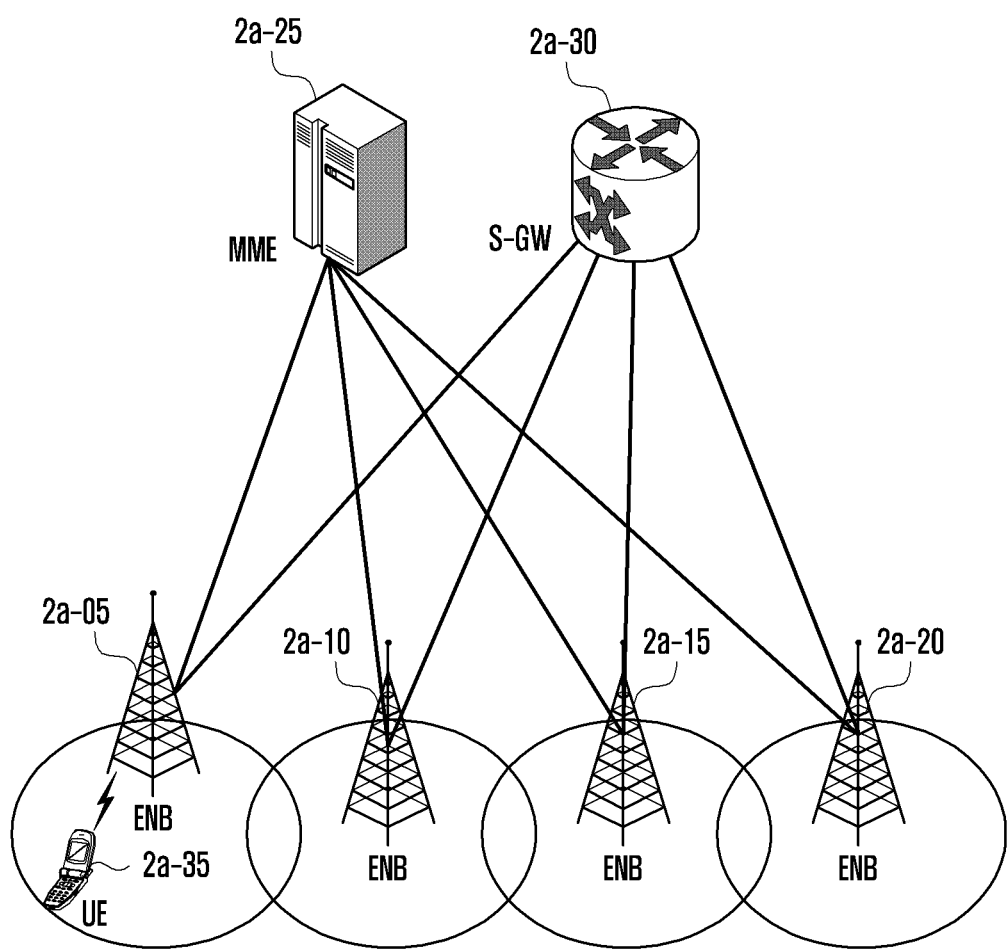
FIG. 2A is an illustration of an LTE system according to an embodiment.

FIG. 2A is an illustration of an LTE system according to an embodiment.

Referring to FIG. 2A, an RAN of the LTE system includes geNBs (also referred to as eNBs, node Bs, geNBs, or base stations) 2a-05, 2a-10, 2a-15, and 2a-20, an MME 2a-25, and an S-GW 2a-30. A UE 2a-35 accesses an external network through the eNBs 2a-05-2a-20 and the S-GW 2a-30.

The eNBs 2a-05-2a-20 correspond to the node Bs of an existing UMTS system. The eNB is connected to the UE 2a-35 through a radio channel and performs a more complex function than the existing node B. In the LTE system, all types of user traffic including a real-time service, such as VoIP, through the Internet protocol, are served through a shared channel. Accordingly, a device that performs schedules by collecting state information, such as a buffer state, available transmission power state, and a channel state of UEs, is necessary. The eNBs 2a-05-2a-20 are in charge of such a device. In general, one eNB controls multiple cells. For example, in order to implement the transfer rate of 100 Mbps, the LTE system uses OFDM as a RAT in the 20 MHz bandwidth, for example. The LTE system adopts an AMC scheme for determining a modulation scheme and a channel coding rate based on the channel state of a UE. The S-GW 2a-30 provides a data bearer and generates or removes a data bearer under the control of the MME 2a-25. The MME is in charge of various control functions in addition to a mobility management function for a UE, and is connected to multiple eNBs, FIG. 2B is a block diagram of a radio protocol architecture in an LTE system according to an embodiment.

Figure 2B:
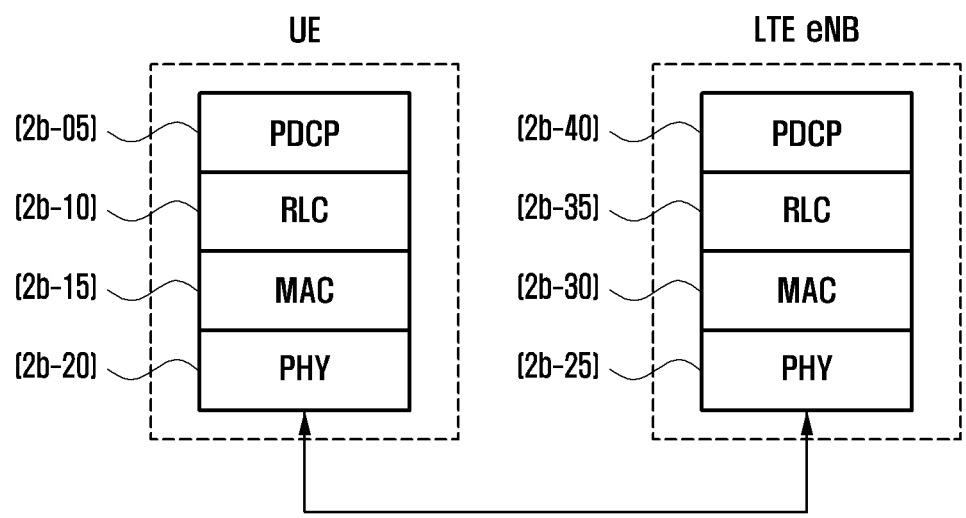
FIG. 2B is a block diagram of a radio protocol architecture in an LTE system according to an embodiment.

Referring to FIG. 2B, the radio protocol of the LTE system includes PDCPs 2b-05 and 2b-40, RLCs 2b-10 and 2b-35, and MACs 2b-15 and 2b-30 in a UE and an eNB, respectively. The PDCPs 2b-05 and 2b-40 are in charge of an operation, such as IP header compression/restoration. Various functions of the PDCP 2b-05, 2b-40 are summarized as follows.
  Header compression and decompression: ROHC only
  Transfer of user data
  In-sequence delivery of upper layer PDUs in a PDCP re-establishment procedure for RLC AM
  Reordering function (for split bearers in DC (only support for RLC AM): PDCP PDU routing for transmission and PDCP PDU reordering for reception)
  Duplicate detection of lower layer SDUs in a PDCP re-establishment procedure for RLC AM
  Retransmission of PDCP SDUs at handover and, for split bearers in DC, of PDCP PDUs in a PDCP data-recovery procedure, for RLC AM
  Ciphering and deciphering
  Timer-based SDU discard in uplink.

The RLCs 2b-10 and 2b-35 reconfigure a PDCP PDU in a proper size and performs an ARQ operation. Various functions of the RLC are summarized as follows.
  Transfer of upper layer PDUs
  ARQ function (error correction through ARQ (only for AM data transfer))
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MACs 2b-15 and 2b-30 are connected to multiple RLC layer devices configured in one UE, and performs an operation of multiplexing RLC PDUs with a MAC PDU and demultiplexing RLC PDUs from a MAC PDU. Various functions of the MAC are summarized as follows.
  Mapping between logical channels and transport channels
  Multiplexing/demultiplexing of MAC SDUs belonging to one or different logical channels into/from TB delivered to/from the physical layer on transport channels)
  Scheduling information reporting
  Error correction through HARM
  Priority handling between logical channels of one UE
  Priority handling between UEs by means of dynamic scheduling
  MBMS service identification
  Transport format selection
  Padding A physical layers 2b-20 and 2b-25 perform an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OFDM symbol to a higher layer.

Figure 2C:
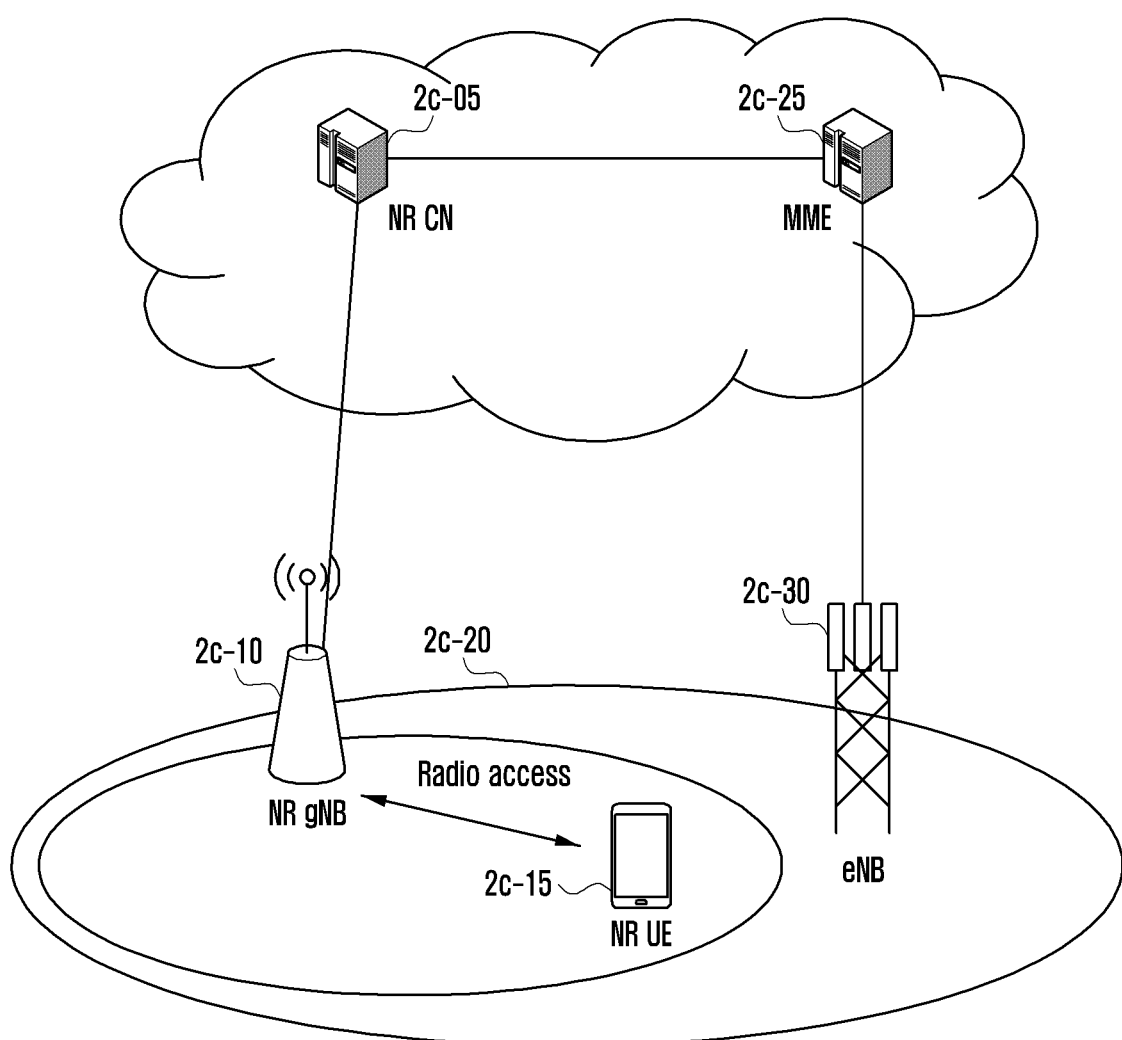
FIG. 2C is an illustration of a next-generation mobile communication system according to an embodiment.

FIG. 2C is illustration of a next-generation mobile communication system according to an embodiment.

Referring to FIG. 2C, a radio access network of the next-generation mobile communication system includes a NR node B (also referred to as an NR gNB or an NR base station) 2c-10 and an NR CN 2c-05, A NR UE (or a terminal) 2c-15 accesses an external network through the NR gNB 2c-10 and the NR CN 2c-05.

The NR gNB 2c-10 corresponds to an eNB of an existing LTE system. The NR gNB is connected to the NR UE 2c-15 through a radio channel, and may provide an excellent service as compared to the existing node B. The next-generation mobile communication system requires a device for performing scheduling by collecting state information, such as a buffer state, available transmission power state, and a channel state of UEs, because all types of user traffic are served through a shared channel. The NR gNB 2c-10 is in charge of the device. In general, one NR gNB controls multiple cells.

In order to implement ultra-high speed data transfer compared to the existing LTE, the next-generation mobile communication system may have the existing maximum bandwidth or more and may additionally graft beamforming technology using OFDM as a RAT. The next-generation mobile communication system adopts the AMC scheme that determines a modulation scheme and a channel coding rate based on the channel state of a UE. The NR CN 2c-05 performs functions, such as mobility support, bearer configuration, and QoS configuration. The NR CN 2c-05 is in charge of various control functions in addition to a mobility management function for a UE, and is connected to multiple eNBs. Furthermore, the next-generation mobile communication system may also operate in conjunction with the existing LTE system. The NR CN 2c-05 is connected to an MME 2c-25 through a network interface. The MME 2c-25 is connected to an eNB 2c-30, that is, the existing eNB.

Figure 2D:
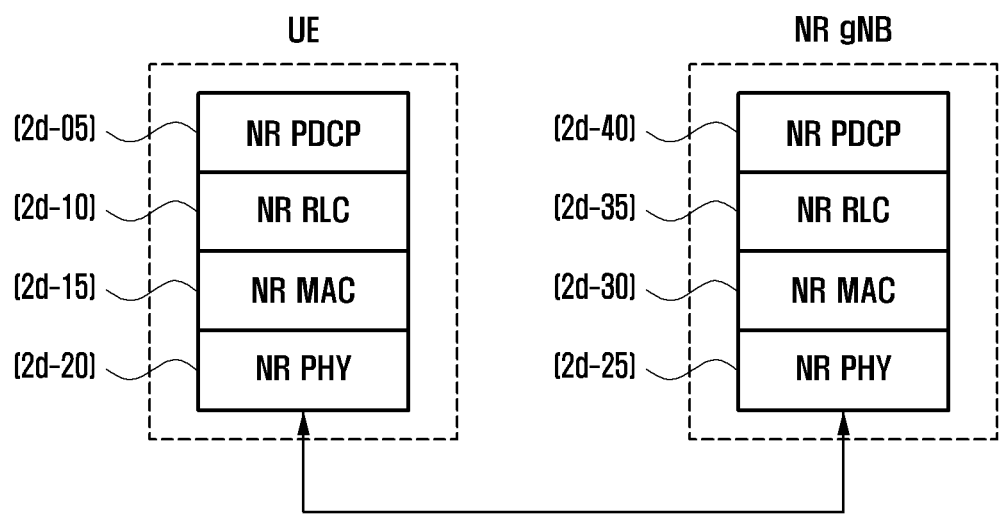
FIG. 2D is a block diagram of a radio protocol architecture of a next-generation mobile communication system according to an embodiment.

FIG. 2D is a block diagram of a radio protocol architecture of a next-generation mobile communication system according to an embodiment.

Referring to FIG. 2D, the radio protocol of the next-generation mobile communication system includes NR PDCPs 2d-05 and 2d-40, NR RLCs 2d-10 and 2d-35, and NR MACs 2d-15 and 2d-30, respectively, in a UE and an NR base station. Various functions of the NR PDCPs 2d-05 and 2d-40 may include some of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink.

The reordering function of the NR PDCP device may refer to a function of sequentially reordering PDCP PDUs received from a lower layer based on a PDCP SN. The reordering function may include a function of transmitting data in a reordered sequence to a higher layer, a function of directly transmitting data to a higher layer without taking the sequence into consideration, a function of reordering orders and recording lost PDCP PDUs, a function of making a status report on lost PDCP PDUs to the transmission side, and a function of requesting the retransmission of lost PDCP PDUs.

Various functions of the NR RLCs 2d-10 and 2d-35 may include some of the following.

Transfer of upper layer PDUs
    In-sequence delivery of upper layer PDUs
    Out-of-sequence delivery of upper layer PDUs
    Error Correction through ARQ
    Concatenation, segmentation and reassembly of the RLC SDUs
    Re-segmentation of RLC data PDUs
    Reordering of RLC data PDUs
    Duplicate detection
    Protocol error detection
    RLC SDU discard
    RLC re-establishment The in-sequence delivery function of the NR RLC device may refer to a function of sequentially transmitting RLC SDUs received from a lower layer to a higher layer. The in-sequence delivery function may include a function of reassembling and transmitting multiple RLC SDUs if one RLC SDU has been originally segmented into the multiple RLC SDUs and received. The in-sequence delivery function may include a function of reordering received RLC PDUs based on an RLC SN or a PDCP SN, a function of reordering orders and recording lost RLC PDUs, a function of transmitting a status report on lost RLC PDUs to the transmission side, a function of requesting the retransmission of lost RLC PDUs, a function of sequentially transmitting only RLC SDUs prior to a lost RLC SDU to a higher layer when the lost RLC SDU occurs, a function of sequentially transmitting all of RLC SDUs received until a given timer expires to a higher layer when the timer expires although there is a lost RLC SDU, and a function of sequentially transmitting all of RLC SDUs received so far to a higher layer when a given timer expires although there is a lost RLC SDU. The in-sequence delivery function may include a function of processing RLC PDUs in an order that the RLC PDUs are received (in an order of arrival regardless of the order of SNs) and transmitting the RLC PDUs to a PDCP device regardless of their order (e.g., out-of-sequence delivery). The in-sequence delivery function may include a function of receiving segments stored in a buffer or segments to be received subsequently, reconfiguring the segments in one complete RLC PDU, processing the RLC PDU, and transmitting the RLC PDU to the PDCP device. The NR RLC layer may not include a concatenation function. The concatenation function may be performed by the NR MAC layer or may be substituted with the multiplexing function of the NR MAC layer.

The out-of-sequence delivery function of the NR RLC device refers to a function of directly transmitting RLC SDUs received from a lower layer to a higher layer regardless of their orders. The out-of-sequence delivery function may include a function of reassembling multiple RLC SDUs if one RLC SDU has been originally segmented into the multiple RLC SDUs and received. The out-of-sequence delivery function may include a function of storing the RLC SNs or PDCP SNs of received RLC PDUs, reordering their orders, and recording lost RLC PDUs.

The NR MACs 2d-15 and 2d-30 may be connected to multiple NR RLC layer devices configured in one UE. Various functions of the NR MAC may include the following.

Mapping between logical channels and transport channels
    Multiplexing/demultiplexing of the MAC SDUs
    Scheduling information reporting
    Error correction through HARQ
    Priority handling between logical channels of one UE
    Priority handling between the UEs by means of dynamic scheduling
    MBMS service identification
    Transport format selection
    Padding The NR PHY layers 2d-20 and 2d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Figure 2E:
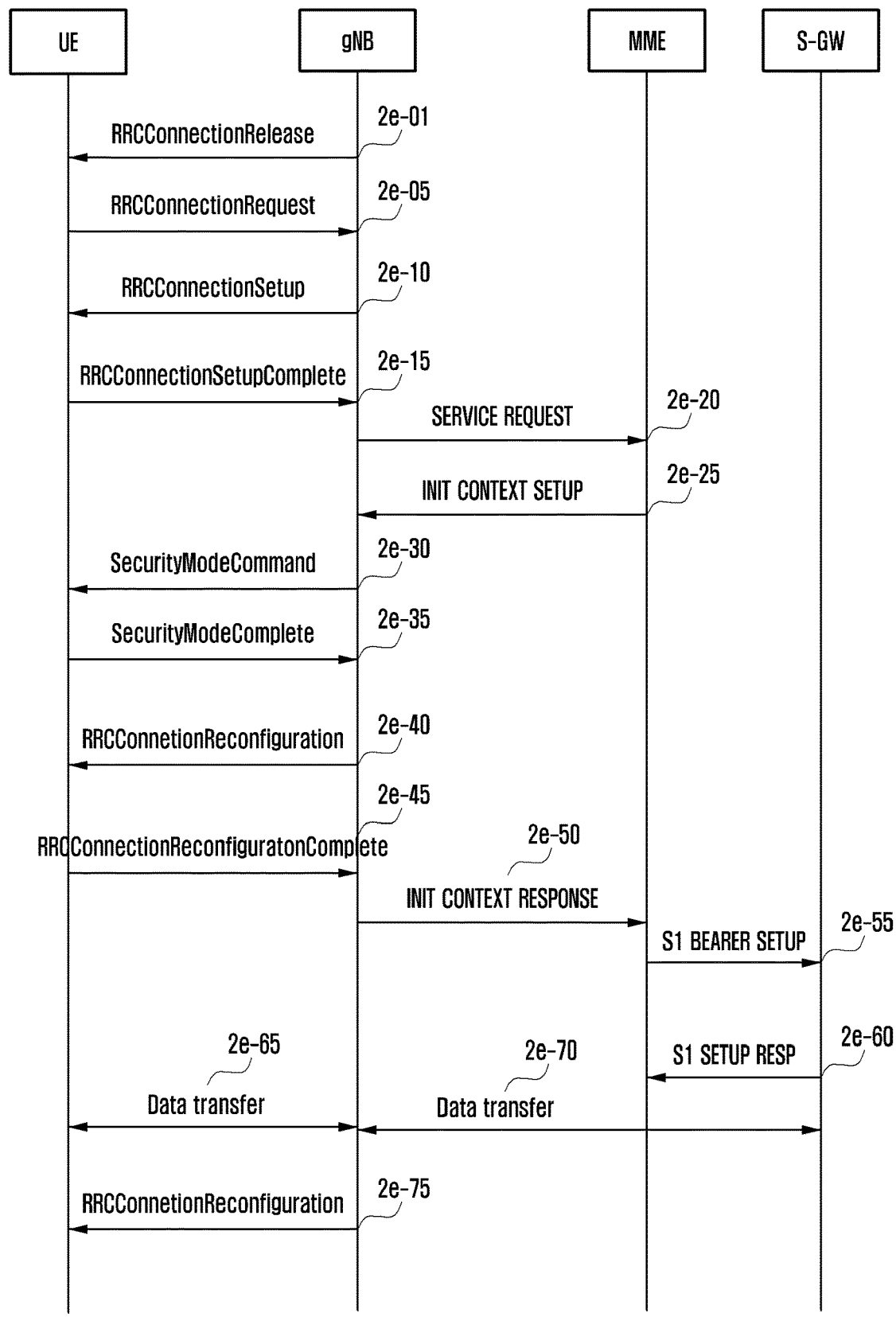
FIG. 2E is a flow diagram of a procedure for a terminal to switch from a radio resource control (RRC) idle mode to an RRC connected mode and establish a connection with a network according to an embodiment.

FIG. 2E is a flow diagram illustrating a procedure for a terminal to switch from an RRC idle mode to an RRC connected mode and to establish a connection with a network according to an embodiment.

Referring to FIG. 2E, if a UE that transmits/receives data in the RRC connected mode does not transmit/receive data for a certain cause or for a given time, a gNB may transmit an RRCConnectionRelease message to the UE so that the UE switches to the RRC idle mode at step 2e-01. When the UE is not connected (e.g., an idle mode UE) subsequently transmits data, the UE may perform an RRC connection establishment process with the gNB.

The UE may establish backward transmission synchronization with the gNB through a random access process and transmit an RRCConnectionRequest message to the gNB at step 2e-05. The message may include a cause (e.g., an establishmentCause) of establishing a connection with the identifier of the UE.

The gNB may transmit an RRCConnectionSetup message to the UE so that the UE sets up an RRC connection at step 2e-10). The message may indicate whether the PDCP entity supports the in-sequence delivery function (whether it supports the out-of-sequence delivery function) for each logical channel or each bearer (whether an RLC UM or RLC AM is connected) or for each PDCP device and whether a PDCP status report request function is used. For example, the message may indicate whether the in-sequence delivery function is supported (whether the out-of-sequence delivery function is supported) in "logicalchannelconfig" or "pdcp-config" and whether a PDCP status report request function uses an indication, and may include whether RLC UM or RLC AM has been connected. Furthermore, the message may include RRC connection configuration information. The RRC connection is also referred to as a signaling radio bearer (SRB), and is used for the transmission/reception of an RRC message that is a control message between a UE and a gNB. The UE that set up the RRC connection may transmit an RRCConnetionSetupComplete message to the gNB at step 2e-15. The message includes a control message "SERVICE REQUEST" that the UE requests a bearer configuration for a given service from an MME.

The gNB may transmit the "SERVICE REQUEST" message, included in the RRCConnetionSetupComplete message, to the MME at step 2e-20. The MME may determine whether to provide the service requested by the UE.

If, as a result of the determination, the MME has determined to provide the service requested by the UE, the MME may transmit a message "INITIAL CONTEXT SETUP REQUEST" to the gNB at step 2e-25. The message may include information, such as QoS information to be applied when a data radio bearer (DRB) is configured and security-related information (e.g., a security key or a security algorithm) to be applied to a DRB.

The gNB may exchange a SecurityModeCommand message at step 2e-30 and a SecurityModeComplete message at step 2e-35) in order to establish security with the UE, When the security configuration is completed, the gNB may transmit an RRCConnectionReconfiguration message to the UE at step 2e-40. The message may indicate whether the PDCP entity supports the in-sequence delivery function (whether it supports the out-of-sequence delivery function) for each logical channel or each bearer (whether an RLC UM or RLC AM is connected) or for each PDCP device and whether a PDCP status report request function is used. For example, the message may include whether the in-sequence delivery function is supported (whether the out-of-sequence delivery function is supported) in "logicalchannelconfig" or "pdcp-config" and whether a PDCP status report request function is used using an indication. The message may indicate whether RLC UM or RLC AM has been connected. The message includes configuration information of a DRB in which user data will be processed.

The UE may configure a DRB by applying the information and transmit an RRCConnectionReconfigurationComplete message to the gNB at step 2e-45. The gNB that has completed the DRB configuration with the UE may transmit an "INITIAL CONTEXT SETUP COMPLETE" message to the MME at step 2e-50. The MME that has received the message may exchange an "S1 BEARER SETUP" message and an "S1 BEARER SETUP RESPONSE" message with an S-GW in order to configure an S1 bearer at steps 2e-055 and 2e-60, respectively. The S1 bearer is a connection for data transmission set up between the S-GW and the gNB, and corresponds to a DRB in a one-to-one manner. When the entire process is completed, the UE may transmit/receive data to/from the gNB through the S-GW at steps 2e-65 and 2e-70, respectively.

As described above, the known data transmission process may basically include the three steps of the RRC connection configuration, the security configuration, and the DRB configuration. The gNB may transmit an RRCConnectionReconfiguration message in order to newly perform or add or change a configuration in the UE for a certain cause at step 2e-75. The message may indicate whether the PDCP entity supports the in-sequence delivery function (whether it supports the out-of-sequence delivery function) for each logical channel or each bearer (whether an RLC UM or RLC AM is connected) or for each PDCP device and whether a PDCP status report request function is used. For example, the message may indicate whether the in-sequence delivery function is supported (whether the out-of-sequence delivery function is supported) in "logicalchannelconfig" or "pdcp-config" and whether a PDCP status report request function is used using an indication, and may indicate whether RLC UM or RLC AM has been connected. The gNB may request a BSR report using the RRC message.

Figure 2F:
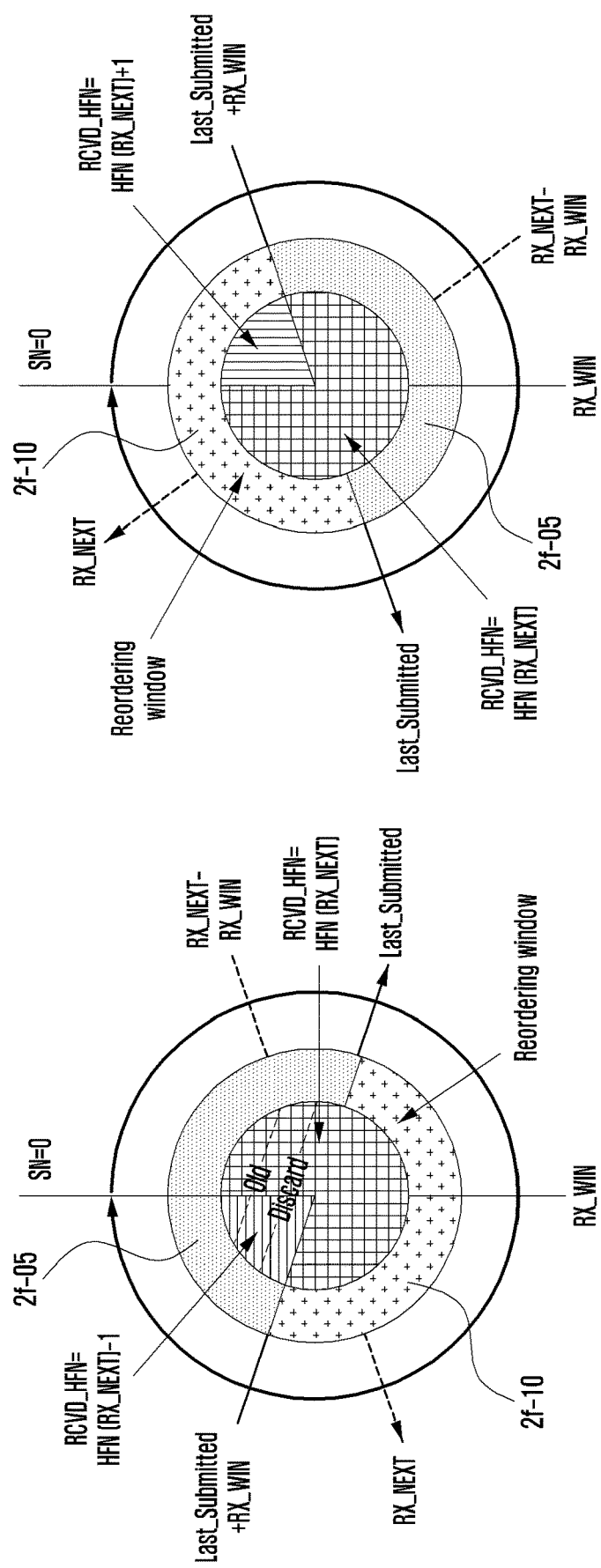
FIG. 2F is an illustration of a push-based window operation which may be driven in a PDCP layer according to an embodiment.

FIG. 2F is an illustration showing a push-based window operation, which may be driven in a PDCP layer, according to an embodiment.

Referring to FIG. 2F, the push-based window may have a structure in which the window is advanced based on a lower edge of the window. The lower edge of the window is defined as a PDCP sequence number (or COUNT value) that has been transmitted to a higher layer most recently, and may be defined as a variable "Last_Submitted," The COUNT value has 32 bits, and may include a combination of a PDCP sequence number and a hyper frame number (HFN). The HFN value is incremented by 1 whenever the PDCP sequence number is increased to a maximum value and reset to 0. In 2f-05, if a packet is received from the outside of a window, the packet may be considered an old packet and discarded. However, if a packet is received within a window as in 2f-10, the packet may be considered a normal packet, and the PDCP layer performs data processing after identifying whether the packet is redundant. A Last_submitted variable value is updated by the PDCP sequence number (or COUNT value) of a packet transmitted to a higher layer. Accordingly, the window advances.

The size of the window is set to be half the space of the PDCP sequence number. For example, if the length of a PDCP sequence number is 12 bits, the size of a window may be set to $2^{(12-1)}$. A circle, such as 2f-05 or 2f-10, indicates a window, and a smaller circle within the window may be used to determine an HFN value. For example, a circle having a different color pattern indicates that the circle has a different HFN.

Figure 2G:
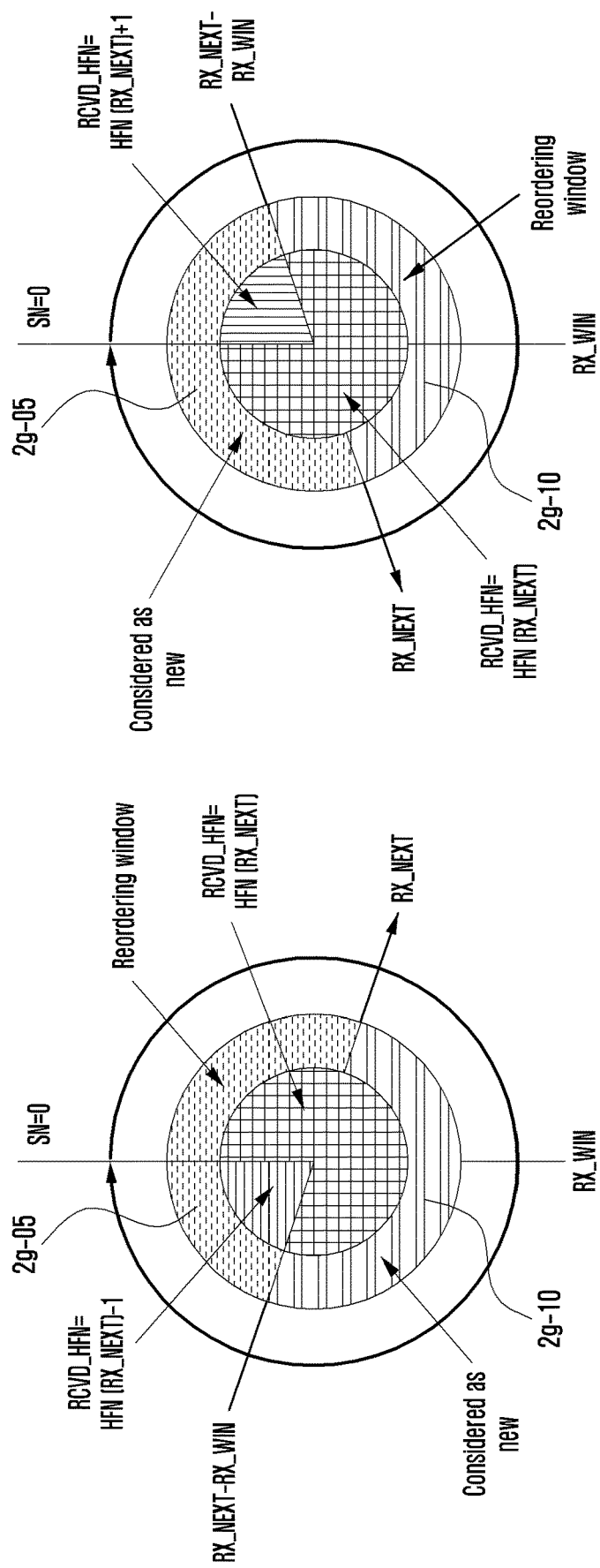
FIG. 2G is an illustration of a pull-based window operation which may be driven in a PDCP layer according to an embodiment.

FIG. 2G is an illustration of a pull-based window operation, which may be driven in the PDCP layer, according to an embodiment.

Referring to FIG. 2G, pull-based window has a structure in which the window advances based on the upper edge of the window. The upper edge of the window is defined as the highest PDCP sequence number (or COUNT value) of received packets, and may be defined as a variable "RX_NEXT." The COUNT value has 32 bits and includes a combination of a PDCP sequence number and an HFN. The HFN value is incremented by 1 whenever the PDCP sequence number increases to a maximum value and is reset to 0. If a packet is received from the outside of the window as in 2g-10, the packet is considered a new packet. Accordingly, the upper edge of the window may be updated, and the window may advance. In contrast, if a packet is received within a window as in 2f-10, the packet is considered a normal packet, and the PDCP layer may perform data processing after identifying whether the packet is redundant.

The size of the window may be set to be half the space of a PDCP sequence number. For example, if the length of a PDCP sequence number is 12 bits, the size of the window may be set to $2^{(12-1)}$. A circle, such as 2g-05 or 2g-10, indicates a window, and a smaller circle within the window may be used to determine an HFN value. For example, a circle having a different color pattern indicates that the circle has a different HFN.

In a next-generation mobile communication system, when a UE performs connection setup with a network as in FIG. 2E, the UE may receive information, regarding that the PDCP layer supports which function, from a gNB as configuration information in the 2e-10, 2e-40, 2e-75 procedure.

The UE may receive a configuration regarding whether a PDCP layer connected to an RLC device having an RLC AM mode or an RLC UM mode supports the in-sequence delivery function (whether the PDCP layer supports the out-of-sequence delivery function) and whether a PDCP status report request function is used from the configuration information. The PDCP layer may have the following PDCP operation modes based on the configuration.

1. A (2-1)-th embodiment: a PDCP operation mode in which in-sequence delivery is supported and a PDCP status report request is not supported
2. A (2-2)-th embodiment: a PDCP operation mode in which in-sequence delivery is supported and a PDCP status report request is supported
3. A (2-3)-th embodiment: a PDCP operation mode in which out-of-sequence delivery is supported and a PDCP status report request is not supported
4. A (2-4)-th embodiment: a PDCP operation mode in which out-of-sequence delivery is supported and a PDCP status report request is supported The PDCP layer of a next-generation mobile communication system may have a plurality of mode of the following four modes.

In the (2-1)-th embodiment of the present disclosure, the PDCP entity supports the PDCP operation mode in which in-sequence delivery is supported and a PDCP status report request is not supported.

The PDCP entity of a receiving state may use a push window method, such as in FIG. 2F, or may use a pull window method, such as in FIG. 2G. In an embodiment, data is processed using the push window method, but an HFN determination may be made using the pull window method.

In the (2-1)-th embodiment of the present disclosure, in order to support an operation for a PDCP entity to support in-sequence delivery and to not support a PDCP status report request, the PDCP entity may operate according to the following procedure in Table 1 as follows,

TABLE 1

| | LTE PDCP layer window operation |
|---|---|
| 1 | Receive PDCP PDU. |
| 2 | Discard a late arrived packet (if the sequence number (or COUNT value) of the received packet is smaller than a sequence number (or COUNT value) corresponding to a Last_submitted variable). |
| 3 | If a packet is received within a window, determine the COUNT value of the received packet and update an HFN value, if necessary. |
| 4 | If the received packet is a redundant packet, check and discard the packet. |
| 5 | If the received packet is a normal packet, perform data processing on a PDCP PDU as a PDCP SDU and store it. |
| 6 | If the received packets is a lost packet (i.e., a gap is present between packets received in sequence, and if the received packet corresponds to the gap), may transmit contiguous PDCP SDUs including stored packets and the received packet to a higher layer, may update the Last_submitted variable (window advances), and may update a Reordering_PDCP_RX_COUNT value (the Reordering_PDCP_RX_COUNT value with an RX_NEXT value. When a PDCU SDU having a Reordering_PDCP_RX_COUNT-1 value is transmitted to a higher layer, stop and reset a reordering timer, if any packet not transmitted to a higher layer has been stored when the reordering timer is not driven, may drive the reordering time). |
| 7 | When the reordering timer expires, may transmit all of PDCP SDUs having a value smaller than the Reordering_PDCP_RX_COUNT value to a higher layer in sequence. May transmit PDCP SDUs that belong to all of PDCP SDUs having a value greater than the Reordering_PDCP_RX_COUNT value and that have consecutivevalues in sequence to a higher layer. |

In the (2-2)-th embodiment of the present disclosure, the PDCP entity supports the PDCP operation mode in which out-of-sequence delivery is supported and a PDCP status report request is supported.

The PDCP entity of a receiving state may use a push window method, such as in FIG. 2F, or may use a pull window method, such as in FIG. 2G. Alternatively, data may be processed using the push window method, but an HFN determination may be made using the pull window method.

In the (2-2)-th embodiment of the present disclosure, in order to support an operation for a PDCP entity to support in-sequence delivery and to support a PDCP status report request, the PDCP entity may operate according to the following procedure in Table 2 as follows.

TABLE 2

| | LTE PDCP layer window operation |
|---|---|
| 1 | Receive PDCP PDU. |
| 2 | Discard a late arrived packet (if the sequence number (or COUNT value) of the received packet is smaller than a sequence number (or COUNT value) corresponding to a Last_submitted variable). |
| 3 | If a packet is received within a window, determine the COUNT value of the received packet and update an HFN value, if necessary. |
| 4 | If the received packet is a redundant packet, check and discard the packet. |
| 5 | If the received packet is a normal packet, perform data processing on a PDCP PDU as a PDCP SDU and store it. |
| 6 | If the received packets is a lost packet (i.e., a gap is present between packets received in sequence, and if the received packet corresponds to the gap), may transmit contiguous PDCP SDUs including stored packets and the received packet to a higher layer, may update the Last_submitted variable (window advances), and may update a Reordering_PDCP_RX_COUNT value (the Reordering_PDCP_RX_COUNT value with an RX_NEXT value. When a PDCU SDU having a Reordering_PDCP_RX_COUNT-1 value is transmitted to a higher layer, stop and reset a reordering timer. If any packet not transmitted to a higher layer has been stored when the reordering timer is not driven, may drive the reordering time). |
| 7 | When the reordering timer expires, may transmit all of PDCP SDUs having a value smaller than the Reordering_PDCP_RX_COUNT value to a higher layer in sequence. May transmit PDCP SDUs that belong to all of PDCP SDUs having a value greater than the Reordering_PDCP_RX_COUNT value and that have consecutive values in sequence to a higher layer. |
| 8 | (Bookkeeping) Record COUNT values transferred to a higher layer. Record COUNT values that belong to the transferred COUNT values and that have been transmitted in sequence, but are not transmitted in a consecutive sequence and lost in between. When the reordering timer expires, a given time elapses or a transmission stage requests a PDCP status report, may configure a PDCP status report and transmit it to a transmission stage. |

In the (2-3)-th embodiment of the present disclosure, the PDCP entity supports the PDCP operation mode in which out-of-sequence delivery is supported and a PDCP status report request is supported.

The PDCP entity of a receiving state may use a push window method, such as in FIG. 2F, or may use a pull window method, such as in FIG. 2G. In an embodiment, data is processed using the push window method, but an HFN determination may be made using the pull window method.

In the (2-3)-th embodiment of the present disclosure, in order to support an operation for a PDCP entity to support out-of-sequence delivery and to not support a PDCP status report request, the PDCP entity may operate according to the following procedure in Table 3 as follows.

TABLE 3

| | LTE PDCP layer window operation |
|---|---|
| 1 | Receive PDCP PDU. |
| 2 | Discard a late arrived packet (it the sequence number (or COUNT value) of the received packet is smaller than a sequence number (or COUNT value) corresponding to a RX_Next-window size). |
| 3 | If a packet is received within a window, determine the COUNT value of the received packet and update an HFN value, if necessary. |
| 4 | If the received packet is a redundant packet, check and discard the packet. |
| 5 | If the received packet is a normal packet, perform data processing on a PDCP PDU as a PDCP SDU and store it. |
| 6 | Directly transmit PDUs to a higher layer regardless of the sequence. |

In the (2-4)-th embodiment of the present disclosure, the PDCP entity supports the PDCP operation mode in which out-of-sequence delivery is supported and a PDCP status report request is supported.

The PDCP entity of a receiving state may use a push window method, such as in FIG. 2F, or may use a pull window method, such as in FIG. 2G. Alternatively, data may be processed using the push window method, while an HFN determination may be made using the pull window method.

In the (2-4)-th embodiment of the present disclosure, in order to support an operation for a PDCP entity to support out-of-sequence delivery and to support a PDCP status report request, the PDCP entity may operate according to the following procedure in Table 4 shown below.

TABLE 4

| | LTE PDCP layer window operation |
|---|---|
| 1 | Receive PDCP PDU. |
| 2 | Discard a late arrived packet (it the sequence number (or COUNT value) of the received packet is smaller than a sequence number (or COUNT value) corresponding to a RX_Next-window size). |
| 3 | If a packet is received within a window, determine the COUNT value of the received packet and update an HFN value, if necessary. |
| 4 | If the received packet is a redundant packet, check and discard the packet. |
| 5 | If the received packet is a normal packet, perform data processing on a PDCP PDU as a PDCP SDU and store it. |
| 6 | Directly transmit PDUs to a higher layer regardless of the sequence. |
| 7 | (Bookkeeping) Record COUNT values transferred to a higher layer. Record COUNT values that belong to the transferred COUNT values and that have been transmitted in sequence, but are not transmitted in a consecutive sequence and lost |

TABLE 4-continued

| LTE PDCP layer window operation |
|---|
| in between. When the reordering timer expires, a given time elapses or a transmission stage requests a PDCP status report, may configure a PDCP status report and transmit it to a transmission stage. |

Figure 2H:
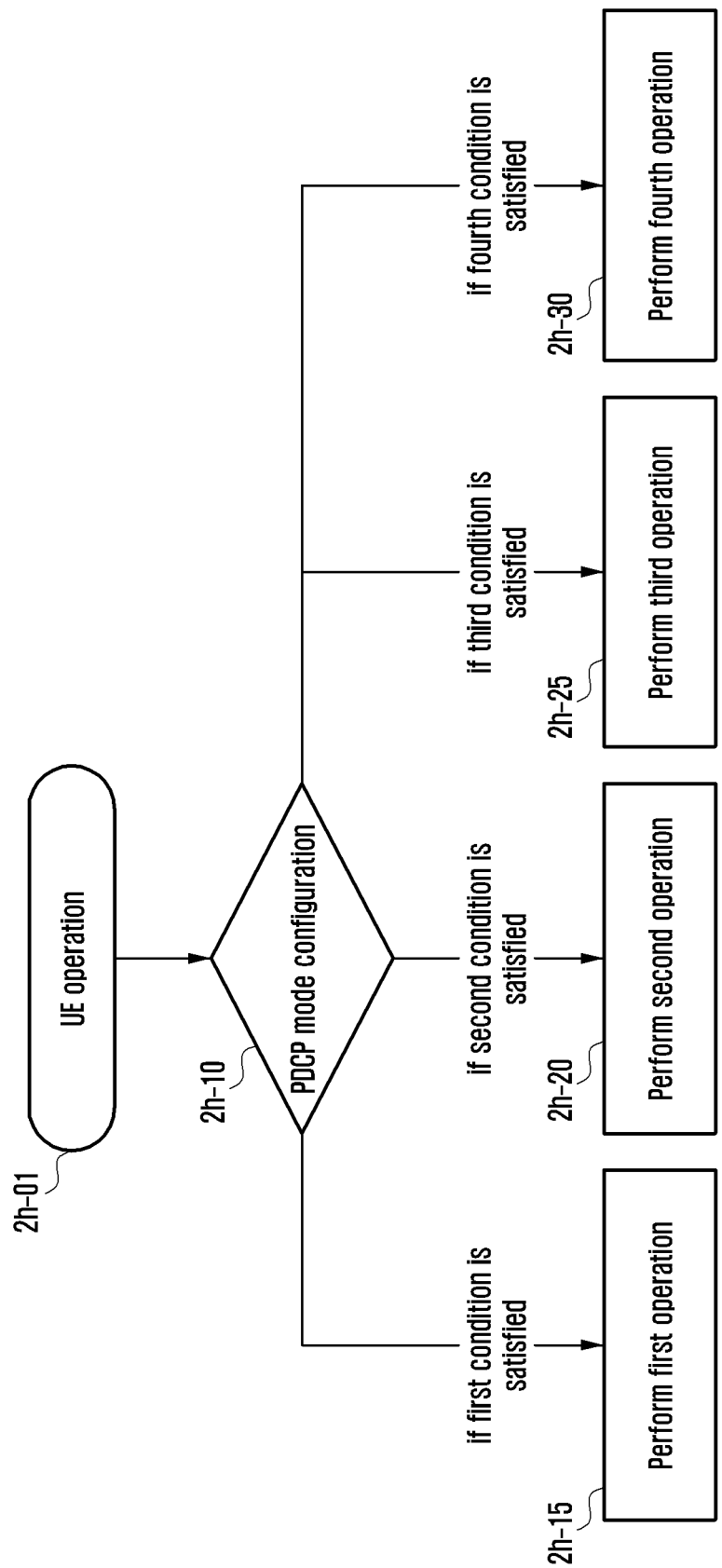
FIG. 2H is a flowchart of a terminal operation for a terminal to receive PDCP entity configuration information, identify a PDCP mode, and operate based on the identified PDCP mode according to an embodiment.

FIG. 2H is a flowchart of a UE operation for a UE to receive PDCP entity configuration information, identify a PDCP mode, and operate based on the identified PDCP mode according to an embodiment.

Referring to FIG. 2H, in a next-generation mobile communication system, a UE 2h-01 may receive information, regarding that a PDCP layer supports a function, from a gNB as configuration information in steps 2e-10, 2e-40, and 2e-75 in FIG. 2E described above when the UE establishes a connection with a network as in step 2h-10 in FIG. 2H.

The UE identifies the configuration information, and performs a first operation in step 2h-15 if a first condition is satisfied, a second operation in step 2h-20 if a second condition is satisfied, a third operation in step 2h-25 if a third condition is satisfied, and a fourth operation in step 2h-30 if a fourth condition is satisfied.

The first condition indicates a case, including an indication that an in-sequence function is supported in each logical channel or each piece of PDCP configuration information and an indication that a PDCP status report request is not supported.

The second condition indicates a case, including an indication that an in-sequence function is supported in each logical channel or each piece of PDCP configuration information and an indication that a PDCP status report request is supported.

The third condition indicates a case, including an indication that an out-of-sequence function is supported in each logical channel or each piece of PDCP configuration information and an indication that a PDCP status report request is not supported.

The fourth condition indicates a case, including an indication that an out-of-sequence function is supported in each logical channel or each piece of PDCP configuration information and an indication that a PDCP status report request is supported.

The first operation indicates that a PDCP mode operating according to the (2-1)-th embodiment of the present disclosure is performed.

The second operation indicates that a PDCP mode operating according to the (2-2)-th embodiment of the present disclosure is performed.

The third operation indicates that a PDCP mode operating according to the (2-3)-th embodiment of the present disclosure is performed.

The fourth operation indicates that a PDCP mode operating according to the (2-4)-th embodiment of the present disclosure is performed.

Figure 2I:
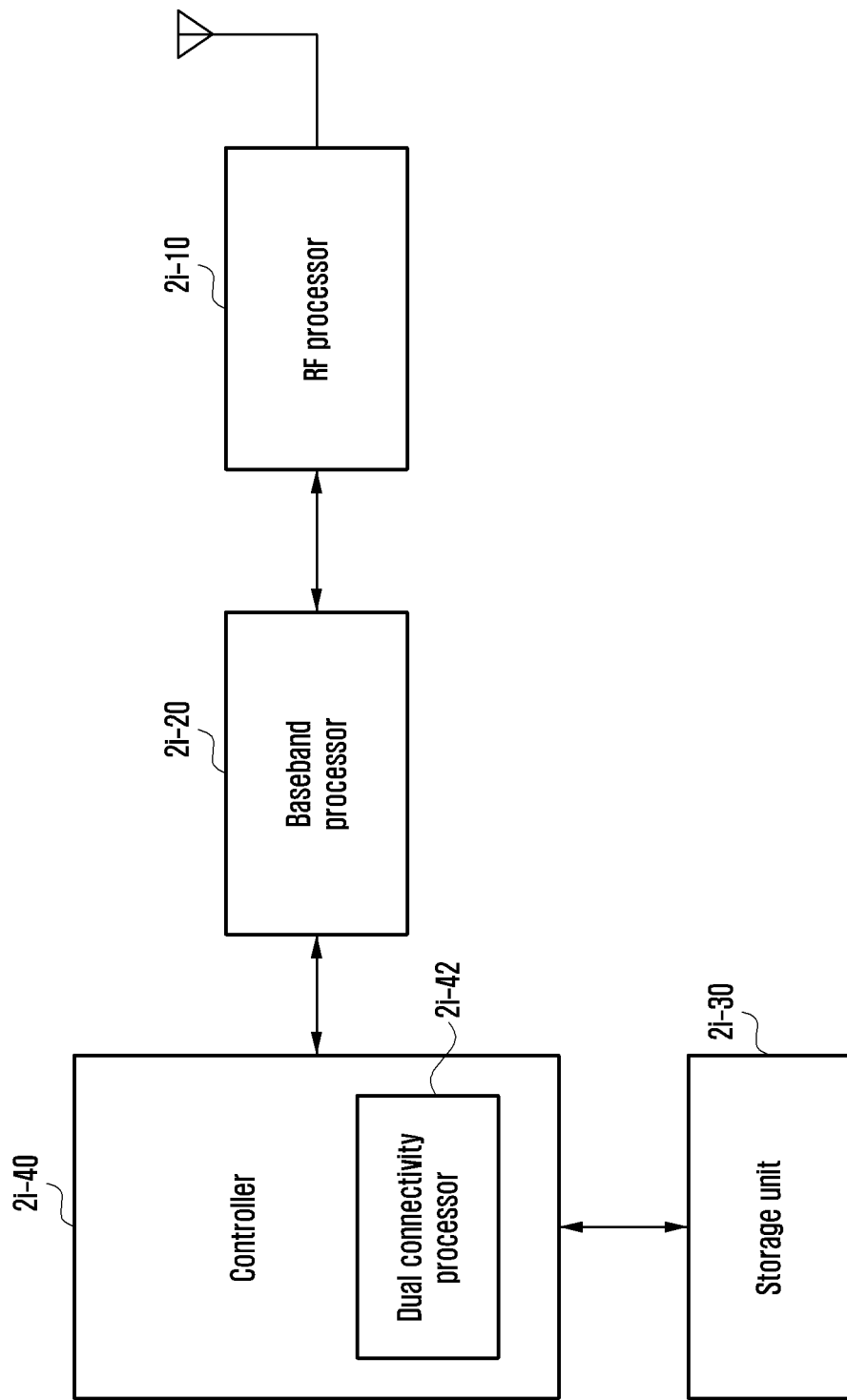
FIG. 2I is a block diagram of a terminal according to an embodiment.

FIG. 2I is a block diagram of a UE according to an embodiment.

Referring to FIG. 2I, the UE includes an RF processor 2i-10, a baseband processor 2i-20, a storage unit 2i-30, and a controller 2i-40.

The RF processor 2i-10 performs functions for transmitting/receiving a signal through a radio channel, such as the band conversion and amplification of a signal. For example, the RF processor 2i-10 up-converts a baseband signal received from the baseband processor 2i-20 into an RF band signal, transmits the RF band signal through an antenna, and down-converts an RF band signal received through the antenna into a baseband signal. For example, the RF processor 2*i*-10 may include a transmission filter, a reception filter, an amplifier, a mixer, an oscillator, a DAC, and an ADC.

In FIG. 2I, only one antenna is shown, but the UE may include multiple antennas.

The RF processor 2*i*-10 may include multiple RF chains. The RF processor 2*i*-10 may perform beamforming. For beamforming, the RF processor 2*i*-10 may adjust a phase and a size of each signal transmitted/received through multiple antennas or antenna elements. The RF processor 2*i*-10 may perform MIMO. When a MIMO operation is performed, the RF processor 2*i*-10 may receive multiple layers. The RF processor 2*i*-10 may properly configure multiple antenna or antenna elements under the control of the controller 2*i*-40, and may perform received beam swiping or adjust the direction and beam width of the received beam so that the received beam cooperates with a transmitted beam.

The baseband processor 2*i*-20 may perform a baseband signal and inter-bit stream conversion function based on a physical layer standard of a system. For example, when data is transmitted, the baseband processor 2*i*-20 may generate complex symbols by coding and modulating a transmission bit stream. When data is received, the baseband processor 2*i*-20 may reconstruct a reception bit stream from a baseband signal received from the RF processor 2*i*-10 through modulation and demodulation. For example, if an OFDM scheme is applied, when data is transmitted, the baseband processor 2*i*-20 generates complex symbols by coding and modulating a transmission bit stream, maps the complex symbols to subcarriers, and then configures OFDM symbols through an IFFT operation and CP insertion. Furthermore, when data is received, the baseband processor 2*i*-20 may segment a baseband signal received from the RF processor 2*i*-10 in an OFDM symbol unit, reconstruct signals mapped to subcarriers through an FFT operation, and may reconstruct a reception bit stream through modulation and demodulation.

The baseband processor 2*i*-20 and the RF processor 2*i*-10 may transmit and receive signals as described above. Accordingly, the baseband processor 2*i*-20 and the RF processor 2*i*-10 may be referred to as a transmitter, a receiver, a transceiver or a communication unit. Furthermore, at least one of the baseband processor 2*i*-20 and the RF processor 2*i*-10 may include multiple communication modules in order to support different multiple RATs. At least one of the baseband processor 2*i*-20 and the RF processor 2*i*-10 may include different communication modules in order to process signals of different frequency bands. For example, the different RATs may include an LTE network and an NR network. The different frequency bands may include an SHF (e.g., 2.5 GHz, 5 GHz) band and a millimeter wave (e.g., 60 GHz) band.

The storage unit 2*i*-30 may store data, such as a basic program, an application program, and configuration information for the operation of the UE. The storage unit 2*i*-30 may provide stored data in response to a request from the controller 2*i*-40.

The controller 2*i*-40 may control an overall operation of the UE. For example, the controller 2*i*-40 may transmits/receive a signal through the baseband processor 2*i*-20 and the RF processor 2*i*-10. The controller 2*i*-40 may write data in the storage unit 2*i*-40 and read data from the storage unit 2*i*-40. In this case, the controller 2*i*-40 may include at least one processor. For example, the controller 2*i*-40 may include a communication processor performing control for communication and an AP controlling a higher layer, such as an application program.

In accordance with an embodiment of the present disclosure, the controller 2*i*-40 may control the transceiver to receive PDCP configuration information including information indicative of whether a PDCP layer supports out-of-sequence delivery, and may control to identify whether the PDCP layer supports the out-of-sequence delivery based on the PDCP configuration information and process a PDCP PDU based on a result of the identification.

If the PDCP layer supports the out-of-sequence delivery, the controller 2*i*-40 may control the transceiver to transmit a PDCP SDU, generated based on the PDCP PDU, to a higher layer regardless of the sequence of a count value of the PDCP SDU.

Header decompression may be omitted before the PDCP SDU is transmitted to the higher layer.

If the PDCP layer does not support the out-of-sequence delivery, the controller 2*i*-40 may determine whether a count value of a received PDCP PDU is identical with a count value of a first PDCP SDU that is not transmitted to the higher layer.

If, as a result of the determination, it is determined that the count value of the received PDCP PDU is identical with the count value of the first PDCP SDU that is not transmitted to the higher layer, the controller 2*i*-40 may perform decompression on a PDCP SDU generated based on the PDCP PDU, and may control the transceiver to transmit the PDCP SDU to the higher layer in ascending power of count values of the PDCP SDUs.

The controller 2*i*-40 may control to store a PDCP SDU having a consecutive count value from a PDCP SDU having the count value of the first PDCP SDU.

If the PDCP layer supports the out-of-sequence delivery, the controller 2*i*-40 may control the transceiver to transmit a PDCP SDU generated based on the PDCP PDU to the higher layer regardless of the sequence of a count value of the PDCP SDU.

The controller 2*i*-40 may determine whether a count value of the PDCP PDU is identical with a count value of the first PDCP SDU that is not transmitted to the higher layer, and may control to update the count value of the first PDCP SDU if a count value of a received PDCP PDU is identical with the count value of the first PDCP SDU that is not transmitted to the higher layer.

Figure 2J:
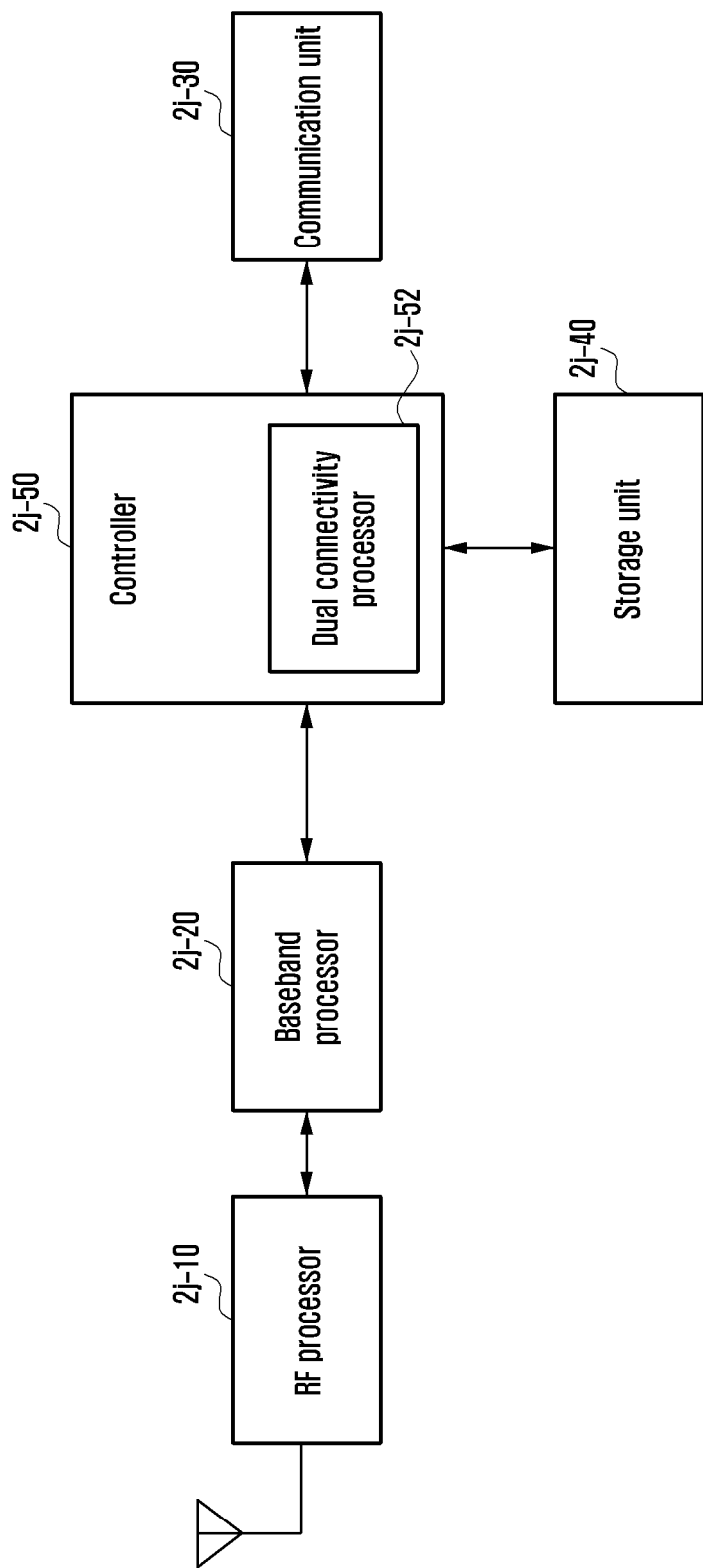
FIG. 2J is a block diagram of a TRP in a wireless communication system according to an embodiment.

FIG. 2J shows the block diagram of a TRP in a wireless communication system according to an embodiment.

Referring to FIG. 2J, the eNB includes an RF processor 2*j*-10, a baseband processor 2*j*-20, a communication unit 2*j*-30, a storage unit 2*j*-40, and a controller 2*j*-50.

The RF processor 2*j*-10 may perform a function for transmitting/receiving a signal through a radio channel, such as the band conversion and amplification of a signal. For example, the RF processor 2*j*-10 may up-convert a baseband signal received from the baseband processor 2*j*-20 into an RF band signal, transmit the RF band signal through an antenna, and down-convert an RF band signal received through the antenna into a baseband signal. The RF processor 2*j*-10 may include a transmission filter, a reception filter, an amplifier, a mixer, an oscillator, a DAC, and an ADC.

In FIG. 2J, only one antenna is shown, but the eNB may include multiple antennas.

The RF processor 2*j*-10 may include multiple RF chains. The RF processor 2*j*-10 may perform beamforming. For beamforming, the RF processor 2*j*-10 may adjust a phase and a size of each of signals transmitted/received multiple antennas or antenna elements. The RF processor 2*j*-10 may perform a downlink MIMO operation by transmitting one or more layers.

The baseband processor 2*j*-20 performs a baseband signal and inter-bit stream conversion function based on the physical layer standard of a first RAT. For example, when data is transmitted, the baseband processor 2*j*-20 generates complex symbols by coding and modulating a transmission bit stream. When data is received, the baseband processor 2*j*-20 may reconstruct a reception bit stream from a baseband signal received from the RF processor 2*j*-10 through modulation and demodulation. For example, if the OFDM scheme is applied, when data is transmitted, the baseband processor 2*j*-20 generates complex symbols by coding and modulating a transmission bit stream, maps the complex symbols to subcarriers, and configures OFDM symbols through an IFFT operation and CP insertion. When data is received, the baseband processor 2*j*-20 may segment a baseband signal received from the RF processor 2*j*-10 in an OFDM symbol unit, may reconstruct signals mapped to subcarriers through an FFT operation, and then may reconstruct a reception bit stream through modulation and demodulation. The baseband processor 2*j*-20 and the RF processor 2*j*-10 may transmit and receive signals as described above. Accordingly, the baseband processor 2*j*-20 and the RF processor 2*j*-10 may be referred to as a transmitter, a receiver, a transceiver, a communication unit or a wireless communication unit.

The communication unit 2*j*-30 may provide an interface for performing communication with other nodes within a network.

The storage unit 2*j*-40 may store data, such as a basic program, an application program, and configuration information for the operation of the primary eNB. For example, the storage unit 2*j*-40 may store information on a bearer allocated to an accessed UE and measurement results reported by an accessed UE. The storage unit 2*j*-40 may store information, that is, a criterion for determining whether to provide a UE with multiple connections. The storage unit 2*j*-40 provides stored data in response to a request from the controller 2*j*-50.

The controller 2*j*-50 may control an overall operation of the primary eNB. For example, the controller 2*j*-50 may transmits/receive a signal through the baseband processor 2*j*-20 and the RF processor 2*j*-10 or through the communication unit 2*j*-30. The controller 2*j*-50 writes data in the storage unit 2*j*-40 and reads data from the storage unit 2*j*-40. In this case, the controller 2*j*-50 may include at least one processor.

The controller 2*j*-50 may generate PDCP configuration information including information indicative of whether the PDCP layer of the UE supports out-of-sequence delivery, and may control the transceiver to transmit the PDCP configuration information to the UE.

Figure 2K:
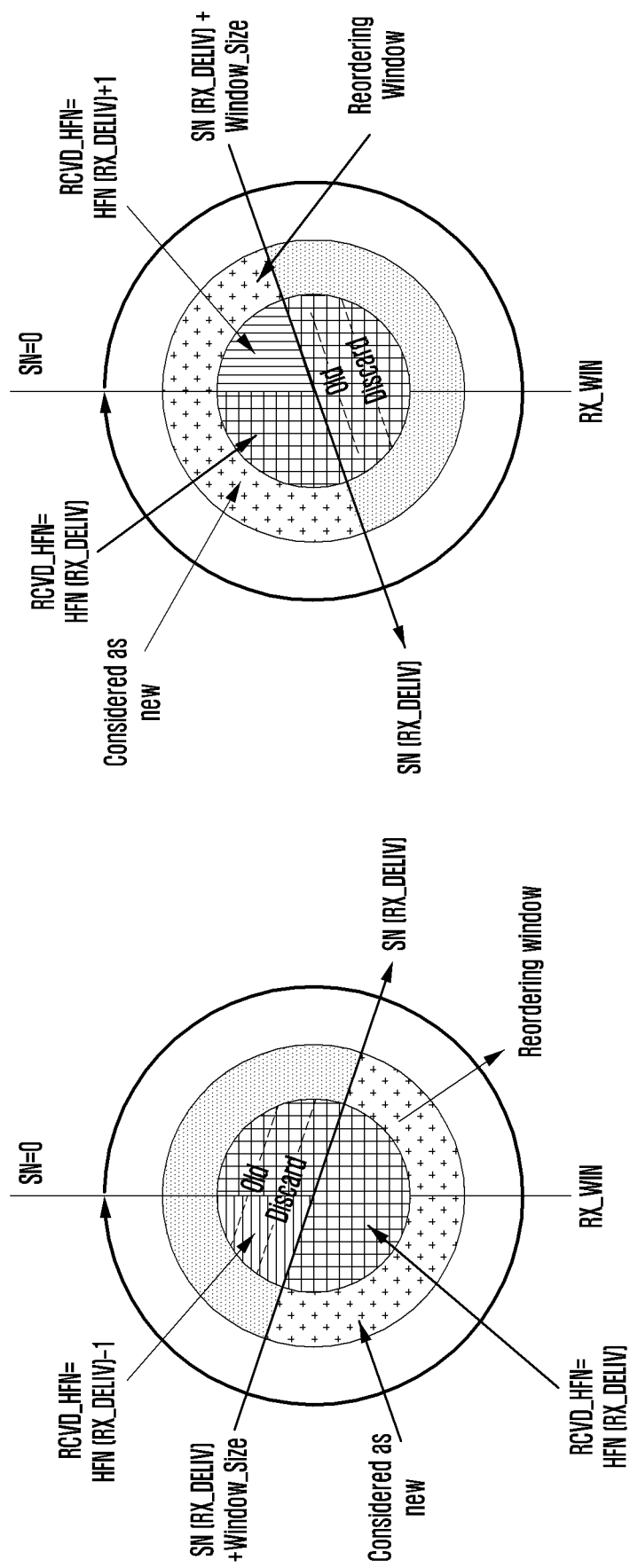
FIG. 2K an illustration of a reception window operation in a PDCP layer of a next-generation mobile communication system according to an embodiment.

FIG. 2K is an illustration of a reception window operation in a PDCP layer of a next-generation mobile communication system according to an embodiment.

Referring to FIG. 2K, when the out-of-sequence delivery indication (outOfOrderDelivery) indicates out-of-sequence delivery in the configuration information (pdcp-config) of the PDCP device configured in the RRC Connection Setup message or the RRC Connection Reconfiguration message 2*e*-10, 2*e*-40, and 2*e*-75 of FIG. 2E, an out-of-sequence delivery operation may be performed. When the out-of-sequence delivery indication does not indicate out-of-sequence delivery, an in-sequence delivery operation may be performed.

The out-of-sequence delivery indication (outOfOrderDelivery) may be included and indicated in an information element "RadioResourceConfigDedicated" within the RRC Connection Setup message or the RRC Connection Reconfiguration message 2*e*-10, 2*e*-40, and 2*e*-75 of FIG. 2E. For example, an indication "outOfOrderDelivery" may indicate out-of-sequence delivery in the pdcp-Config configuration information of DRB-ToAddMod of DRB-ToAddModList in the RadioResourceConfigDedicated.

| RadioResourceConfigDedicated information element |
|---|
| RadioResourceConfigDedicated ::=  SEQUENCE { <br>     sdap-ToAddModList           SDAP-ToAddModList <br>     OPTIONAL, <br>     ... <br> } <br> DRB-ToAddModList ::=         SEQUENCE (SIZE (1..maxDRB)) OF DRB-ToAddMod <br> DRB-ToAddMod ::=  SEQUENCE { <br>     drb-Identity                 DRB-Identity, <br>     pdcp-Config                 PDCP-Config <br>         OPTIONAL, <br>     rlc-Config                   RLC-Config <br>         OPTIONAL, <br>     ... <br> } |

| PDCP-Config information element |
|---|
| -- ASN1START <br> PDCP-Config ::=                                  SEQUENCE { <br>     outOfOrderDelivery   BOOLEAN   OPTIONAL <br>     discardTimer                           ENUMERATED { <br>                                                                 ms50, <br> ms100, ms150, ms300, ms500, <br>                                                                 ms750, <br> ms1500, infinity <br> } |

| PDCP-Config information element |
|---|
| ```
        rlc-AM                              SEQUENCE {                     OPTIONAL,    -- Cond Setup
            statusReportRequired                BOOLEAN
        }                                                                   OPTIONAL,    -- Cond Rlc-AM
        rlc-UM                              SEQUENCE {
            pdcp-SN-Size                        ENUMERATED {len7bits, len12bits}
        }                                                                   OPTIONAL,    -- Cond Rlc-UM
        headercompression                   CHOICE {
            notUsed                             NULL,
            rohc                                SEQUENCE {
                maxCID                              INTEGER (1..16383)                DEFAULT 15,
                profiles                            SEQUENCE {
                    profile0x0001                       BOOLEAN,
                    profile0x0002                       BOOLEAN,
                    profile0x0003                       BOOLEAN,
                    profile0x0004                       BOOLEAN,
                    profile0x0006                       BOOLEAN,
                    profile0x0101                       BOOLEAN,
                    profile0x0102                       BOOLEAN,
                    profile0x0103                       BOOLEAN,
                    profile0x0104                       BOOLEAN
                },
                ...
            }
        },
        ...
        [[  rn-IntegrityProtection-r10          ENUMERATED        {enabled}           OPTIONAL    -- Cond RN
        ]],
        [[  pdcp-SN-Size-v1130                  ENUMERATED    {len15bits}             OPTIONAL    -- Cond Rlc-AM2
        ]],
        [[  ul-DataSplitDRB-ViaSCG-r12  BOOLEAN                                       OPTIONAL,   -- Need ON
            t-Reordering-r12                    ENUMERATED {
                ms0,    ms20, ms40, ms60, ms80, ms100, ms120, ms140,
                ms160, ms180, ms200, ms220, ms240, ms260, ms280, ms300,
                ms500, ms750, spare14, spare13, spare12, spare11, spare10,
                spare9, spare8, spare7, spare6, spare5, spare4, spare3,
                spare2, spare1}                 OPTIONAL    -- Cond SetupS
        ]],
        [[  ul-DataSplitThreshold-r13   CHOICE {
                release                             NULL,
                setup                               ENUMERATED {
                    b0,    b100, b200, b400, b800, b1600, b3200, b6400, b12800,
                    b25600, b51200, b102400, b204800, b409600, b819200,
                    spare1}
            }                                                                   OPTIONAL,    -- Need ON
            pdcp-SN-Size-v1310                  ENUMERATED    {len18bits}             OPTIONAL,   -- Cond Rlc-AM3
            statusFeedback-r13                  CHOICE {
                release                             NULL,
                setup                               SEQUENCE {
                    statusPDU-TypeForPolling-r13        ENUMERATED {type1, type2}    OPTIONAL,
                    statusPDU-Periodicity-Type1-r13
``` |

-continued

| PDCP-Config information element |
|---|

```
            ENUMERATED {
                                            ms5,         ms10,
ms20, ms30, ms40, ms50, ms60, ms70, ms80, ms90,
                                            ms100, ms150,
ms200, ms300, ms500, ms1000, ms2000, ms5000,
                                            ms10000,
ms20000, ms50000} OPTIONAL,   -- Need ON
                         statusPDU-Periodicity-Type2-r13
            ENUMERATED {
                                            ms5,         ms10,
ms20, ms30, ms40, ms50, ms60, ms70, ms80, ms90,
                                            ms100, ms150,
ms200, ms300, ms500, ms1000, ms2000, ms5000,
                                            ms10000,
ms20000, ms50000} OPTIONAL,   -- Need ON
                         statusPDU-Periodicity-Offset-r13
                                            ENUMERATED {
                                               ms1,         ms2,
ms5, ms10, ms25, ms50, ms100, ms250, ms500,
                                            ms2500,
ms5000, ms25000}  OPTIONAL    -- Need ON
            }
         }
                              OPTIONAL     -- Need ON
   ]],
   [[  ul-LWA-Config-r14            CHOICE {
         release                                 NULL,
         setup                                   SEQUENCE {
                     ul-LWA-DRB-ViaWLAN-r14      ENUMERATED   {true}
   OPTIONAL,  -- Need OR
                     ul-LWA-DataSplitThreshold-r14  ENUMERATED {
                                               b0,          b100,
b200, b400, b800, b1600, b3200, b6400,
                                            b12800,
b25600, b51200, b102400, b204800, b409600,
                                            b819200,
spare1}  OPTIONAL,     -- Need ON
                     wt-MAC-Address-r14       OCTET STRING (SIZE (6))
         OPTIONAL    -- Need ON
         }
      }
   ]]
}
-- ASN1STOP
```

Window state variables used in the received packet processing operation of the reception PDCP device in FIG. 2K are as follows, and the window state variables maintain a COUNT value.

In this section, the following definitions are used:

HFN (State Variable): the HFN part (i.e., the number of most significant bits equal to an HFN length) of the State Variable.

SN (State Variable): the SN part (i.e., the number of least significant bits equal to a PDCP SN length) of the State Variable.

RCVD_SN: the PDCP SN of the received PDCP Data PDU, included in the PDU header.

RCVD_HFN: the HFN of the received PDCP Data PDU, calculated by the receiving PDCP entity.

RCVD_COUNT: the COUNT of the received PDCP Data PDU=[RCVD_HFN, RCVD_SRI].

RX_NEXT: This state variable indicates the COUNT value of the next PDCP SDU expected to be received. The initial value is 0.

RX_DELIV: This state variable indicates the COUNT value of the last PDCP SDU delivered to the upper layers. The initial value is $2^{32}-1$.

RX_REORD: This state variable indicates the COUNT value following the COUNT value associated with the PDCP Data PDU which triggered t-Reordering.

t-Reordering: The duration of the timer is configured by upper layers. This timer is used to detect loss of PDCP Data PDUs. If t-Reordering is running, t-Reordering shall not be started additionally. That is, only one t-Reordering per receiving PDCP entity is running at a given time.

The fifth embodiment of a reception operation of the PDCP layer proposed in the present disclosure is as follows. Actions when a PDCP Data PDU is Received from Lower Layers When a PDCP Data PDU is received from lower layers; a receiving PDCP entity shall determine the COUNT value of the received PDCP Data PDU, i.e. RCVD_COUNT, as follows:

if RCVD_SN<=SN(RX_DELIV)−Window_Size:
    RCVD_HFN=HFN(RX_DELIV)+1;
  else if RCVD_SN>SN(RX_DELIV)+Window_Size:
    RCVD_HFN=HFN(RX_DELIV)−1;
  else:
    RCVD_HFN=HFN(RX_DELIV);
  RCVD_COUNT=[RCVD_HFN, RCVD_SN].

After determining the COUNT value of the received PDCP Data PDU=RCVD_COUNT, the receiving PDCP entity shall:
  if RCVD_COUNT<=RX_DELIV; or
  if the PDCP Data PDU with COUNT=RCVD_COUNT
    has been received before:

perform deciphering and integrity verification of the
   PDCP Data PDU using COUNT=RCVD_COUNT;
   if integrity verification fails:
      indicate the integrity verification failure to upper
         layer;
   discard the PDCP Data PDU;
else:
   perform deciphering and integrity verification of the
      PDCP Data PDU using COUNT=RCVD_COUNT;
   if integrity verification fails:
      indicate the integrity verification failure to upper
         layer;
      discard the PDCP Data PDU;
If the received PDCP Data PDU with COUNT
   value=RCVD_COUNT is not discarded above, the receiving
PDCP entity shall:
   store the resulting PDCP SDU in the reception buffer;
   if RCVD_COUNT>=RX_NEXT:
      update RX_NEXT to RCVD_COUNT+1;
   if RCVD_COUNT=RX_DELIV+1 and if outOfOrderDe-
      livery is not configured:
      deliver to upper layers in ascending order of the asso-
         ciated COUNT value after performing header
         decompression;
      all stored PDCP SDU(s) with consecutively associ-
         ated COUNT value(s) starting from
         COUNT=RX_DELIV+1;
      update RX_DELIV to the COUNT value of the last
         PDCP SDU delivered to upper layers;
   if RCVD_COUNT=RX_DELIV+ and if outOfOrderDe-
      livery is configured and the PDCP SDU with RCVD_
      COUNT has not been delivered to upper layers:
      deliver the resulting PDCP SDU to upper layers after
         performing header decompression;
      update RX_DELIV to the COUNT value of the last
         in-sequence delivered PDCP SDU to upper layers;
   if outOfOrderDelivery is configured and the PDCP SDU
      with RCVD_COUNT has not been delivered to upper
      layers:
      deliver the resulting PDCP SDU to upper layers after
         performing header decompression;
   if t-Reordering is running and outOfOrderDelivery is not
      configured, and if the PDCP SDU with
      COUNT=RX_REORD−1 has been delivered to upper
      layers:
      stop and reset t-Reordering;
   if t-Reordering is not running and outOfOrderDelivery is
      not configured (includes the case when t-Reordering is
      stopped due to actions above), and if there is at least
      one stored PDCP SDU:
      update RX_REORD to RX_NEXT;
      start t-Reordering.
   if t-Reordering is running and outOfOrderDelivery is
      configured,
      if RX_REORD=RX_DELIV+1; or
      if RX_REORD<=RX_DELIV (or RX_REORD falls
         outside of the receiving window and RX_REORD is
         not equal to RX_DELIV Window_Size)
         stop and reset t-Reordering;
   if t-Reordering is not running and outOfOrderDelivery is
      configured (includes the case when t-Reordering is
      stopped due to actions above)
      if RX_NEXT>RX_DELIV+1 (or RX_NEXT−
         1>RX_DELIV):
         update RX_REORD to RX_NEXT:
         start t-Reordering.

Receiving PDCP Entity Actions when a t-Reordering
Expires
   If outOfOrderDelivery is not configured, when t-Reorder-
ing expires, the receiving PDCP entity shall:
   deliver to upper layers in ascending order of the associ-
      ated COUNT value after performing header decom-
      pression:
   all stored PDCP SDU(s) with associated COUNT
      value(s)<RX_REORD;
   all stored PDCP SDU(s) with consecutively associated
      COUNT value(s) starting from RX_REORD;
   update RX_DELIV to the COUNT value of the last PDCP
      SDU delivered to upper layers;
   if there is at least one stored PDCP SDU:
      update RX_REORD to RX_NEXT;
      start t-Reordering.
   If outOfOrderDelivery is configured, when t-Reordering
expires, the receiving PDCP entity shall:
   update RX_DELIV to the COUNT value>=RX_REORD
      of the last in-sequence delivered PDCP SDU to upper
      layers;
   If RX_NEXT>RX_DELIV+1 (or RX_NEXT−
      1>RX_DELIV):
      update RX_REORD to RX_NEXT
      start t-Reordering
   A sixth embodiment of the reception operation of the
PDCP layer proposed in the present disclosure is as follows.
Actions when a PDCP Data PDU is Received from Lower
Layers
   When a PDCP Data PDU is received from lower layers,
the receiving PDCP entity shall determine the COUNT value
of the received PDCP Data PDU, i.e. RCVD_COUNT, as
follows:
   if RCVD_SN<=SN(RX_DELIV)−Window_Size:
      RCVD_HFN=HFN(RX_DELIV)+1;
   else if RCVD_SN>SN(RX_DELIV) Window_Size:
      RCVD_HFN=HFN(RX_DELIV)−1;
   else:
      RCVD_HFN=HFN(RX_DELIV);
   RCVD_COUNT=[RCVD_HFN, RCVD_SN].
   After determining the COUNT value of the received
PDCP Data PDU=RCVD_COUNT, the receiving PDCP
entity shall:
   if RCVD_COUNT<=RX_DELIV: or
   if the PDCP Data PDU with COUNT=RCVD_COUNT
      has been received before:
      perform deciphering and integrity verification of the
         PDCP Data PDU using COUNT=RCVD_COUNT;
         if integrity verification fails:
            indicate the integrity verification failure to upper
               layer;
         discard the PDCP Data PDU;
      else:
         perform deciphering and integrity verification of the
            PDCP Data PDU using COUNT=RCVD_COUNT;
            if integrity verification fails:
               indicate the integrity verification failure to upper
                  layer;
            discard the PDCP Data PDU;
   If the received PDCP Data PDU with COUNT
      value=RCVD_COUNT is not discarded above, the receiving
PDCP entity shall:
   store the resulting PDCP SDU in the reception buffer;
   if RCVD_COUNT>=RX_NEXT:
      update RX_NEXT to RCVD_COUNT+1;
   if RCVD_COUNT=RX_DELIV+1 and if outOfOrder-
      Deivery is not configured:

deliver to upper layers in ascending order of the associated COUNT value after performing header decompression;
all stored PDCP SDU(s) with consecutively associated COUNT value(s) starting from COUNT=RX_DELIV+1;
update RX_DELIV to the COUNT value of the last PDCP SDU delivered to upper layers;
if RCVD_COUNT=RX_DELIV+1 and if outOfOrderDelivery is configured and the PDCP SDU with RCVD_COUNT has not been delivered to upper layers:
deliver the resulting PDCP SDU to upper layers after performing header decompression;
update RX_DELIV to the COUNT value of the last in-sequence delivered PDCP SDU to upper layers;
if outOfOrderDelivery is configured and the PDCP SDU with RCVD_COUNT has not been delivered to upper layers:
deliver the resulting PDCP SDU to upper layers after performing header decompression;
if t-Reordering is running,
if RX_REORD=RX_DELIV+1; or
if RX_REORD<=RX_DELIV (or RX_REORD falls outside of the receiving window and RX_REORD is not equal to RX_DELIV+Window_Size+1)
stop and reset t-Reordering;
if t-Reordering is not running (includes the case when t-Reordering is stopped due to actions above)
if RX_NEXT>RX_DELIV+1 (or RX_NEXT-1>RX_DELIV):
update RX_REORD to RX_NEXT;
start t-Reordering.

Receiving PDCP Entity Actions when a t-Reordering Expires

If outOfOrderDelivery is not configured, when t-Reordering expires, the receiving PDCP entity shall:
deliver to upper layers in ascending order of the associated COUNT value after performing header decompression:
all stored PDCP SDU(s) with associated COUNT value(s)<RX_REORD;
all stored PDCP SDU(s) with consecutively associated COUNT value(s) starting from RX_REORD;
update RX_DELIV to the COUNT value of the last PDCP SDU delivered to upper layers;
if there is at least one stored PDCP SDU:
update RX_REORD to RX_NEXT;
start t-Reordering.
If outOfOrderDelivery is configured, when t-Reordering expires, the receiving PDCP entity shall:
update RX_DELIV to the COUNT value>=RX_REORD of the last in-sequence delivered PDCP SDU to upper layers;
If RX_NEXT>RX_DELIV+1 (or RX_NEXT-1>RX_DELIV):
update RX_REORD to RX_NEXT
Start t-Reordering In the embodiments of the present disclosure, the phrase "update RX_DELIV to the COUNT value of the last in-sequence delivered PDCP SDU to upper layers" may be substituted with the following phrase having the same meaning:

"update RX_DELIV to x−1, where x is the COUNT value of the first PDCP SDU which has not been delivered to upper layers."

That is, the two phrases have the same meaning.

In accordance with an embodiment of the present disclosure, if the PDCP entity is configured to perform out-of-sequence delivery, for example, if out-of-sequence delivery (outofsequenceDelivery) is configured through an RRC message, a header compression algorithm (e.g., RoHC) cannot be applied (the reason for this is that the PDCP entity of a receiving state can successfully perform the header compression algorithm on sequentially delivered packets normally), Accordingly, the receiving PDCP entity may omit a header decompression procedure.

Figure 2L:
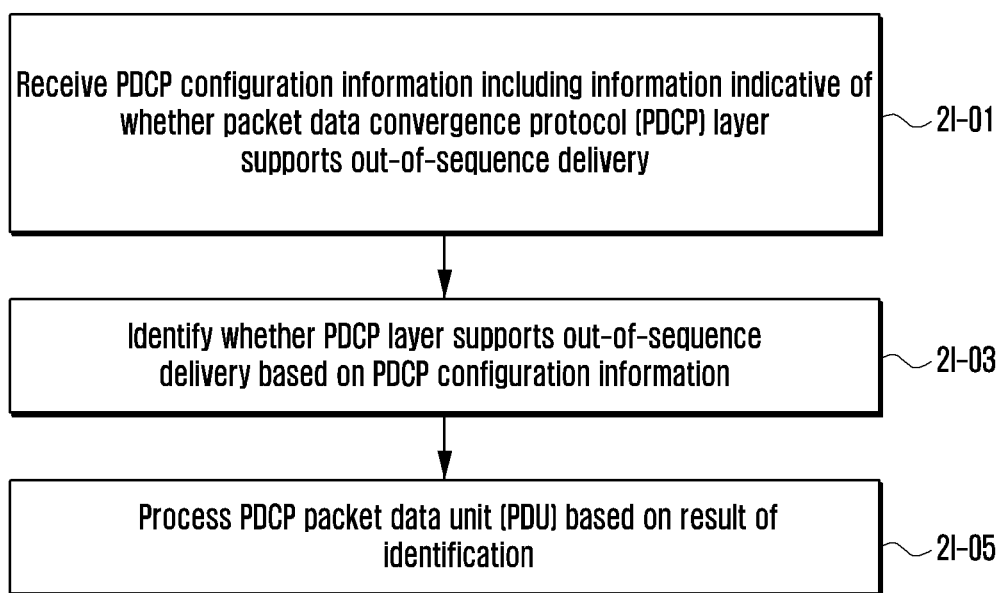
FIG. 2L is a flowchart of a control method of a UE according to an embodiment.

FIG. 2L is a flowchart of a control method of a UE according to an embodiment.

Referring to FIG. 2L, at step 2*l*-01, the UE may receive PDCP configuration information including information indicative of whether a PDCP layer supports out-of-sequence delivery. At step 2*l*-03, the UE may identify whether the PDCP layer supports the out-of-sequence delivery based on the PDCP configuration information.

At step 2*l*-05, the UE may process a PDCP PCU based on a result of the identification. For example, if the PDCP layer supports the out-of-sequence delivery, the UE may transmit a PDCP SDU generated based on the PDCP PDU to the higher layer regardless of the sequence of a count value of the PDCP SDU.

Figure 2M:
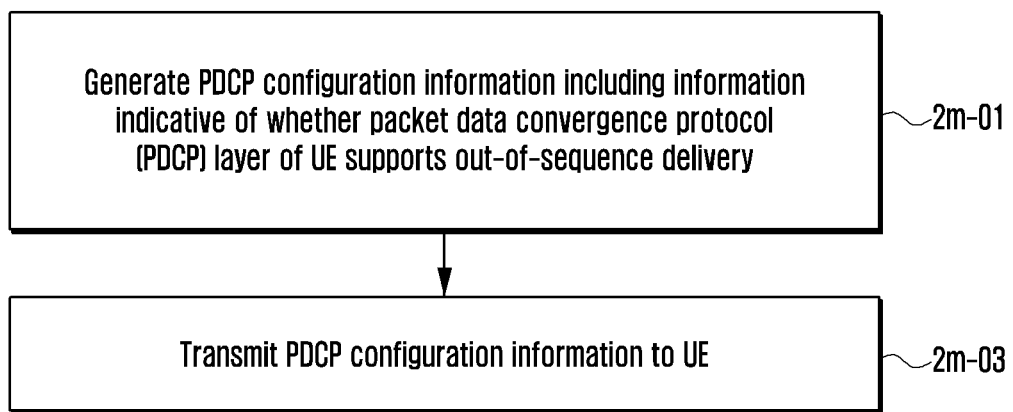
FIG. 2M is a flowchart of a control method of a base station according to an embodiment.

FIG. 2M is a flowchart of a control method of a base station according to an embodiment.

Referring to FIG. 2M, at step 2*m*-01, the base station may generate PDCP configuration information including information indicative of whether the PDCP layer of a UE supports out-of-sequence delivery.

At step 2*m*-03, the base station may transmit the PDCP configuration information to the UE.

Third Embodiment

Figure 3A:
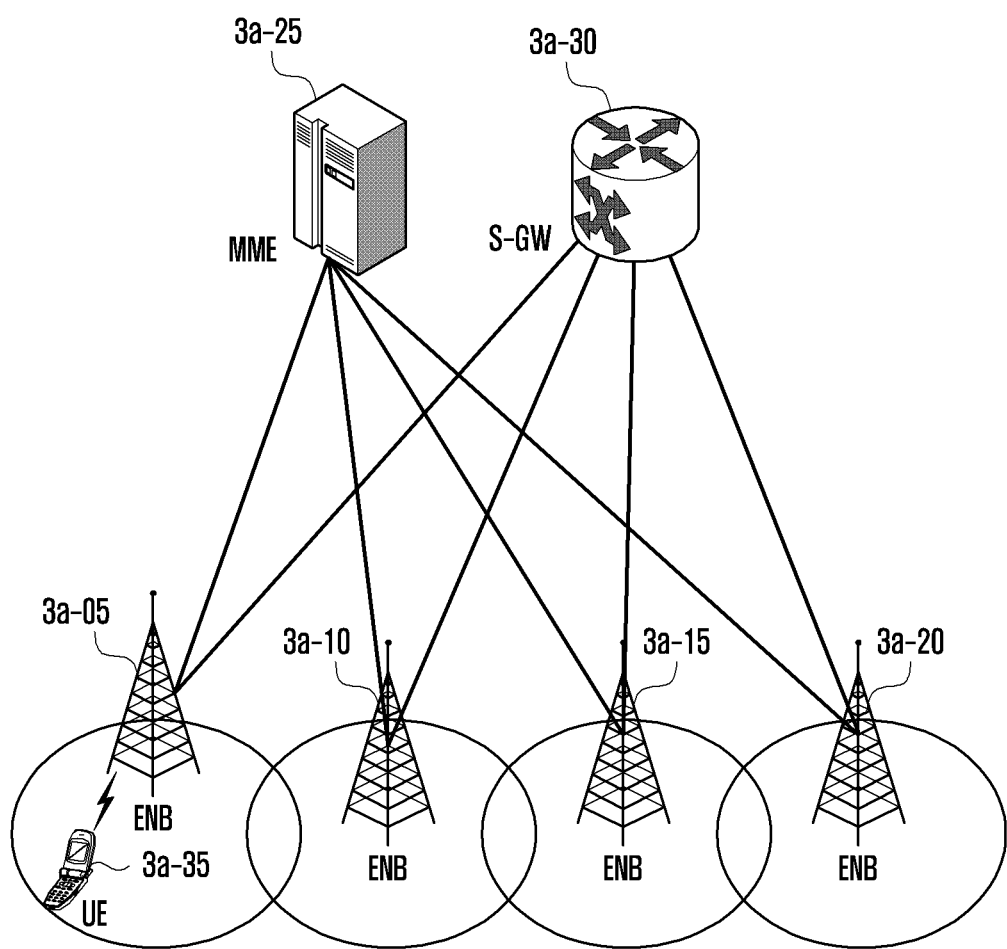
FIG. 3A is a block diagram of an LTE system according to an embodiment.

FIG. 3A is an illustration of an LTE system according to an embodiment.

Referring to FIG. 3A, the wireless communication system includes multiple eNBs 3*a*-05, 3*a*-10, 3*a*-15 and 3*a*-20, an MME 3*a*-25 and an S-GW 3*a*-30. A UE (or terminal) 3*a*-35 accesses an external network through the eNB 3*a*-05, 3*a*-10, 3*a*-15, and 3*a*-20 and the S-GW 3*a*-30.

The eNBs 3*a*-05, 3*a*-10, 3*a*-15 and 3*a*-20 are access nodes of a cellular network, and provide radio access to UEs that access a network. For example, the eNBs 3*a*-05, 3*a*-10, 3*a*-15, and 3*a*-20 collect state information, such as a buffer state, available transmission power state and channel state of UEs, schedules the UEs, and supports connections between the UEs and a core network (CN) in order to serve the traffic of the UEs. The MME 3*a*-25 is a device responsible for various control functions in addition to a mobility management function for a UE, and is connected to multiple eNBs. The S-GW 3*a*-30 provides a data bearer. The MME 3*a*-25 and the S-GW 3*a*-30 may further perform authentication and bearer management on a UE that accesses a network, and processes packets arrived from the eNBs 3*a*-05, 3*a*-10, 3*a*-15 and 3*a*-20 or packets to be delivered to the eNB 3*a*-05, 3*a*-10, 3*a*-15 and 3*a*-20.

Figure 3B:
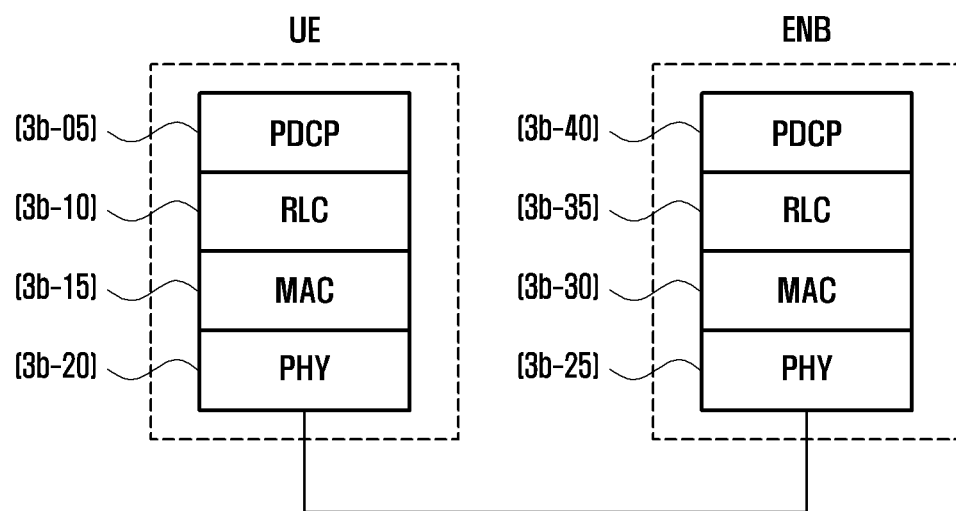
FIG. 3B is a block diagram of a radio protocol architecture of an LTE system according to an embodiment.

FIG. 3B is a block diagram showing radio protocol architecture of an LTE system according to an embodiment. In NR defined in the future, radio protocol architecture may be different from the radio protocol architecture of FIG. 3B.

Referring to FIG. 3B, the radio protocol of the LTE system includes PDCPs 3*b*-05 and 3*b*-40, RLCs 3*b*-10 and 3*b*-35, and MACs 3*b*-15 and 3*b*-30 in a UE and an eNB, respectively. The PDCPs 3*b*-05 and 3*b*-40 are responsible for operations, such as IP header compression/decompression. The RLCs 3b-10 and 3b-35 reconfigures a PDCP PDU to a proper size. The MACs 3b-15 and 3b-30 are connected to multiple RLC layer devices configured in one UE, and performs an operation of multiplexing RLC PDUs into a MAC PDU and demultiplexing RLC PDUs from a MAC PDU. Physical layers PHYs 3b-20 and 3b-25 each perform channel coding and modulation on higher layer data, producing data in an OFDM symbol and transmitting the OFDM symbol to a radio channel or demodulating and channel-decoding an OFDM symbol received through a radio channel and transmitting it to a higher layer. A physical layer uses a HARQ for additional error correction. A receiving stage transmits information about whether a packet transmitted by a transmitting stage has been received using 1 bit. This is called HARQ acknowledged/not acknowledged (ACK/NACK) information. Downlink HARQ ACK/NACK information about uplink transmission is transmitted through a physical hybrid-ARQ indicator channel (PHICH) physical channel. Uplink HARQ ACK/NACK information about downlink transmission may be transmitted through a physical uplink control channel (PUCCH) or a physical uplink shared channel (PUSCH) physical channel.

The PHY layer may include one or a plurality of frequency/carriers. A technology in which one eNB configures and uses a plurality of frequencies at the same time is CA. CA can significantly increase the amount of transmission corresponding to the number of secondary carriers by additionally using a primary carrier and one or a plurality of secondary carriers, as compared to a conventional technology in which only one carrier is used for communication between a UE and an evolved universal mobile telecommunications system terrestrial radio access network (E-UTRAN) eNB. In LTE, a cell within an eNB using a primary carrier is referred to as a primary cell (PCell), and a secondary carrier is referred to as a secondary cell (SCell). A technology in which the CA function is expanded into two eNBs is DC. In DC, a UE connects and uses a master E-UTRAN eNB (MeNB) and a secondary E-UTRAN eNB (SeNB) at the same time. Cells belonging to an MeNB are referred to as a master cell group (MCG), and cells belonging to an SeNB are referred to as a secondary cell group (SCG). A representative cell is present in each cell group. The representative cell of an MCG is referred to as a PCell, and the representative cell of a SCG is referred to as a PSCell. When the aforementioned NR is used, a UE may use LTE and NR at the same time using the MCG as the LTE technology and using the SCG as NR.

An RRC layer is present over the PDCP layer of a UE and eNB. The RRC layer may exchange configuration control messages related to access and measurement for radio resource control. For example, a UE may be instructed to perform measurement using the message of the RRC layer. The UE may report measurement results to an eNB using the message of the RRC layer.

Figure 3C:
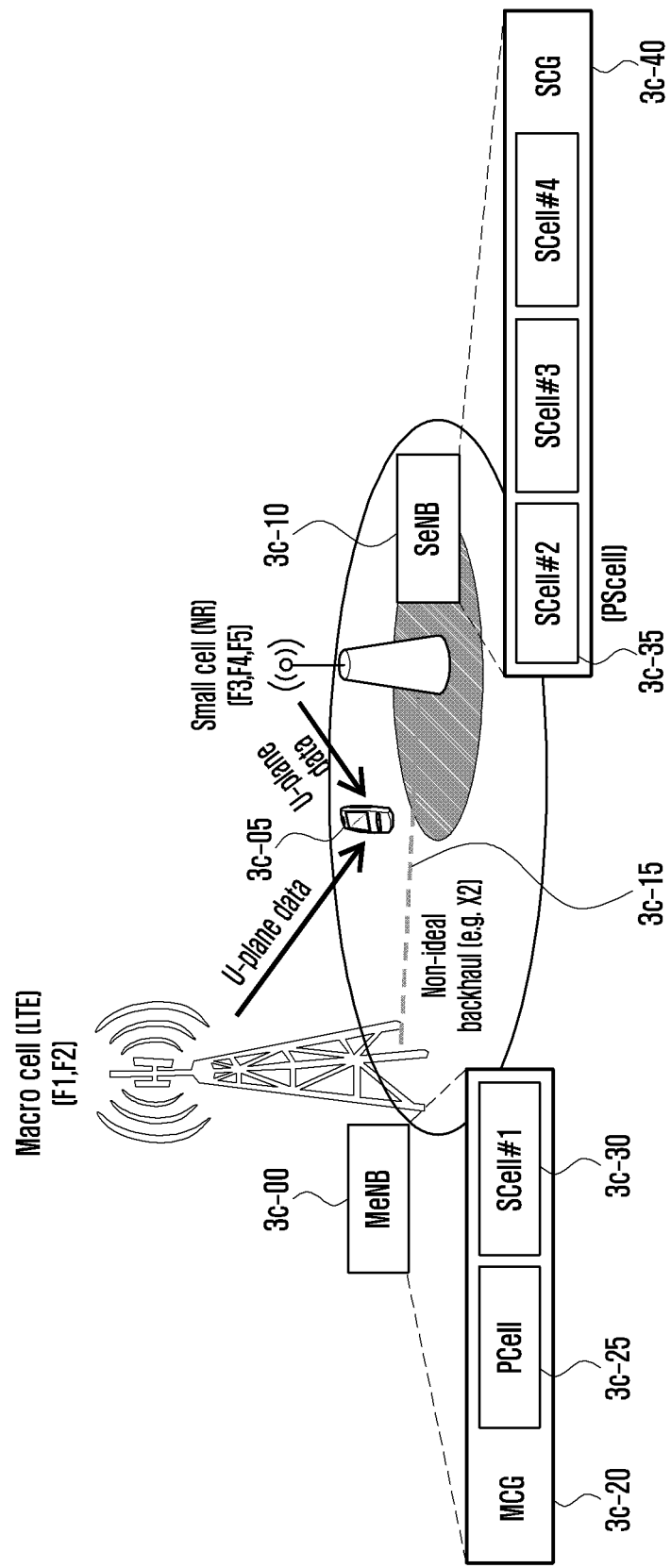
FIG. 3C is an illustration of dual connectivity in LTE and new radio (NR) according to an embodiment.

FIG. 3C is an illustration of DC in LTE and NR according to an embodiment.

Referring to FIG. 3C, if DC is used, a UE may connect to and use two eNBs at the same time. FIG. 3C shows an example in which a UE 3c-05 connects to a macro base station 3c-00 using the LTE technology and a small base station 3c-10 using the NR technology at the same time, and transmits/receives data. This is referred to as E-UTRAN-NR dual connectivity (EN-DC). The macro base station 3c-00 is an MeNB, and the small base station 3c-10 is an SeNB. Multiple small cells may be present in the service area of the MeNB 3c-00. The MeNB 3c-00 is connected to SeNBs (e.g., SeNB 3c-10) over a wired backhaul network 3c-15. A set of serving cells provided by the MeNB 3c-00 is referred to as an MCG 3c-20. Only one serving cell of the MCG 3c-20 is a PCell 3c-25 having all of the functions performed by the existing cell, such as connection establishment, connection re-establishment and handover.

In the PCell 3c-25, an uplink control channel has a PUCCH. A serving cell other than the PCell 3c-25 is called an SCell #1 3c-30. FIG. 3C shows a scenario in which the MeNB 3c-00 provides one SCell (SCell #1 3c-30) and the SeNB 3c-10 provides three SCells (SCell #2, SCell #3, and SCell #4 3c-35). A set of serving cells provided by the SeNB 3c-10 is referred to as an SCG 3c-40, When the UE transmits/receives data to/from the two eNBs (MeNB 3c-00 and SeNB 3c-10), the MeNB 3c-00 issues a command to add, change and remove serving cells provided by the SeNB 3c-10 to the SeNB 3c-10.

In order to issue the command, the MeNB 3c-00 may perform a configuration on the UE so that the UE measures a serving cell and neighbor cells. The UE should report measured results to the MeNB 3c-00 based on the configuration information. In order to efficiently transmit/receive data to/from the UE, the SeNB 3c-10 requires a serving cell playing a role similar to the role of the PCell of an MCG 3c-20. In the present disclosure, such a serving cell is referred to as a PSCell. One of the serving cells of an SCG 3c-40 is determined to be the PSCell. The corresponding serving cell has a PUCCH, that is, an uplink control channel. The PUCCH is used for a UE to transmit HARQ ACK/NACK information, channel status information (CSI) information and a scheduling request (SR) to an eNB.

Figure 3D:
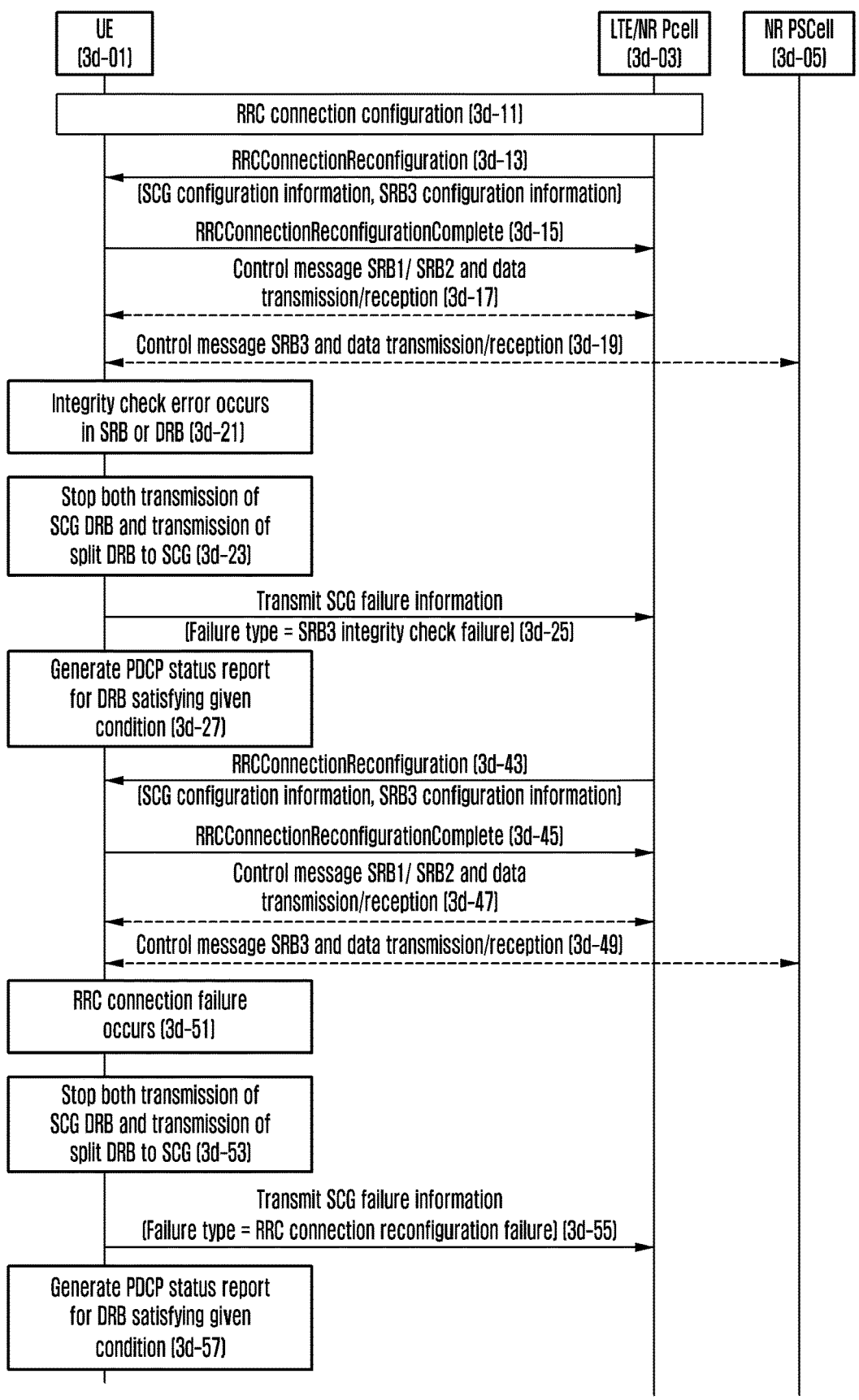
FIG. 3D is a flow diagram of a flow of messages between a terminal and a base station according to an embodiment.

FIG. 3D is a flow diagram of messages between a UE and an eNB when a method of determining and processing a connection failure is used if the UE performs a simultaneous connection with a plurality of eNBs having the same or heterogeneous RATs according to an embodiment.

Referring to FIG. 3D, an example of a UE accessing LTE and NR eNBs is shown, but the example may be applied to a plurality of connections between homogeneous eNBs (e.g., an NR eNB and an NR eNB).

A UE 3d-01 in the idle mode (RRC_IDLE) may perform access to an LTE cell for a cause, such as the occurrence of data to be transmitted at step 3d-11, The idle mode is a state in which the UE 3d-01 cannot transmit data because it is not connected to a network for power reduction. For data transmission, the UE 3d-01 must switch to the connected mode (RRC_CONNECTED). When the UE 3c1-01 is successful in an access procedure for an LTE cell 3d-03, the state of the UE 3d-01 changes to the connected mode (RRC_CONNECTED), A bearer (e.g., an SRB) for a control message may be configured in the UE 3d-01 in the connected mode. Thereafter, the UE 3d-01 may transmit/receive data to/from the LTE cell through a bearer (i.e., a DRB) configuration for security activation and data. The bearer for a control message may be divided into a first SRB (SRB1) and a second SRB (SRB2) depending on a control message type.

When an eNB determines to add an NR cell to the UE 3d-01 as an SCG, the eNB transmits SCG configuration information to the UE 3d-01 in order to configure the aforementioned DC function at step 3d-13. The SCG configuration information may include information about the addition and release of SCells added as the SCG. The SCG configuration information may include information that additionally configures a third SRB (SRB3) so that a control message generated by the SCG is transmitted through an SCG eNB, and may also include information about a bearer that may be transmitted through the SCG. The pieces of configuration information may be transmitted using the RRCConnectionReconfiguration message of the RRC layer. Thereafter, the UE transmits a message that acknowledges that the configuration information has been transmitted. The message may be transmitted using an RRCConnectionReconfigurationComplete message at step 3d-15. Accordingly, the UE can transmit/receive data at the same time using the LTE cell 3d-03, that is, an MCG, and an NR cell 3d-05, that is, the SCG.

When the SRB3 is configured, a control message may be transmitted/received through the SRB3 at steps 3d-17 and 3d-19.

For safety reasons, a packet transmitted through the SRB1/SRB2 may be duplicated and transmitted to the MCG and the SCG. Likewise, a packet transmitted through the SRB3 may be duplicated and transmitted to the SCG and the MCG. This is referred to as a split bearer. A bearer that transmits data from an MCG CN connected to the MCG to the MCG and the SCG is referred to as an MCG split bearer. A bearer that transmits data from an SCG CN connected to the SCG to the SCG and the MCG is referred to as an SCG split bearer. Furthermore, the uplink and the downlink may be applied.

As described above, when the UE 3d-01 transmits/receives data through the SRB or DRB, the UE 3d-01 may perform an integrity check on each packet. The integrity check is to determine whether a packet has been damaged (e.g., by a malicious user). In this case, a message authentication code for integrity (MAC-I) may be included in each packet. A receiving stage may decipher the MAC-I generated based on a certain encryption key and a rule, and may identify whether a corresponding packet has been damaged by identifying whether corresponding information is correct. The MAC-I is always included in SRB packets. The MAC-I may be included in DRB packets for each DRB based on the configuration of an eNB.

Accordingly, the UE 3d-01 may perform an integrity check on the SRB or the configured DRB. If an error occurs when the integrity check is performed on the SRB or the configured DRB at step 3d-21, the UE may determine in which bearer the error occurs. If the corresponding bearer is the SRB (i.e., SRB1 or SRB2) of the MCG or is an MCG DRB (including a bearer transmitted to only the MCG only and an MCG split bearer), the UE may perform an RRC Connection Reestablishment procedure. That is, the UE 3d-01 selects one of the neighbor cells through a cell selection procedure, and attempts a connection recovery by transmitting the RRCConnectionReestablishment message of the RRC layer to the selected cell. If the corresponding bearer is the SRB (e.g., SRB3) of the SCG or an SCG DRB (including a bearer transmitted to the SCG only and an SCG split bearer), the UE 3d-01 may stop both the transmission of the SCG DRB and the transmission of the split DRB to the SCG, and may also stop the transmission of the SRB3 and the transmission of the split SRB1/SRB2 to the SCG at step 3d-23. The UE 3d-01 may report the occurred error to the MCG eNB at step 3d-25.

When the report is made, the SCGFailureInformation message of the RRC layer may be used. The message may include information providing notification that the cause of the failure is an SRB3 (or SCG DRB) integrity check error. The UE 3d-01 may generate the PDCP status report of the PDCP layer with respect to an SRB or DRB that satisfies the following conditions, and may transmit the report to the MCG eNB regarding whether the UE has properly received up to which packet at step 3d-27.

The MCG split DRB or the SCG split DRB (or the split SRB1/2/3)

A digital radio mondiale (DRM) that belongs to DRBs and in which "statusReportRequired" has been configured by the configuration of the eNB Accordingly, the UE may correctly notify the MCG eNB whether packets up to which a downlink packet have been correctly received so that the MCG eNB can recover any loss although data stacked in the SCG is lost.

As in the aforementioned contents, when the eNB determines to add an NR cell to the UE as an SCG, the eNB may transmit SCG configuration information to the UE in order to configure the aforementioned DC function at step 3d-43. The SCG configuration information may include information about the addition and release of SCells added as the SCG. The SCG configuration information may include information that additionally configures an SRB3 so that a control message generated by the SCG is transmitted through the SCG eNB. In addition, the SCG configuration information may include information about a bearer that may be transmitted through the SCG. The pieces of configuration information may be transmitted using the RRCConnectionReconfiguration message of the RRC layer. Thereafter, the UE 3d-01 transmits a message that acknowledges that the configuration information has been received. The message may be transmitted using an RRCConnectionReconfigurationComplete message at step 3d-45. Accordingly, the UE 3d-01 can transmit/receive data at the same time using the LTE cell 3d-03, that is, the MCG, and the NR cell 3d-05, that is, the SCG. If an SRB3 is configured, the UE 3d-01 may transmit/receive a control message through the SRB3 at steps 3d-47 and 3d-49, Accordingly, the eNB may transmit a configuration command to the UE 3d-01 through an SRB for various function configurations. However, the UE 3d-01 may not comply with the configuration of the eNB within the RRCConnectionReconfiguration message. In this case, the UE 3d-01 may determine that an error occurs in which bearer. If the corresponding bearer is the SRB (i.e., SRB1 or SRB2) of the MCG, the UE may perform an RRC Connection Reestablishment procedure. For example, the UE 3d-01 may select one of the neighbor cells through a cell selection procedure and attempt a connection recovery by transmitting the RRCConnectionReestablishment message of the RRC layer to the selected cell. If the corresponding bearer is the SRB (i.e., SRB3) of the SCG, the UE 3d-01 may stop both the transmission of the SCG DRB and the transmission of the split DRB to the SCG, and may also stop the transmission of the SRB3 and the transmission of the split SRB1/SRB2 to the SCG at step 3d-53. The UE reports the occurred error to the MCG eNB at step 3d-55). When the report is transmitted, the SCGFailureInformation message of the RRC layer may be used. The message may include information providing notification that the cause of the failure is an RRC reconfiguration failure. Furthermore, the UE 3d-01 may generate the PDCP status report of the PDCP layer with respect to an SRB or DRB that satisfies the following conditions, and may transmit the report to the MCG eNB regarding whether the UE 3d-01 has properly received up to which packet at step 3d-27.

The MCG split DRB or the SCG split DRB (or split SRB1/SRB2/SRB3)

A DRM that belongs to DRBs and in which "statusReportRequired" has been configured by the configuration of the eNB Accordingly, the UE 3d-01 may correctly notify the MCG eNB whether packets up to which downlink packet have been correctly received so that the MCG eNB can recover any loss although data stacked in the SCG is lost.

Figure 3E:
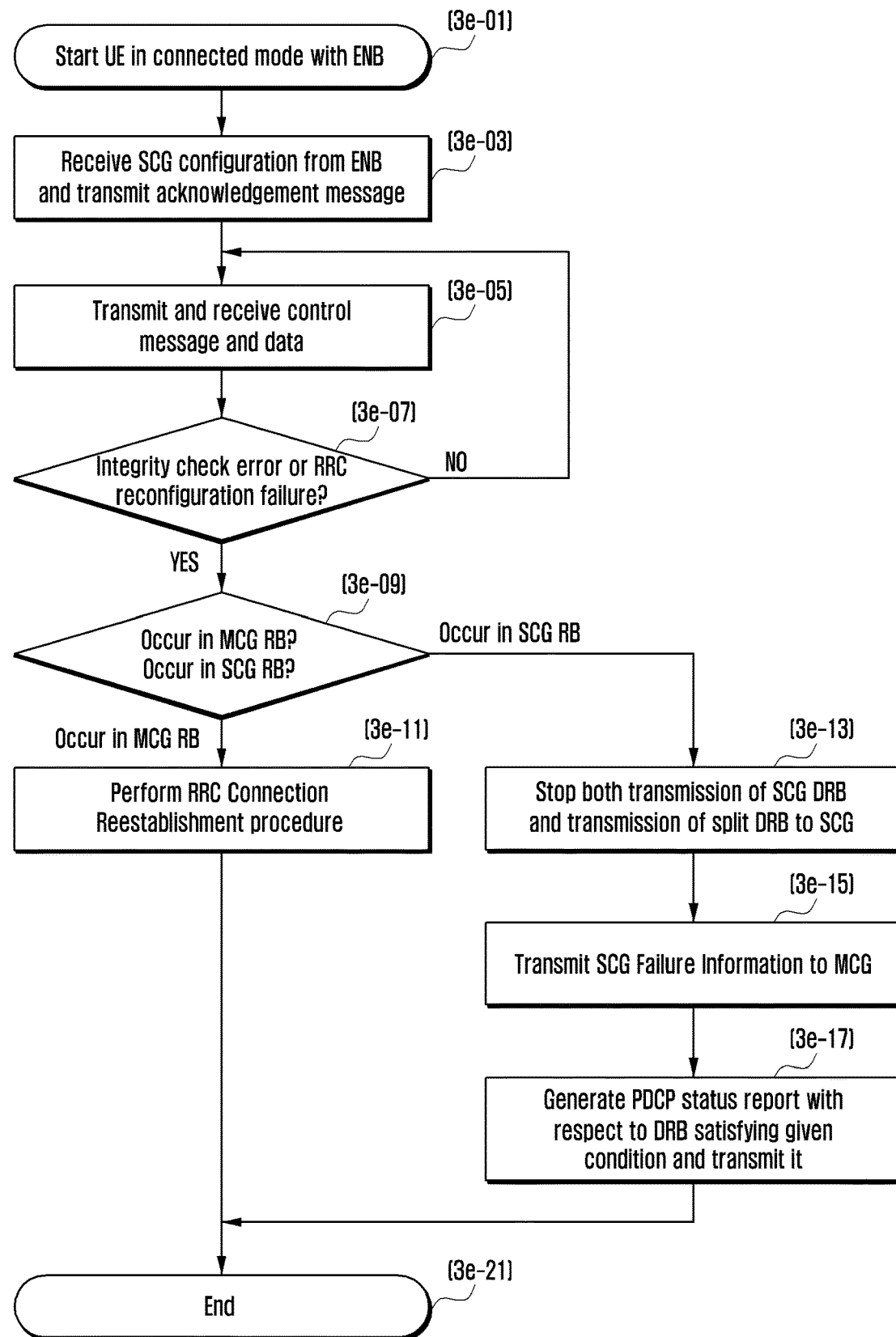
FIG. 3E is a flowchart of an operation of a terminal according to an embodiment.

FIG. 3E is a flowchart of an operation of a UE according to an embodiment.

Referring to FIG. 3E, a UE is connected to an LTE eNB and is in the connected mode (RRC_CONNECTED) at step 3e-01.

The UE may receive SCG configuration information from the eNB and transmit an acknowledgement message for the SCG configuration information at step 3e-03. The SCG configuration information may include information about the addition and release of SCells added as an SCG. The SCG configuration information may include information that additionally configures an SRB3 so that a control message generated by the SCG is transmitted through an SCG eNB. The SCG configuration information may include information about a bearer that may be transmitted through the SCG. The pieces of configuration information may be transmitted using the RRCConnectionReconfiguration message of the RRC layer. Thereafter, the UE may transmit a message that acknowledges that the configuration information has been received using an RRCConnectionReconfigurationComplete message.

The UE may transmit/receive data at the same time using the MCG and the SCG based on the configuration information at step 3e-05. If the aforementioned SRB3 is configured, a control message may be transmitted/received through the SRB3.

As described above, the UE may perform an integrity check on each packet when it transmits/receives an SRB or DRB at step 3e-05. The UE may determine whether the UE can be configured with respect to messages received through the SRB at step 3e-07.

If error occurs when an integrity check is performed on the SRB or configured DRB or the application of a configuration received through the SRB is impossible, the UE may determine in which bearer a corresponding error occurs at step 3e-09.

If the corresponding bearer is an SRB (i.e., SRB1 or SRB2) of the MCG or is an MCG DRB (including a bearer transmitted to the MCG only and an MCG split bearer), the UE may perform an RRC Connection Reestablishment procedure at step 3e-11. For example, the UE may select one of neighbor cells through a cell selection procedure and attempt connection recovery by transmitting the RRCConnectionReestablishment message of the RRC layer to the selected cell.

If the corresponding bearer is the SRB (i.e., SRB3) of the SCG or an SCG DRB (including a bearer transmitted to the SCG only and an SCG split bearer), the UE may stop both the transmission of the SCG DRB and the transmission of the split DRB to the SCG, and may also stop the transmission of the SRB3 and the transmission of the split SRB1/SRB2 to the SCG at step 3e-13. The UE may report the occurred error to the MCG eNB at step 3e-15. When the report is transmitted, the SCGFailureInformation message of the RRC layer may be used. The message may include information providing notification that the cause of the failure is an SRB3 (or SCG DRB) integrity check error RRC reconfiguration failure. The UE may generate the PDCP status report of the PDCP layer with respect to an SRB or DRB that satisfies the following conditions, and may report that the UE has correctly received up to which packet to the MCG eNB at step 3e-17.

A MCG split DRB or the SCG split DRB (or split SRB1/SRB2/SRB3)

A DRB that belongs to DRBs and in which "statusReportRequired" has been configured by the configuration of the eNB Accordingly, the MCG eNB is notified that packets up to which downlink packet have been correctly received so that the MCG eNB can recover any loss although data stacked in the SCG is lost.

Figure 3F:
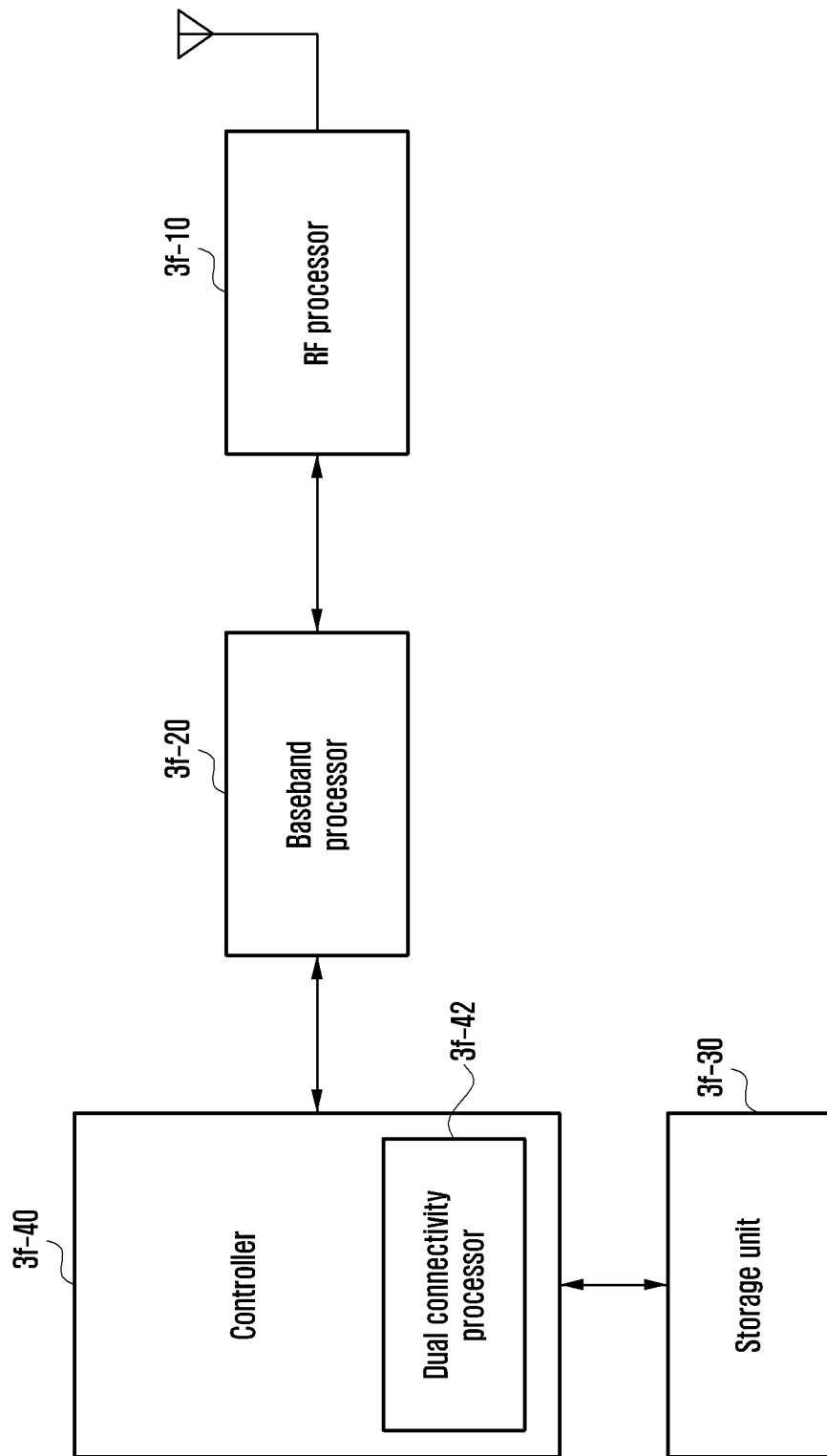
FIG. 3F is a block diagram of a terminal according to an embodiment.

FIG. 3F is a block diagram of a UE according to an embodiment.

Referring to FIG. 3F, the UE may include an RF processor 3f-10, a baseband processor 3f-20, a storage unit 3f-30, and a controller 3f-40.

The RF processor 3f-10 may perform functions for transmitting/receiving a signal through a radio channel, such as the band conversion and amplification of a signal. For example, the RF processor 3f-10 may up-convert a baseband signal received from the baseband processor 3f-20 into an RF band signal, transmit the RF band signal through an antenna, and down-convert an RF band signal received through the antenna into a baseband signal. For example, the RF processor 3f-10 may include a transmission filter, a reception filter, an amplifier, a mixer, an oscillator, a DAC, and an ADC. In FIG. 3F, only one antenna is shown, but the UE may include multiple antennas. The RF processor 3f-10 may include multiple RF chains, and may perform beamforming. For beamforming, the RF processor 3f-10 may adjust a phase and a size of each signal transmitted/received through multiple antennas or antenna elements.

The baseband processor 3f-20 may perform a baseband signal and inter-bit stream conversion function based on a physical layer standard of a system. For example, when data is transmitted, the baseband processor 3f-20 may generate complex symbols by coding and modulating a transmission bit stream. When data is received, the baseband processor 3f-20 may reconstruct a reception bit stream from a baseband signal received from the RF processor 3f-10 through modulation and demodulation. For example, if an OFDM scheme is applied, when data is transmitted, the baseband processor 3f-20 may generate complex symbols by coding and modulating a transmission bit stream, map the complex symbols to subcarriers, and configure OFDM symbols through an IFFT operation and CP insertion.

When data is received, the baseband processor 3f-20 segments a baseband signal received from the RF processor 3f-10 in an OFDM symbol unit, reconstructs signals mapped to subcarriers through an FFT operation, and reconstructs a reception bit stream through modulation and demodulation.

The baseband processor 3f-20 and the RF processor 3f-10 may transmit and receive signals as described above. Accordingly, the baseband processor 3f-20 and the RF processor 3f-10 may be referred to as a transmitter, a receiver, a transceiver or a communication unit. At least one of the baseband processor 3f-20 and the RF processor 3f-10 may include multiple communication modules in order to support different multiple RATs. At least one of the baseband processor 3f-20 and the RF processor 3f-10 may include different communication modules in order to process signals of different frequency bands. The different frequency bands may include an SHF (e.g., 2.5 GHz, 5 GHz) band and a millimeter wave (e.g., 60 GHz) band.

The storage unit 3f-30 may store data, such as a basic program, an application program, and configuration information for the operation of the UE.

The controller 3f-40 may control an overall operation of the UE. For example, the controller 3f-40 may transmits/receive a signal through the baseband processor 3f-20 and the RF processor 3f-10. The controller 3f-40 may write data in the storage unit 3f-40 and read data from the storage unit 3f-40. In this case, the controller 3f-40 may include at least one processor. For example, the controller 3f-40 may include a communication processor performing control for communication and an AP controlling a higher layer, such as an application program.

In accordance with an embodiment of the present disclosure, the controller 3f-40 may include a dual connectivity processor 3f-42 operating in a DC mode and performing processing. For example, the controller 3f-40 may control the UE to perform the procedure shown in the operation of the UE shown in FIG. 3E and described above.

In accordance with an embodiment of the present disclosure, after a configuration for DC is configured in a UE by a gNB, when an integrity check error RRC reconfiguration fails, the UE may recover a connection by performing the aforementioned operation depending on in which RB the error occurred.

The methods according to the present disclosure may be implemented in the form of hardware, software or a combination of hardware and software.

If the method is implemented in software, a non-transitory computer-readable storage medium storing one or more programs (software modules) may be provided. The one or more programs stored in the non-transitory computer-readable storage medium may be configured for execution by one or more processors within an electronic device (e.g., a UE or a server). The one or more programs may include instructions that enable the electronic device to execute the methods according to the present disclosure.

Such a program (software module or software) may be stored in non-volatile memory including random access memory (RAM) and flash memory, read only memory (ROM), electrically erasable programmable read only memory (EEPROM), a magnetic disc storage device, compact disc-ROM (CD-ROM), digital versatile discs (DVDs) or other forms of optical devices or a magnetic cassette. Alternatively, the program may be stored in memory consisting of some or all of the above. A plurality of each of the pieces of element memory may be included.

The program may be stored in an attachable storage device capable of accessing a communication network, such as the Internet, Intranet, a local area network (LAN), a wireless LAN (WLAN) or a storage area network (SAN) or a communication network consisting of a combination of the same. Such a storage device may be connected to a device capable of performing the present disclosure through an external port. A separate storage device over a communication network may be connected to a device that performs the present disclosure.

In the aforementioned detailed description of the present disclosure, the elements included in the present disclosure may be expressed in singular or plural form depending on the embodiment. However, the singular or plural expression was selected suitably for a situation, and the present disclosure is not intended to be limited to the singular or plural elements. Although an element is expressed in the plural form, it may be configured in the singular form. Although an element is expressed in the singular form, it may be configured in the plural form. The embodiments described in present disclosure are individually described, but two or more of the embodiments may be combined and practiced.

In accordance with an embodiment of the present disclosure, a method for a UE to rapidly report surrounding frequency measurement results to an eNB in the next-generation mobile communication system is provided. Accordingly, the eNB can rapidly configure frequency aggregation or dual connectivity in the UE.

In accordance with an embodiment of the present disclosure, various modes of a PDCP layer in order to support various functions required in the next-generation mobile communication system and operation procedures of modes and methods of configuring the modes are provided. Accordingly, various functions can be supported in the next-generation mobile communication system.

In accordance with an embodiment of the present disclosure, a UE can determine whether an error of communication with each eNB occurs and recover communication.

Although embodiments of the present disclosure have been described in the detailed description of the present disclosure, the present disclosure may be modified in various ways without departing from the scope and spirit of the present disclosure. Accordingly, the scope of the present disclosure is not intended to be limited to the aforementioned embodiments, but is defined by the appended claims and their equivalents.

What is claimed is:

1. A method performed by a user equipment (UE) in a wireless communication system, the method comprising:
   receiving, from a base station, a radio resource control (RRC) message comprising packet data convergence protocol (PDCP) configuration information including information indicating that a PDCP layer is configured with out-of-order delivery;
   identifying that the PDCP layer is configured with the out-of-order delivery based on the PDCP configuration information; and
   processing a PDCP packet based on a result of identifying that the PDCP layer is configured with the out-of-order delivery,
   wherein a header compression or a header decompression associated with a robust header compression (ROHC) are not configured, in case that the PDCP layer is configured with the out-of-order delivery.

2. The method of claim 1, further comprising delivering a PDCP service data unit (SDU) generated based on the PDCP packet to an upper layer, regardless of an order of a count value of the delivered PDCP SDU, in case that the PDCP layer is configured with the out-of-order delivery.

3. The method of claim 2, wherein delivering the PDCP SDU comprises omitting the header decompression associated with the ROCH before the PDCP SDU is delivered to the upper layer.

4. The method of claim 1, further comprising:
   determining whether a count value of a received PDCP packet is identical with a value of a state variable indicating a first count value of a first PDCP service data unit (SDU) not delivered to an upper layer, in case that the PDCP layer is not configured with the out-of-order delivery;
   performing the header decompression on a PDCP SDU with consecutively associated count values starting from the value of the state variable indicating the first count value of the first PDCP SDU not delivered to the upper layer;
   delivering the PDCP SDU to the upper layer in ascending order of the associated count values of the PDCP SDU, in case that the count value of the received PDCP packet is identical with the value of the state variable indicating the first count value of the first PDCP SDU not delivered to the upper layer; and
   updating the value of the state variable to the first count value of the first PDCP SDU which has not been delivered to upper layers, wherein the count value is greater than a previous value of the state variable, in case that the count value of the received PDCP packet is identical with the value of the state variable indicating the first count value of the first PDCP SDU not delivered to the upper layer.

5. The method of claim 1, further comprising:
delivering a PDCP service data unit (SDU) generated based on the PDCP packet to an upper layer, regardless of an order of a count value of the delivered PDCP SDU, in case that the PDCP layer is configured with the out-of-order delivery;
determining whether a count value of a received PDCP packet is identical with a value of a state variable indicating a first count value of a first PDCP SDU not delivered to the upper layer; and
updating the value of the state variable to the first count value of the first PDCP SDU which has not been delivered to upper layers, wherein the count value is greater than a previous value of the state variable, in case that the count value of the received PDCP packet is identical with the value of the state variable indicating the first count value of the first PDCP SDU not delivered to the upper layer.

6. A user equipment (UE) in a wireless communication system, the UE comprising:
a transceiver; and
a controller configured to:
receive, from a base station via the transceiver, a radio resource control (RRC) message comprising packet data convergence protocol (PDCP) configuration information including information indicating that a PDCP layer is configured with out-of-order delivery, identify that the PDCP layer is configured with the out-of-order delivery based on the PDCP configuration information, and
process a PDCP packet based on a result of identifying that the PDCP layer is configured with the out-of-order delivery,
wherein a header compression or a header decompression associated with a robust header compression (ROHC) are not configured, in case that the PDCP layer is configured with the out-of-order delivery.

7. The UE of claim 6, wherein the controller is further configured to deliver a PDCP service data unit (SDU) generated based on the PDCP packet to an upper layer, regardless of an order of a count value of the delivered PDCP SDU, in case that the PDCP layer is configured with the out-of-order delivery.

8. The UE of claim 7, wherein the controller is further configured to omit the header decompression associated with the ROCH before the PDCP SDU is delivered to the upper layer.

9. The UE of claim 6, wherein the controller is further configured to:
determine whether a count value of a received PDCP packet is identical with a value of a state variable indicating a first count value of a first PDCP service data unit (SDU) not delivered to an upper layer, in case that the PDCP layer is not configured with the out-of-order delivery,
perform the header decompression on a PDCP SDU with consecutively associated count values starting from the value of the state variable indicating the first count value of the first PDCP SDU not delivered to the upper layer, deliver the PDCP SDU to the upper layer in ascending order of the associated count values of the PDCP SDU, in case that the count value of the received PDCP packet is identical with the value of the state variable indicating the first count value of the first PDCP SDU not delivered to the upper layer, and
update the value of the state variable to the first count value of the first PDCP SDU which has not been delivered to upper layers,
wherein the count value is greater than a previous value of the state variable, in case that the count value of the received PDCP packet is identical with the value of the state variable indicating the first count value of the first PDCP SDU not delivered to the upper layer.

10. The UE of claim 6, wherein the controller is further configured to:
deliver a PDCP service data unit (SDU) generated based on the PDCP packet to an upper layer, regardless of an order of a count value of the delivered PDCP SDU, in case that the PDCP layer is configured with the out-of-order delivery,
determine whether a count value of a received PDCP packet is identical with a value of a state variable indicating a first count value of a first PDCP SDU not delivered to the upper layer, and
update the value of the state variable to the first count value of the first PDCP SDU which has not been delivered to upper layers, wherein the count value is greater than a previous value of the state variable, in case that the count value of the received PDCP packet is identical with the value of the state variable indicating the first count value of the first PDCP SDU not delivered to the upper layer.

11. A method performed by a base station in a wireless communication system, the method comprising:
generating packet data convergence protocol (PDCP) configuration information including information indicating that a PDCP layer of a user equipment (UE) is configured with out-of-order delivery; and
transmitting a radio resource control (RRC) message comprising the PDCP configuration information to the UE,
wherein a header compression or a header decompression associated with a robust header compression (ROHC) are not configured, in case that the PDCP layer is configured with the out-of-order delivery.

12. The method of claim 11, wherein a PDCP service data unit (SDU) generated based on a PDCP packet is delivered to a higher layer regardless of an order of a count value of the PDCP SDU, in case that the PDCP layer of the UE is configured with the out-of-order delivery.

13. The method of claim 12, wherein the header decompression associated with the ROCH before the PDCP SDU is delivered to the upper layer is omitted.

14. The method of claim 11, wherein whether a count value of a received PDCP packet is identical with a value of a state variable indicating a first count value of a first PDCP SDU not delivered to an upper layer is determined, in case that the PDCP layer is not configured with the out-of-order delivery,
wherein the header decompression on a PDCP service data unit (SDU) with consecutively associated count values starting from the value of the state variable indicating the first count value of the first PDCP SDU not delivered to the upper layer is performed, and the PDCP SDU is delivered to the upper layer in ascending order of the associated count values of the PDCP SDU, in case that the count value of the received PDCP packet is identical with the value of the state variable indicating the first count value of the first PDCP SDU not delivered to the upper layer, and wherein the value of the state variable to the count value of the first PDCP SDU which has not been delivered to upper layers, the count value being greater than a previous value of the state variable, is updated in case that the count value of the received PDCP packet is identical with the value of the state variable indicating the first count value of the first PDCP SDU not delivered to the upper layer.

15. The method of claim 11, wherein a PDCP service data unit (SDU) generated based on the PDCP packet is delivered to an upper layer, regardless of an order of a count value of the delivered PDCP SDU, in case that the PDCP layer is configured with the out-of-order delivery;

wherein whether a count value of a received PDCP packet is identical with a value of a state variable indicating a first count value of a first PDCP SDU not delivered to the upper layer is determined, and wherein the value of the state variable to the first count value of the first PDCP SDU which has not been delivered to upper layers, wherein the count value is greater than a previous value of the state variable, is updated in case that the count value of the received PDCP packet is identical with the value of the state variable indicating the first count value of the first PDCP SDU not delivered to the upper layer.

16. A base station in a wireless communication system, the base station comprising:
 a transceiver; and
 a controller configured to:
  generate packet data convergence protocol (PDCP) configuration information including information indicating that a PDCP layer of a user equipment (UE) is configured with out-of-order delivery, and
  transmit a radio resource control (RRC) message comprising the PDCP configuration information to the UE via the transceiver,
 wherein a header compression or a header decompression associated with a robust header compression (ROHC) are not configured in case that the PDCP layer is configured with the out-of-order delivery.

17. The base station of claim 16, wherein a PDCP service data unit (SDU) generated based on a PDCP packet is delivered to a higher layer, regardless of an order of a count value of the PDCP SDU, in case that the PDCP layer of the UE is configured with the out-of-order delivery.

18. The base station of claim 17, wherein the header decompression associated with the ROCH before the PDCP SDU is delivered to the upper layer is omitted.

19. The base station of claim 16, wherein whether a count value of a received PDCP packet is identical with a value of a state variable indicating a first count value of a first PDCP SDU not delivered to an upper layer is determined, in case that the PDCP layer is not configured with the out-of-order delivery, wherein the header decompression on a PDCP service data unit (SDU) with consecutively associated count values starting from the value of the state variable indicating the first count value of the first PDCP SDU not delivered to the upper layer is performed, and the PDCP SDU is delivered to the upper layer in ascending order of the associated count values of the PDCP SDU, in case that the count value of the received PDCP packet is identical with the value of the state variable indicating the first count value of the first PDCP SDU not delivered to the upper layer, and wherein the value of the state variable to the first count value of the first PDCP SDU which has not been delivered to upper layers, the count value being greater than a previous value of the state variable, is updated in case that the count value of the received PDCP packet is identical with the value of the state variable indicating the first count value of the first PDCP SDU not delivered to the upper layer.

20. The base station of claim 16, wherein a PDCP service data unit (SDU) generated based on the PDCP packet is delivered to an upper layer, regardless of an order of a count value of the delivered PDCP SDU, in case that the PDCP layer is configured with the out-of-order delivery, wherein whether a count value of a received PDCP packet is identical with a value of a state variable indicating a first count value of a first PDCP SDU not delivered to the upper layer is determined, and wherein the value of the state variable to the first count value of the first PDCP SDU which has not been delivered to upper layers, wherein the count value is greater than a previous value of the state variable, is updated in case that the count value of the received PDCP packet is identical with the value of the state variable indicating the first count value of the first PDCP SDU not delivered to the upper layer.

* * * * *